United States Patent
Xu

(10) Patent No.: US 9,753,772 B2
(45) Date of Patent: Sep. 5, 2017

(54) METHOD OF COMPUTING LATEST START TIMES TO ALLOW REAL-TIME PROCESS OVERRUNS

(71) Applicant: Jia Xu, Toronto (CA)

(72) Inventor: Jia Xu, Toronto (CA)

( * ) Notice: Subject to any disclaimer, the term of this patent is extended or adjusted under 35 U.S.C. 154(b) by 0 days.

(21) Appl. No.: 14/451,420

(22) Filed: Aug. 4, 2014

(65) Prior Publication Data

US 2016/0034314 A1     Feb. 4, 2016

(51) Int. Cl.
*G06F 9/44*     (2006.01)
*G06F 9/48*     (2006.01)

(52) U.S. Cl.
CPC .......... *G06F 9/4887* (2013.01); *G06F 9/4881* (2013.01)

(58) Field of Classification Search
CPC .. G06F 9/4887; G06F 9/4881; G06F 11/3409; G06F 11/3471; G06F 11/3636; G06F 2201/88; G06F 2217/84; G06F 8/4441; G06F 9/485; G06F 9/50; G06F 9/546
See application file for complete search history.

(56) References Cited

U.S. PATENT DOCUMENTS

| | | | | |
|---|---|---|---|---|
| 6,230,303 | B1 * | 5/2001 | Dave | G06F 9/4881 716/105 |
| 6,349,321 | B1 * | 2/2002 | Katayama | G06F 9/4881 718/102 |
| 6,438,573 | B1 * | 8/2002 | Nilsen | G06F 8/10 718/100 |
| 7,444,638 | B1 * | 10/2008 | Xu | G06F 9/4887 718/100 |
| 7,484,067 | B1 * | 1/2009 | Bollella | G06F 12/0269 707/999.202 |
| 2002/0194048 | A1 * | 12/2002 | Levinson | G06Q 10/06311 705/7.26 |

(Continued)

OTHER PUBLICATIONS

Scott A. Brandt et al.; Dynamic Integrated Scheduling of Hard Real-Time, Soft Real-Time and Non-Real-Time Processes; 2003 IEEE; 12 pages; <http://ieeexplore.ieee.org/stamp/stamp.jsp?arnumber=1253287>.*

(Continued)

*Primary Examiner* — Thuy Dao
*Assistant Examiner* — Cuong V Luu

(57) ABSTRACT

A method is provided for allowing process overruns while guaranteeing satisfaction of various timing constraints. At least one latest start time for an uncompleted process is computed. If an uncompleted process does not start at its latest start time, then at least one of the predetermined constraints may not be satisfied. A timer is programmed to interrupt a currently executing process at a latest start time. In another embodiment, information about ordering of the end times of the process time slots in a pre-run-time schedule is used by a run-time scheduler to schedule process executions. Exclusion relations can be used to prevent simultaneous access to shared resources. Any process that does not exclude a particular process is able to preempt that particular process at any appropriate time at run-time, which increases the chances that a process will be able to overrun while guaranteeing satisfaction of various timing constraints.

6 Claims, 42 Drawing Sheets

(56) References Cited

U.S. PATENT DOCUMENTS

| | | | | |
|---|---|---|---|---|
| 2006/0079979 A1* | 4/2006 | Giebels | ............ | G05B 19/41865 |
| | | | | 700/96 |
| 2013/0318506 A1* | 11/2013 | Sohm | .................... | G06F 11/323 |
| | | | | 717/128 |
| 2014/0365992 A1* | 12/2014 | Maclay | ................. | G06F 9/4887 |
| | | | | 717/104 |
| 2015/0006226 A1* | 1/2015 | Smith | .............. | G06Q 10/06313 |
| | | | | 705/7.23 |

OTHER PUBLICATIONS

Jia Xu et al.; On Satisfying Timing Constraints in Hard-Real-Time Systems; 1993 IEEE; pp. 70-84; <http://ieeexplore.ieee.org/stamp/stamp.jsp?arnumber=210308>.*

John A. Stankovic et al.; Implications of Classical Scheduling Results for Real Time Systems; 1995 IEEE; pp. 16-25; <http://ieeexplore.ieee.org/stamp/stamp.jsp?arnumber=386982>.*

Terry Shepard et al.; A Pre-Run-Time Scheduling Algorithm for Hard Real-Time Systems; 1991 IEEE; pp. 669-677; <http://ieeexplore.ieee.org/stamp/stamp.jsp?arnumber=83903>.*

Greg N. Frederickson; Scheduling Unit-Time Tasks With Integer Release Times and Deadlines; 1983 Elsevier; pp. 171-173; <http://www.sciencedirect.com/science/article/pii/0020019083901175>.*

A. Burns; Scheduling hard real-time systems a review; 1991 IET; pp. 116-128; <http://digital-library.theiet.org/content/journals/10.1049/sej.1991.0015>.*

\* cited by examiner

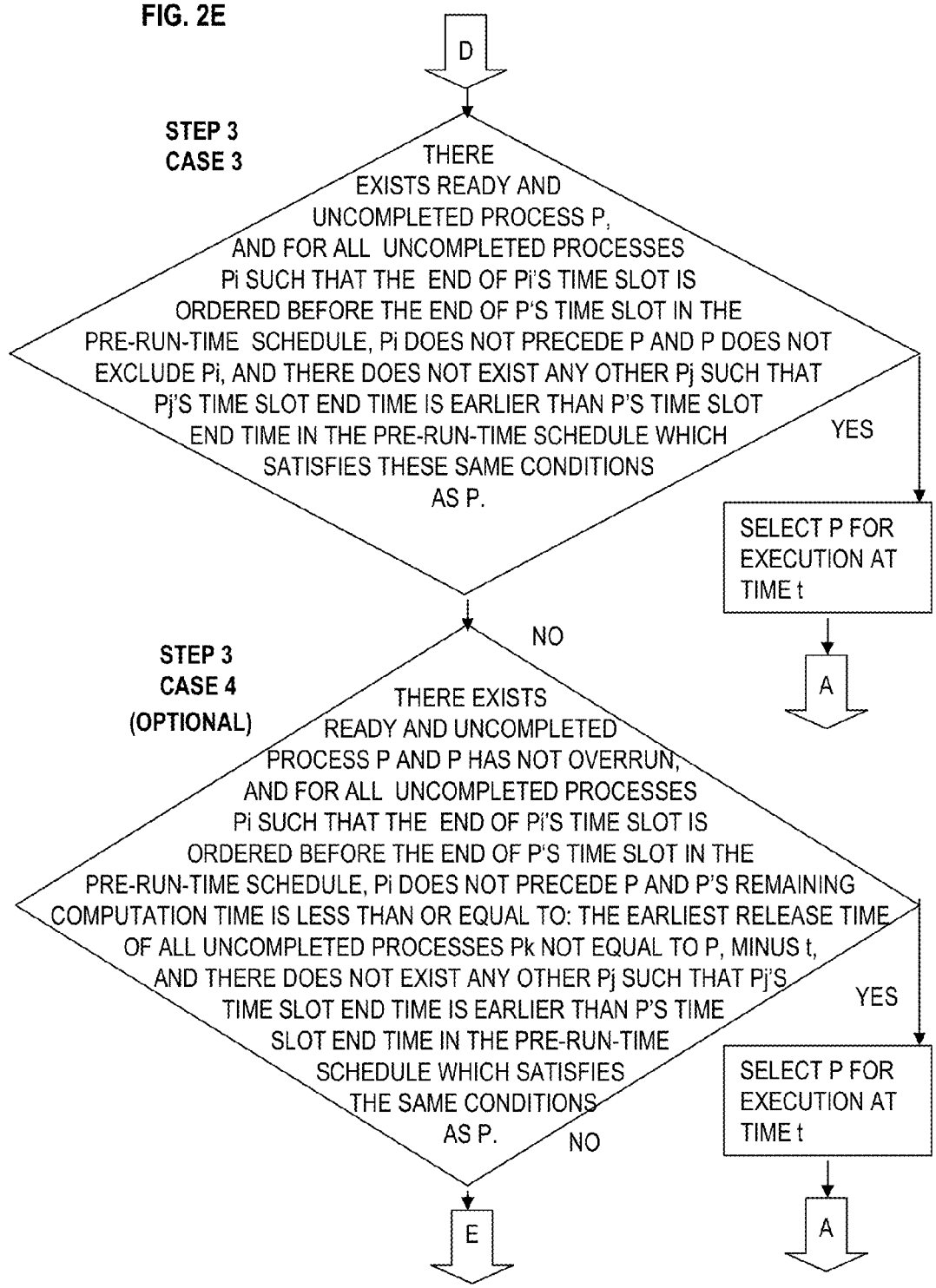

FIG. 2H

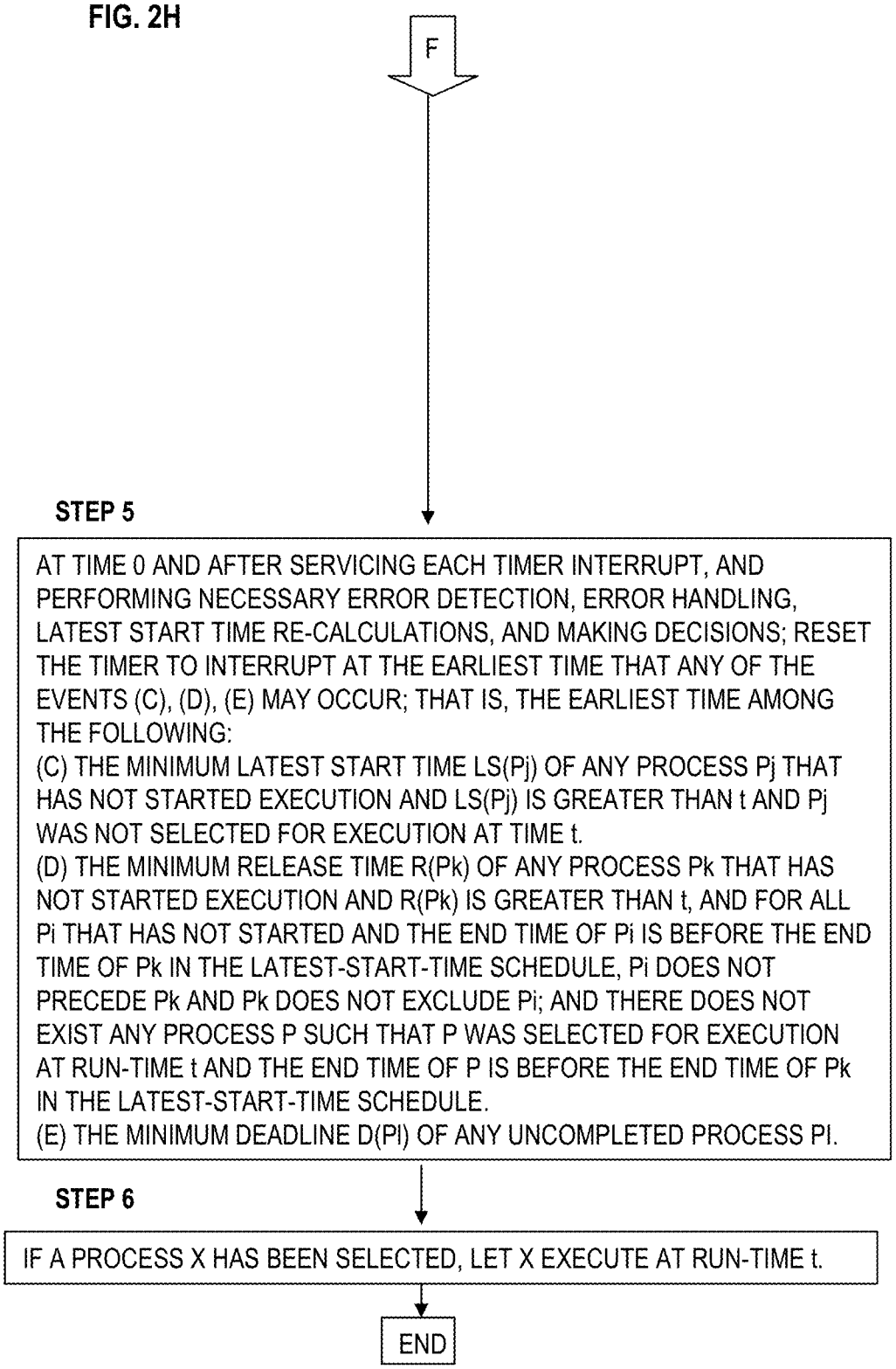

STEP 5

AT TIME 0 AND AFTER SERVICING EACH TIMER INTERRUPT, AND PERFORMING NECESSARY ERROR DETECTION, ERROR HANDLING, LATEST START TIME RE-CALCULATIONS, AND MAKING DECISIONS; RESET THE TIMER TO INTERRUPT AT THE EARLIEST TIME THAT ANY OF THE EVENTS (C), (D), (E) MAY OCCUR; THAT IS, THE EARLIEST TIME AMONG THE FOLLOWING:
(C) THE MINIMUM LATEST START TIME LS(Pj) OF ANY PROCESS Pj THAT HAS NOT STARTED EXECUTION AND LS(Pj) IS GREATER THAN t AND Pj WAS NOT SELECTED FOR EXECUTION AT TIME t.
(D) THE MINIMUM RELEASE TIME R(Pk) OF ANY PROCESS Pk THAT HAS NOT STARTED EXECUTION AND R(Pk) IS GREATER THAN t, AND FOR ALL Pi THAT HAS NOT STARTED AND THE END TIME OF Pi IS BEFORE THE END TIME OF Pk IN THE LATEST-START-TIME SCHEDULE, Pi DOES NOT PRECEDE Pk AND Pk DOES NOT EXCLUDE Pi; AND THERE DOES NOT EXIST ANY PROCESS P SUCH THAT P WAS SELECTED FOR EXECUTION AT RUN-TIME t AND THE END TIME OF P IS BEFORE THE END TIME OF Pk IN THE LATEST-START-TIME SCHEDULE.
(E) THE MINIMUM DEADLINE D(Pl) OF ANY UNCOMPLETED PROCESS Pl.

STEP 6

IF A PROCESS X HAS BEEN SELECTED, LET X EXECUTE AT RUN-TIME t.

END

ALTERNATIVE STEP 5

↓

AT TIME 0 AND AFTER SERVICING EACH TIMER INTERRUPT, AND PERFORMING NECESSARY ERROR DETECTION, ERROR HANDLING, LATEST START TIME RE-CALCULATIONS, AND MAKING DECISIONS; RESET THE TIMER TO INTERRUPT AT THE EARLIEST TIME THAT ANY OF THE EVENTS (C), (D), (E), AND (F) MAY OCCUR; THAT IS, THE EARLIEST TIME AMONG THE FOLLOWING:
(C) THE MINIMUM LATEST START TIME $LS(P_j)$ OF ANY PROCESS $P_j$ THAT HAS NOT STARTED EXECUTION AND $LS(P_j)$ IS GREATER THAN t AND $P_j$ WAS NOT SELECTED FOR EXECUTION AT TIME t.
(D) THE MINIMUM RELEASE TIME $R(P_k)$ OF ANY PROCESS $P_k$ THAT HAS NOT STARTED EXECUTION AND $R(P_k)$ IS GREATER THAN t, AND FOR ALL $P_i$ THAT HAS NOT STARTED AND THE END TIME OF $P_i$ IS BEFORE THE END TIME OF $P_k$ IN THE LATEST-START-TIME SCHEDULE, $P_i$ DOES NOT PRECEDE $P_k$ AND $P_k$ DOES NOT EXCLUDE $P_i$; AND THERE DOES NOT EXIST ANY PROCESS P SUCH THAT P WAS SELECTED FOR EXECUTION AT RUN-TIME t AND THE END TIME OF P IS BEFORE THE END TIME OF $P_k$ IN THE LATEST-START-TIME SCHEDULE.
(E) THE MINIMUM DEADLINE $D(P_l)$ OF ANY UNCOMPLETED PROCESS $P_l$.
(F) $t + C'(P)$ WHICH IS THE TIME AT WHICH THE PROCESS P THAT WAS SELECTED FOR EXECUTION AT RUN-TIME t MAY OVERRUN IF AT THAT TIME P STILL HAS NOT COMPLETED.

↓

STEP 6

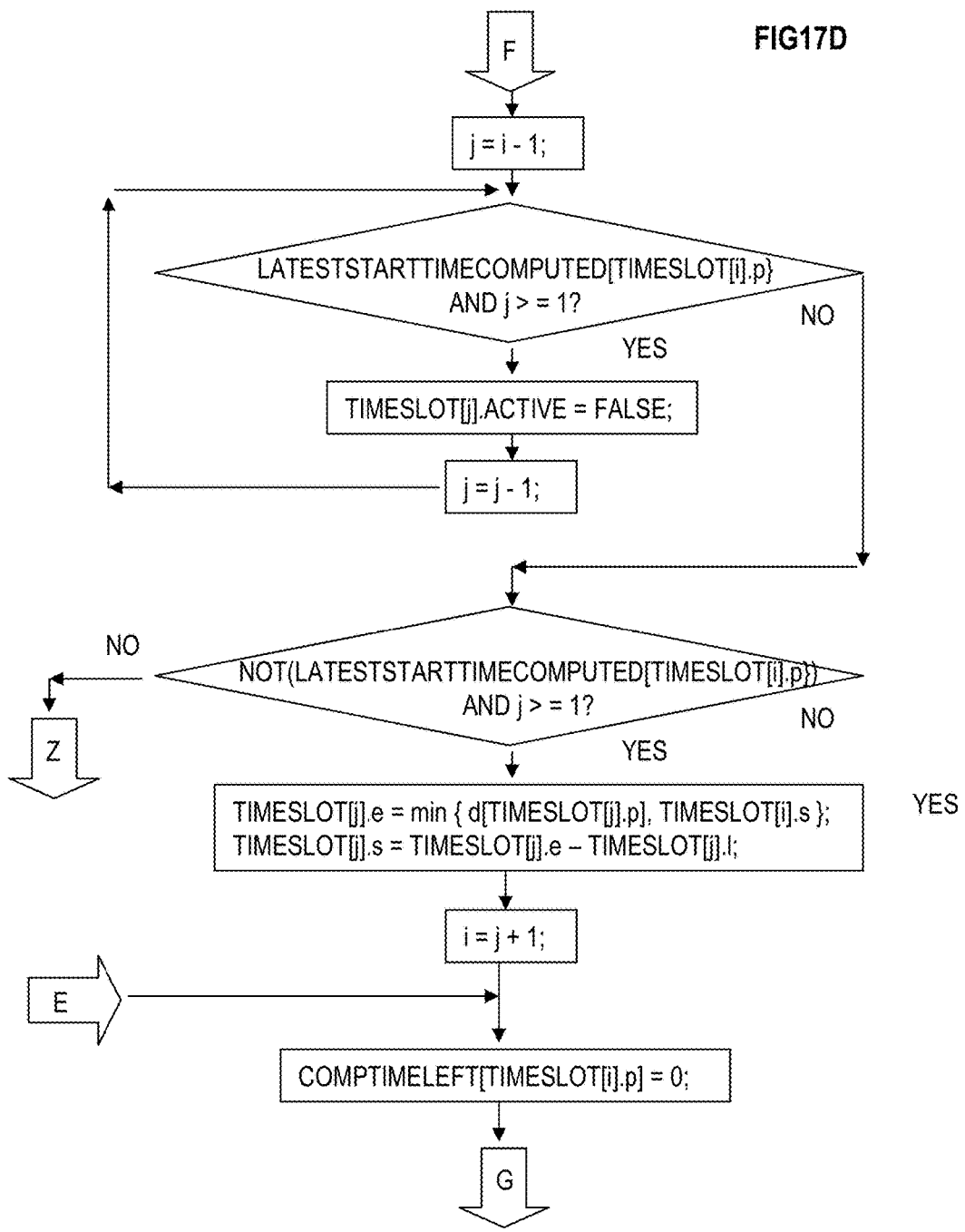

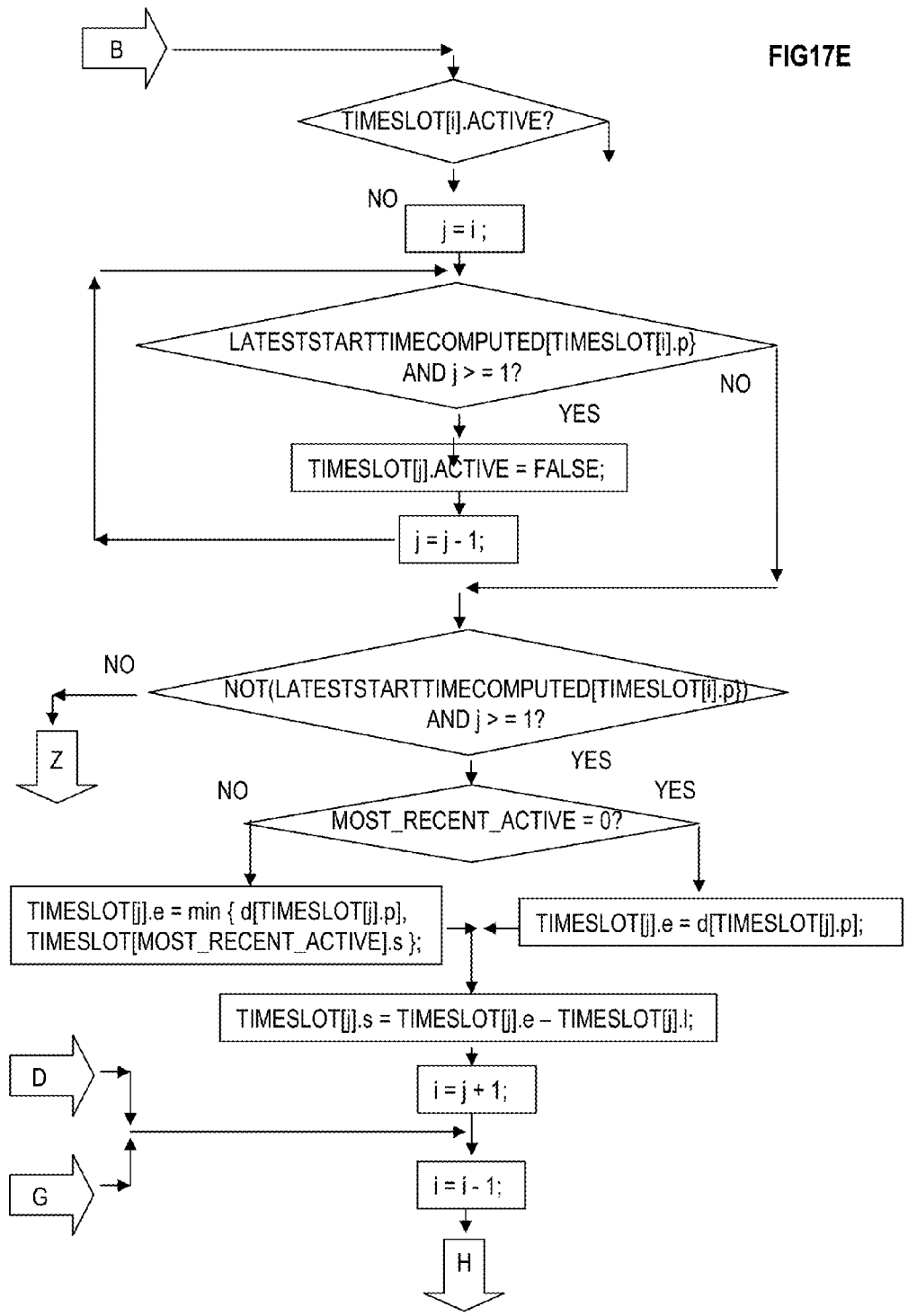

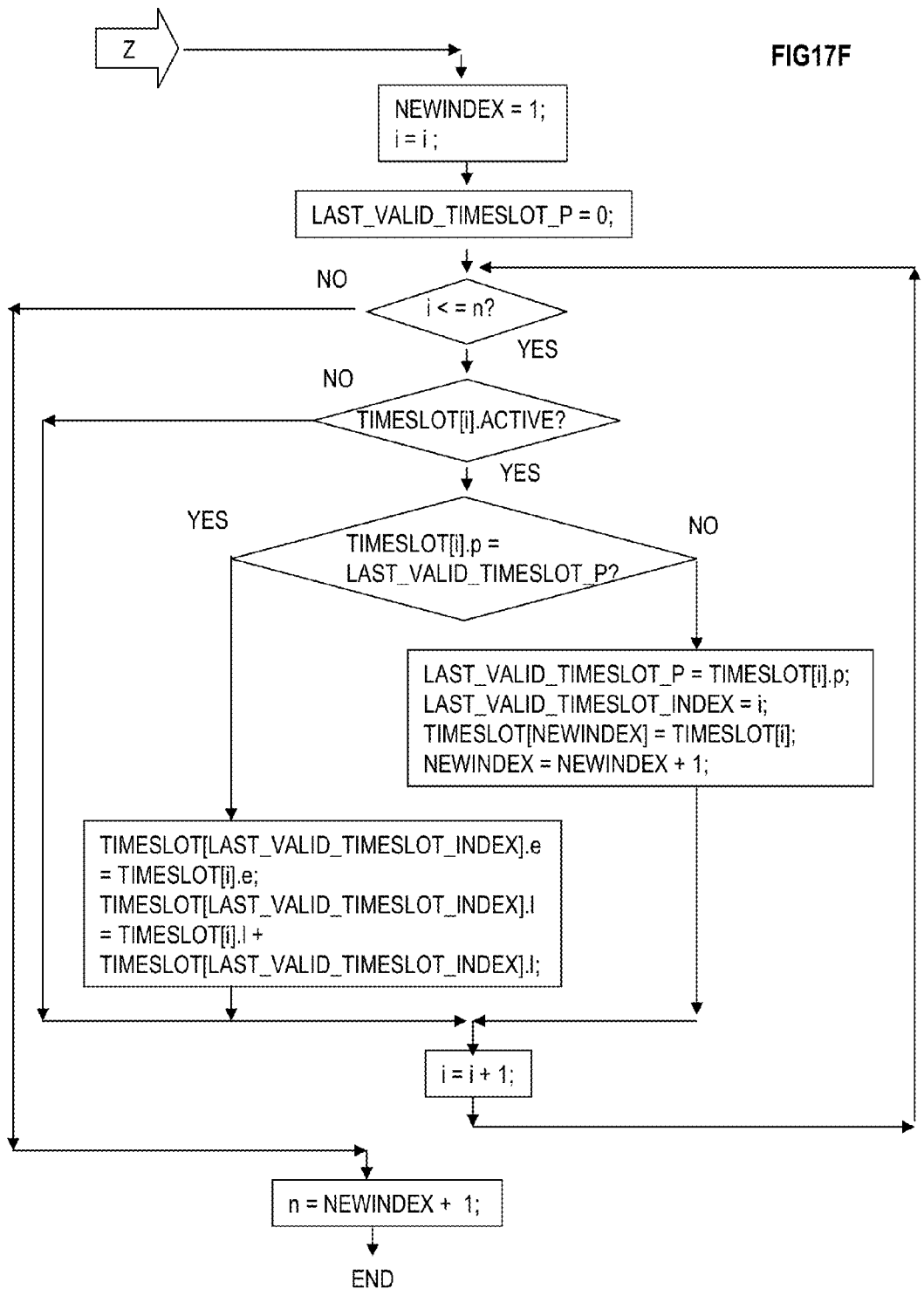

US 9,753,772 B2

METHOD OF COMPUTING LATEST START TIMES TO ALLOW REAL-TIME PROCESS OVERRUNS

CROSS-REFERENCE TO RELATED APPLICATIONS

This application claims the benefit of Provisional Patent Application No. 61/862,003, filed Aug. 3, 2013, and the benefit of Provisional Patent Application No. 61/872,712, filed Aug. 31, 2013, filed by the present inventor, which are hereby incorporated by reference.

Prior application Ser. No. 12/285,045, filed Sep. 29, 2008, prior application Ser. No. 11/341,713, filed Jan. 30, 2006, now U.S. Pat. No. 7,444,638, and prior application Ser. No. 09/336,990, filed Jun. 21, 1999, now U.S. Pat. No. 7,165,252 B1, are hereby incorporated by reference.

FEDERALLY SPONSORED RESEARCH

Not Applicable

NAMES OF PARTIES TO A JOINT RESEARCH AGREEMENT

Not Applicable

SEQUENCE LISTING OR PROGRAM

Not Applicable

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND PRIOR ART

The following is a tabulation of some prior art that presently appears relevant:

U.S. Patents

| Pat. No. | Kind Code | Issue Date | Patentee |
| --- | --- | --- | --- |
| 8,321,065 | B1 | Nov. 27, 2012 | Kirchhof-Falter |
| 6,085,218 | B1 | Jul. 4, 2000 | Carmon |
| 7,613,595 | B1 | Nov. 3, 2009 | MacLay |
| 6,189,022 | B1 | Feb. 13, 2001 | Binns |
| 7,302,685 | B1 | Nov. 27, 2007 | Binns |
| 7,140,022 | B1 | Nov. 21, 2006 | Binns |
| 6,964,048 | B1 | Nov. 8, 2005 | Isham |

U.S. Patent Application Publications

| Publication Nr. | Kind Code | Publ. Date | Applicant |
| --- | --- | --- | --- |
| 20020138542 | A1 | Sep. 26, 2002 | Bollella |
| 20090013322 | A1 | Jan. 8, 2009 | MacLay |
| 20060200795 | B1 | Sep. 7, 2006 | MacLay |

Nonpatent Publications 1. (Koren et al 1995) Koren, G., and Shasha, D., 1995, "Dover: an optimal on-line scheduling algorithm for overloaded uniprocessor real-time systems," SIAM Journal on Computing, Vol. 24, no. 2, pp. 318-339.
2. (Gardner et al 1999) Gardner, M. K., and Liu, J. W. S., 1999, "Performance of algorithms for scheduling real-time systems with overrun and overload," Proc. 11th Euromicro Conference on Real-Time Systems, University of York, England, pp. 9-11.
3. (Lehoczky et al 1995) Lehoczky, J. P., Sha, L., and Strosnider, J. K., 1995, "The deferrable server algorithm for enhanced aperiodic responsiveness in hard real-time environments," IEEE Trans. On Computers, vol. 44, no. 1, pp. 73-91.
4. (Shen et al 1993) Shen, C., Ramamritham, K., and Stankovic, J. A., 1993, "Resource reclaiming in multiprocessor real-time systems," IEEE Tran. on Par. and Distr. Sys., vol. 4, n. 4, pp. 382-397.
5. (Sprunt et al 1989) Sprunt, B., Sha, L., and Lehoczky, J. P., 1989, "Aperiodic process scheduling for hard real-time systems," Journal of Real-Time Systems, vol. 1, pp. 27-60.
6. (Stewart et al 1997) Stewart, D. B., and Khosla, 1997, "Mechanisms for detecting and handling timing errors," Communications of the ACM, vol. 40, no. 1, pp. 87-90.
7. (Zhang 2003) Zhang, L., 2003, "Handling overruns and underruns in prerun-time scheduling in hard real-time systems," M. Sc. Thesis, York University, Toronto, Canada.
8. (Lin et al 2005) Lin, C., and Brandt, S. A., 2005, "Improving soft real-time performance through better slack reclaiming," Proc. 26th IEEE Real-Time Systems Symposium, Miami, pp. 410-420.
9. (Caccamo et al 2005) Caccamo, M., Buttazzo, G. C., and Thomas, D. C., 2005, "Efficient reclaiming in reservation-based real-time systems with variable execution times," IEEE Tran. Computers, vol. 54, n. 2, pp. 198-213.
10. (Xu 1993) Xu, J., 1993, "Multiprocessor scheduling of processes with release times, deadlines, precedence, and exclusion relations," IEEE Trans. on Software Engineering, Vol. 19 (2), pp. 139-154.
11. (Xu 2003) Xu, J., 2003, "On inspection and verification of software with timing requirements," IEEE Trans. on Software Engineering, Vol. 29 (8), pp. 705-720.
12. (Xu, Parnas 1990) Xu, J. and Parnas, D. L., 1990, "Scheduling processes with release times, deadlines, precedence, and exclusion relations," IEEE Trans. on Software Engineering, Vol. 16 (3), pp. 360-369.
13. (Xu, Parnas 1993) Xu, J. and Parnas, D. L., 1993, "On Satisfying Timing Constraints in Hard-Real-Time Systems," IEEE Trans. on Software Engineering, Vol. 19 (1), pp. 1-17.
14. (Xu, Parnas 2000) Xu, J. and Parnas, D. L., 2000, "Fixed priority scheduling versus pre-run-time scheduling," Real-Time Systems, Vol. 18 (1), pp. 7-23.

In operation of a computer system, executions of certain periodically or asynchronously occurring real-time processes must be guaranteed to be completed before specified deadlines, and in addition satisfying various constraints and dependencies, such as release times, offsets, precedence relations, and exclusion relations.

Embedded, real-time systems with high assurance requirements often must execute many different types of processes with complex timing and other constraints. Some of the processes may be periodic and some of them may be asynchronous. Some of the processes may have hard deadlines and some of them may have soft deadlines. For some of the processes, especially the hard real-time processes, complete knowledge about their characteristics can and must be acquired before run-time. For other processes, a prior knowledge of their worst case computation time and their data requirements may not be known.

Some processes may have complex constraints and dependencies between them. For example, a process may need to input data that are produced by other processes. In this case, a process may not be able to start before those other processes are completed. Such constraints are referred to herein as precedence relations.

Exclusion relations may exist between processes when some processes must prevent simultaneous access to shared resources such as data and I/O devices by other processes. For some periodic processes, they may not be able to start immediately at the beginning of their periods. In this case, those processes have release time constraints. For some periodic processes, the beginning of their first period may not start immediately from time zero, that is, the system start time. In this case, those processes have offset constraints.

Examples of such systems include plant control systems, aviation control systems, air traffic control systems, satellite control systems, communication systems, multimedia systems, on-line financial service systems, various embedded systems such as for automotive applications, etc.

Systems and methods related to scheduling executions of real-time processes can be broadly divided into two categories:

(a) systems and methods in which determination of the execution schedule of all the processes is done entirely at run-time (on-line); and (b) systems and methods in which a pre-run-time scheduler computes a pre-run-time schedule for a substantial subset of the processes by before run-time (off-line); then at run-time, a run-time scheduler uses information in the pre-run-time schedule together with information that is available at run-time, to schedule the execution of all the processes.

The vast majority of systems and methods related to scheduling executions of real-time processes belong to the first category above. The article "Scheduling Algorithms For Multiprogramming in a Hard-Real-Time Environment", by C. L. Liu, and J. W. Layland, J. ACM, 20, 46-61, 1973 is the best known representative of the priority scheduling approach. It assumes that all processes are periodic, and that the major characteristics of the processes are known before run-time, that is, the worst case execution times and period are known in advance. Fixed priorities are assigned to processes according to their periods; the shorter the period, the higher the priority. At any time, the process with the highest priority among all processes ready to run, is assigned the processor.

A schedulability analysis is performed before run-time based on the known process characteristics. If certain equations are satisfied, the actual scheduling is performed during run-time, and it can be assumed that all the deadlines will be met at run-time.

The article "Priority Ceiling Protocols: An Approach to Real-Time Synchronization", by L. Sha, R. Rajkumar, and J. P. Lehoczky IEEE Trans. On Computers", 39, 1175-1185, 1990, makes the same assumptions as the Liu et al article, except that in addition, processes may have critical sections guarded by semaphores, and a protocol is provided for handling them. Similar to Rate Monotonic Scheduling, a schedulability analysis is performed before run-time based on the known process characteristics; if certain equations are satisfied, the actual scheduling is performed during run-time, and it can be assumed that all the deadlines will be met at run-time.

Commercial real-time operating systems perform all scheduling activities at run-time, during which at each point in time, the process with the highest priority is selected for execution.

Systems and methods that perform all scheduling activities at run-time, have the following disadvantages:

(a) High run-time overhead due to scheduling and context switching;

(b) Difficulty in analyzing and predicting the run-time behavior of the system;

(c) Difficulty in handling various application constraints and process dependencies;

(d) Low processor utilization.

High run-time overhead is partly due to the fact that embedded, real-time applications are becoming more and more complex, with an ever increasing number of processes and additional constraints and dependencies between processes. The amount of run-time resources consumed by the scheduler in order to compute the schedule, grows very rapidly as the number of processes and constraints increase. The scheduler often needs to perform many time consuming process management functions, such as suspending and activating processes, manipulating process queues, etc. In addition, since the priority scheduler does not know the schedule before run-time, it has to assume the worst case and save/restore complete contexts each time a process is preempted by another process.

Performing all the scheduling at run-time requires the use of complex run-time mechanisms in order to achieve process synchronization and prevent simultaneous access to shared resources. The run-time behavior of the scheduler can be very difficult to analyze and predict accurately.

For example, in one published study, fixed priority scheduling was implemented using priority queues, where tasks are moved between queues by a scheduler that was released at regular intervals by a timer interrupt. It was observed that because the clock interrupt handler had a priority greater than any application task, even a high priority task could suffer long delays while lower priority tasks are moved from one queue to another. Accurately predicting the scheduler overhead proved to be a very complicated task, and the estimated scheduler overhead was substantial, even though it was assumed that the system had a total of only 20 tasks, tasks did not have critical sections, and priorities are not to change. Such difficulties would be many times greater if there existed additional complex application constraints that would have to be satisfied by the synchronization mechanism at run-time.

The original schedulability analysis given in the aforenoted paper describing the PCP protocol by Sha et. al. above, assumed that all tasks are independent tasks, that there are no precedence relations, that their release times are equal to the beginning of their periods, and all periods have a common start time. It is difficult to extend the schedulability analysis for priority scheduling to take into account application constraints that frequently exist in real-time applications, such as precedence constraints, release times that are not equal to the beginning of their periods, offsets, low jitter requirements (limits on the variation in time a computed result is output to the external environment from cycle to cycle), etc. Despite considerable effort spanning several decades to extend the original PCP protocol to handle additional constraints, not much has been accomplished to this end, due to inherent limitations of the priority scheduling model.

Additional application constraints increase the computational complexity of scheduling problems, which already have high computational complexity whenever processes contain critical sections. When all the scheduling is performed at run-time, the scheduler does not have enough time to find solutions for complex problems. Most systems and methods that perform all scheduling at run-time, schedule processes according to process priorities assigned by the user. However, additional application constraints are most likely to conflict with the user assigned priorities. It is not generally possible to map the many different execution orderings of processes that are required by the different application constraints in a large complex system onto a rigid hierarchy of priorities.

It has been suggested that higher priorities be assigned to processes with: shorter periods, higher criticality, lower jitter requirements, precedence constraints, etc. Consequently, the system designer is faced with the impossible task of trying to simultaneously satisfy many different application constraints with one rigid hierarchy of priorities. Because of the inherent constraints built into the fixed priority scheduling model, (e.g. fixed priorities) and because scheduling is performed at run-time, attempts to take into account additional constraints typically result in suggestions that either are only applicable to a few very special cases, or make drastically simplifying assumptions, which significantly reduce schedulability, or are extremely complicated, making the run-time behavior of the system very difficult to analyze and predict.

In general, systems and methods that perform all scheduling activities at run-time achieve lower processor utilization than systems and methods that schedule processes before run-time. This is largely due to the fact that when all scheduling activities are performed at run-time, the scheduler does not have enough time to find good solutions to complex scheduling problems, and can only afford to use crude, suboptimal methods that do not take into account all the available information.

Systems that use priority scheduling methods have a much smaller chance of satisfying timing constraints, because priority-driven methods are only capable of producing a very limited subset of the possible schedules for a given set of processes. This severely restricts the capability of priority-driven systems and methods to satisfy timing and resource sharing constraints at run-time.

In general, the smaller the set of schedules that can be produced by a scheduling system or method, the smaller the chances are of finding a feasible schedule, and, the lower the level of processor utilization that can be achieved. With systems that use optimal methods to compute a pre-run-time schedule off-line, then at run-time, let a run-time scheduler use information in the pre-run-time schedule together with information that is available at run-time, to schedule the process executions, it is possible to achieve higher levels of resource utilization than those achievable by priority-driven systems.

When processes are scheduled at run-time, the scheduling strategy must avoid deadlocks. In general, deadlock avoidance at run-time requires that the run-time synchronization mechanism be conservative, resulting in situations where a process is blocked by the run-time synchronization mechanism, even though it could have proceeded without causing deadlock. This reduces further the level of processor utilization.

In contrast to conventional approaches where most of the processes are scheduled at run-time, with pre-run-time scheduling the schedule for most of the processes is computed off-line; this approach requires that the major characteristics of the processes in the system be known, or bounded, in advance. It is known that it is possible to use pre-run-time scheduling to schedule periodic processes. One possible technique consists of computing off-line a pre-run-time schedule for the entire set of periodic processes occurring within a time period that is equal to the least common multiple of the periods of the given set of processes, then at run-time, let a run-time scheduler use information in the pre-run-time schedule together with information that is available at run-time, to schedule the process executions according to the order of the processes in the pre-run-time schedule.

In pre-run-time scheduling, several alternative schedules may be computed off-line for a given time period, each such schedule corresponding to a different "mode" of operation. A small run-time scheduler can be used to select among the alternative schedules according to information that is available at run-time. This small run-time scheduler can also be used to allocate resources for asynchronous processes that have not been converted into periodic processes.

It is possible to translate an asynchronous process into an equivalent periodic process, if the minimum time between two consecutive requests is known in advance, and the deadline is not too short. Thus it is also possible to schedule such asynchronous processes using pre-run-time scheduling. See U.S. Pat. No. 7,444,638, and U.S. Pat. No. 7,165,252.

Systems and methods that compute a pre-run-time schedule before run-time, then at run-time, let a run-time scheduler use information in the pre-run-time schedule together with information that is available at run-time, to schedule the process executions, have the following advantages:

(a) ability to effectively handle complex constraints and dependencies;
(b) lower run-time overhead;
(c) higher processor utilization; and
(d) ease of predicting the system's behaviour.

In the majority of real-time applications, the bulk of the processing is performed by periodic processes for which the major characteristics of the processes, including offsets, release times, worst-case execution times, deadlines, precedence and exclusion relations, and any other constraints, are known before run-time. For asynchronous processes, generally their worst-case computation times, deadlines, and the minimum time between two consecutive requests (interarrival times) are known in advance. Asynchronous processes normally are few in number, and often can be converted into new periodic processes that can be used to service the corresponding asynchronous process requests in a manner similar to polling. Thus it is not only possible, but highly desirable to compute a pre-run-time schedule for all the periodic processes, including the new periodic processes that are converted from some of the asynchronous processes, before run-time, rather than completely relying on a run-time scheduler to schedule them at run-time.

For the processes whose characteristics are known before run-time, such as periodic processes, one may realize important advantages if a pre-run-time schedule is computed before run-time, instead of completely relying on a run-time scheduler to schedule them at run-time. This is because when scheduling is done before run-time, there is almost no limit on the running time of the scheduler, optimal scheduling methods can be used to maximize the possibility of finding a feasible schedule for the set of processes to be scheduled and to handle complex constraints and dependencies. In contrast, when processes are scheduled at run-time, the time available to the scheduler is very limited. This limits the ability of the scheduler to find a feasible schedule and to take into account the different types of constraints and knowledge about the system processes. Once a pre-run-time schedule for the periodic processes has been computed before run-time, the run-time scheduler can also use this information to schedule asynchronous processes more efficiently.

Other reasons for computing a pre-run-time schedule before run-time include: this greatly reduces the run-time resource requirements needed for scheduling and context switching. With pre-run-time scheduling, it is possible to avoid using sophisticated run-time synchronization mechanisms by directly defining precedence relations and exclusion relations on pairs of process segments to achieve process synchronization and prevent simultaneous access to shared resources. Because the schedule is known in advance, automatic code optimization is possible; one can determine in advance the minimum amount of information that needs to be saved and restored, and one can switch processor execution from one process to another process through very simple mechanisms such as procedure calls, or simply by concatenating code when no context needs to be saved or restored, which greatly reduces the amount of run-time overhead.

When the use of sophisticated run-time synchronization mechanisms is avoided, the benefits are multi-fold: not only is the amount of run-time overhead reduced, but it is also much easier to analyze and predict the run-time behavior of the system. Compared with the complex schedulability analysis required when run-time synchronization mechanisms are used, it is much more straightforward to verify that all processes will meet their deadlines and that all the additional application constraints will be satisfied in an off-line computed schedule.

There has long been an interest in systems and methods for the purpose of automating the process of pre-run-time scheduling, as described in the article by S. R. Faulk and D. L. Parnas "On Synchronization in Hard-Real-time Systems", Commun. ACM vol 31, pp. 274-287, March, 1988. Cyclic executives, a form of pre-run-time scheduling, have been used in safety critical systems, e.g. as described by G. D. Carlow in the article "Architecture of the Space Shuttle Primary Avionics Software System", Commun. ACM, September 1984. However, in the past, cyclic executives have mainly been constructed by hand, and are difficult to construct and maintain. Techniques for transforming an asynchronous process into an equivalent periodic process, as well as methods for solving the problem of scheduling processes with release times, deadlines, exclusion and precedence relations are given in U.S. Pat. No. 7,444,638, and U.S. Pat. No. 7,165,252, and in nonpatent publications by J. Xu and D. Parnas see the articles (Xu, Parnas 1990) J. Xu and D. Parnas in "Scheduling Processes with Release Times, Deadlines, Precedence and Exclusion Relations", IEEE Trans. on Software Engineering, vol 16, pp 360-369, March 1990, by J. Xu and D. L. Parnas in "Pre-run-time Scheduling of Processes with Exclusion Relations on Nested or Overlapping Critical Sections", Proc. Eleventh Annual IEEE International Phoenix Conference on Computers and Communications, IPCCC-92, Scottsdale, Ariz., Apr. 1-3, 1992, (Xu 1993) J. Xu in "Multiprocessor Scheduling of Processes with Release Times, deadlines, Precedence and Exclusion Relations", IEEE Trans. on Software Engineering, vol 19, pp 139-154, February 1993, and (Xu, Parnas 1993) J. Xu and D. L. Parnas in "On Satisfying Timing Constraints in Hard-Real-Time Systems", IEEE Trans. on Software Engineering, vol 19, pp 1-17, January 1993, which are incorporated herein by reference.

However, until now, unsolved problems have been main obstacles to fully automating the process of constructing scheduling systems that combine the pre-run-time scheduling with run-time scheduling of real-time processes, as discussed below.

It is often difficult to estimate the worst-case computation times of real-time processes with sufficient precision during real-time and embedded system design. As discussed in the article by Stewart, D. B., and Khosla, 1997, "Mechanisms for detecting and handling timing errors," Communications of the ACM, vol. 40; and in the article by Caccamo, M., Buttazzo, G. C., and Thomas, D. C., 2005, "Efficient reclaiming in reservation-based real-time systems with variable execution times," IEEE Tran. Computers, vol. 54 (Caccamo et al 2005); low-level mechanisms in modern computer architecture, such as interrupts, DMA, pipelining, caching, and prefetching, can introduce nondeterministic behaviour in the computation time of processes. As the complexity and scale of embedded system applications have increased dramatically in recent years, the demand for average-case performance enhancing technologies that have a corresponding negative impact on worst-case performance, such as larger and larger caches, have also increased. Real time and embedded systems have also become more dependent on sophisticated operating system support, while operating systems, under constant pressure to provide more and more new features and capabilities, have also become more and more complex. All these developments present significant challenges to determining the worst-case computation times of real-time processes with sufficient precision. If the actual computation time of a real-time process during run-time exceeds the estimated worst-case computation time, an overrun will occur, which may cause the real-time process to not only miss its own deadline, but also cause a cascade of other real-time processes to also miss their deadline, possibly resulting in total system failure. However, if the actual computation time of a real-time process during run-time is less than the estimated worst-case computation time, an underrun will occur, which may result in under-utilization of system resources.

Prior art related to handling underruns and overruns that presently appear relevant are listed in the previously provided tabulation of U.S. Patents, U.S. Patent Applications, and nonpatent publications.

In the article by Zhang, L., 2003, "Handling overruns and underruns in prerun-time scheduling in hard real-time systems," M. Sc. Thesis, York University, Toronto, Canada (Zhang, 2003), a method is presented that is not capable of handling exclusion relations or preemptions between tasks, because in Zhang, the slack time of a task is defined to be "the difference between its adjusted deadline and pre-computed finish time," and it assumes that each task, once started, should always be able to continuously execute for the duration of that task's entire worst-case execution time plus all of its slack time, right up to that task's adjusted deadline without being preempted by any other task. In Zhang it states that, " . . . we assume that there is no preemption in the pre-computed schedule, that is, every task is treated as an independent task without any relations between them. If task A is preempted by B, A is divided into two parts, . . . these are treated as separate tasks in our algorithm." This assumption in Zhang rules out the possibility of defining any exclusion relation between other tasks and A, and enforcing those exclusion relations at run-time; it also rules out the possibility of allowing the run-time scheduler to have the capability to allow tasks to preempt other tasks at any appropriate time at run-time. The latter capability is also very important and necessary because the preemption points at run-time will in general be different from the preemption points in the pre-run-time schedule, and allowing tasks to preempt other tasks at any appropriate time at run-time can allow tasks to have more room to overrun, thus increase the chances that processes will be able to complete their computations, reduce the chances of system failure, and increase both system utilization and robustness.

Zhang does not compute latest start times for processes that can preempt other processes at arbitrary points in time. Zhang is not capable of calculating task attributes, including latest start times, for the run-time preemption scenarios shown in Examples 1-9 in this disclosure. In contrast Examples 1-9 of this disclosure describe how embodiments allow tasks to preempt other tasks at any appropriate time.

The method by Zhang also does not consider the possible use of latest-start-time schedules that allow processes to preempt other processes at any appropriate point in time while satisfying exclusion relations at run-time, that provide different advantages as described in this disclosure.

The article by Shen, C., Ramamritham, K., and Stankovic, J. A., 1993, "Resource reclaiming in multiprocessor real-time systems," IEEE Tran. on Par. and Distr. Sys., vol. 4 (Shen et al, 1993), considers resource reclaiming, but do not consider overruns; furthermore, preemptions are not allowed. It also does not compute latest start times for uncompleted processes. The methods in the article by Caccamo, M., Buttazzo, G. C., and Thomas, D. C., 2005, "Efficient reclaiming in reservation-based real-time systems with variable execution times," IEEE Tran. Computers, vol. 54 (Caccamo et al, 2005); and the article by Lehoczky, J. P., Sha, L., and Strosnider, J. K., 1995, "The deferrable server algorithm for enhanced aperiodic responsiveness in hard real-time environments," IEEE Trans. On Computers, vol. 44, do not compute latest start times for uncompleted processes, do not consider pre-run-time schedules, or release times or precedence relations. The article by Sprunt, B., Sha, L., and Lehoczky, J. P., 1989, "Aperiodic process scheduling for hard real-time systems," Journal of Real-Time Systems, vol. 1, presents the Sporadic Server algorithm, which utilizes spare processor capacity to service sporadic processes, but does not compute latest start times for uncompleted processes, does not consider pre-run-time schedules, or release times or precedence relations. The article by Koren, G., and Shasha, D., 1995, "Dover: an optimal on-line scheduling algorithm for overloaded uniprocessor real-time systems," SIAM Journal on Computing, Vol. 24, presents an on-line scheduling algorithm for overloaded systems, but it does not compute latest start times for uncompleted processes, does not consider pre-run-time schedules, and the algorithm is only applicable to completely unrelated processes. The article by Lin, C., and Brandt, S. A., 2005, "Improving soft real-time performance through better slack reclaiming," Proc. 26th IEEE Real-Time Systems Symposium, introduces slack reclaiming algorithms, but does not compute latest start times for uncompleted processes, does not consider pre-run-time schedules; the algorithms only consider soft real-time processes, and do not guarantee that deadlines of real-time processes will not be missed.

None of the prior art, including U.S. Pat. No. 8,321,065, to Kirchhof-Falter, U.S. Pat. No. 6,085,218, to Carmon, U.S. Pat. No. 7,613,595 to MacLay, U.S. Pat. No. 6,189,022 to Binns, U.S. Pat. No. 7,302,685 to Binns, et al., U.S. Pat. No. 7,140,022 to Binns, U.S. Pat. No. 6,964,048 to Isham, U.S. Patent Application No. 20020138542 by Bollella, U.S. Patent Application No. 20090013322 by MacLay, U.S. Patent Application No. 20060200795 by MacLay; consider using a pre-run-time schedule. Furthermore, none of them are capable of simultaneously satisfying various important constraints and dependencies, such as release times, offsets, precedence relations, and exclusion relations with other processes, while effectively handling underruns and overruns.

INVENTOR DISCLOSURES

Disclosures of embodiments of the invention have been made by the inventor in the following publication. The following publication is hereby incorporated by reference.

J. Xu, "Handling overruns and underruns of real-time processes with precedence and exclusion relations using a pre-run-time schedule," 9th ASME/IEEE International Conference on Mechatronic and Embedded Systems and Applications, Portland, Oreg., Aug. 4-7, 2013.

SUMMARY

An embodiment provides a system and method that allows process overruns while guaranteeing satisfaction of various timing constraints when scheduling executions of real-time processes. A plurality of pre-run-scheduler methods with different characteristics and different advantages, compute a plurality of pre-run-time schedules with different characteristics and different advantages, and compute latest start times for uncompleted processes, where a latest start time is such that, if an uncompleted process does not start at its latest start time, then at least one of the predetermined constraints may not be satisfied. The timer is programmed to interrupt a currently executing process at times which may include at least one latest start time. A plurality of run-time schedulers may also modify or create new latest start time schedules and compute updated latest start times to take into account the most recent knowledge of changes in the states of the processes at run-time.

In accordance with another embodiment, latest-start-time schedules are created and information in the latest-start-time schedules are used by the run-time scheduler in order to exploit information known both before run-time and during run-time when scheduling process executions.

In accordance with another embodiment, the ordering of the process executions at run-time is determined by the ordering of the end times of the process time slots in a latest-start-time schedule.

In accordance with another embodiment, exclusion relations can be used to prevent simultaneous access to shared resources at run-time.

In accordance with another embodiment, any process that does not exclude a particular process is able to preempt that particular process at any appropriate time at run-time, which allows processes to have more room to overrun.

In accordance with another embodiment, precedence relations can be used to ensure the proper ordering of process executions at run-time.

In accordance with other embodiments, systems and methods compute a latest-start-time schedule for a set of periodic processes P with arbitrary precedence and exclusion relations defined on ordered pairs of processes in P, in which all time slots for the processes in the original pre-run-time schedule are shifted to the right as far as possible while still satisfying the original precedence and exclusion relations. The latest start times of uncompleted processes are determined by the start times of processes in the latest-start-time schedule.

In accordance with another embodiment, a run-time scheduling system and method, uses a pre-run-time schedule that satisfies all the previously mentioned constraints, including precedence and exclusion relations between the processes. The run-time scheduler is invoked to perform a scheduling action during the following main situations:

(a) At a time t when some asynchronous process a has arrived and made a request for execution.

(b) At a time t when some process x has just completed its computation.

(c) At a time t that is equal to the latest start time $LS(p_j)$ of a process $p_j$ that is earliest among all latest start times $LS(p_i)$ for all uncompleted processes $p_i$.

(d) At a time t that is equal to the release time $R_{p_k}$ of a process $p_k$ that has not started execution when there does not exist any process $p_j$ that is currently running, that is, has started but not completed.

(e) At a time t that is equal to the deadline $d_{p_i}$ of an uncompleted process $p_i$. (In this case, $p_i$ has just missed its deadline, and the system should handle the error.)

In situation (a) above, the run-time scheduler is invoked by an interrupt handler responsible for servicing requests generated by an asynchronous process.

In situation (b) above, the run-time scheduler is usually invoked by a kernel function responsible for handling process completions.

In situations (c), (d), and (e) above, the run-time scheduler is invoked by programming the timer to interrupt at the appropriate time.

In accordance with another embodiment, a run-time scheduling system and method, uses a pre-run-time schedule that satisfies all the previously mentioned constraints, including precedence and exclusion relations between the processes. The run-time scheduler is invoked to perform a scheduling action during the following main situations:

(a) At a time t when some asynchronous process a has arrived and made a request for execution.

(b) At a time t when some process x has just completed its computation.

(c) At a time t that is equal to the latest start time $LS(p_j)$ of a process $p_j$ that is earliest among all latest start times $LS(p_j)$ for all uncompleted processes $p_j$.

(d) At a time t that is equal to the release time $R_{p_k}$ of a process $p_k$ that has not started execution when there does not exist any process $p_i$ that is currently running, that is, has started but not completed.

(e) At a time t that is equal to the deadline $d_{p_i}$ of an uncompleted process $p_i$. (In this case, $p_i$ has just missed its deadline, and the system should handle the error.)

(f) At a time t when some process p has overrun, that is, its remaining computation time is not greater than zero, and p has not yet completed its computation.

In situation (a) above, the run-time scheduler is invoked by an interrupt handler responsible for servicing requests generated by an asynchronous process.

In situation (b) above, the run-time scheduler is usually invoked by a kernel function responsible for handling process completions.

In situations (c), (d), (e) and (f) above, the run-time scheduler is invoked by programming the timer to interrupt at the appropriate time.

In accordance with another embodiment, an alternative procedure can be used to re-compute, at run-time, using a very short amount of time, the latest start time LS(p) of an uncompleted process p that has not overrun, when given a most recent latest-start-time schedule.

ADVANTAGES

An embodiment which allows processes, when necessary, to be able to overrun, while still guaranteeing the satisfaction of various timing constraints, reduces the chances of process or system failure, thereby providing the capability to significantly increase both system utilization and system robustness in the presence of inaccurate estimates of the worst-case computation times of real-time processes.

In other embodiments, latest start times for uncompleted processes can be efficiently up-dated, to allow processes to be able to overrun for longer amounts of time, based on the most recent knowledge of changes in the states of the processes at run-time, while guaranteeing the satisfaction of all the previously mentioned constraints, including precedence and exclusion relations between the processes.

In another embodiment, the ordering of the process executions at run-time is determined by the ordering of the end times of the process time slots in a pre-run-time schedule. This greatly reduces the amount of work that the run-time scheduler needs to do, which reduces system overhead.

In accordance with another embodiment, exclusion relations can be used to prevent simultaneous access to shared resources at run-time. This allows one to avoid using complex synchronization mechanisms, which significantly reduces system complexity. This makes it much easier to verify system correctness, and makes it much easier to debug the system.

In accordance with another embodiment, any process that does not exclude a particular process is able to preempt that particular process at any appropriate time at run-time, which allows processes to have more room to overrun. This in turn increase both system utilization and system robustness in the presence of inaccurate estimates of the worst-case computation times of real-time processes.

In accordance with another embodiment, precedence relations can be used to ensure the proper ordering of process executions at run-time. Many processes in real-world applications have precedence constraints in the form of producer-consumer relationships, Thus the embodiments overcome a common weakness of priority scheduling methods-priority scheduling methods in general are incapable of ensuring the proper ordering of process executions at run-time.

In accordance with another embodiment, a system and methods create a plurality of different latest-start-time schedules with different characteristics and different advantages, and using the information in the latest-start-time schedule to schedule the executions of both periodic and asynchronous real-time processes with hard or soft deadlines, with different a priori knowledge of the process characteristics, and with constraints and dependencies, such as offsets, release times, precedence relations, and exclusion relations, exploits to a maximum extent any knowledge about processes' characteristics that are available to the scheduler both before run-time and during run-time. This allows the scheduler to:

(a) effectively handle complex application constraints and dependencies between the real-time processes;

(b) minimize run-time overhead;

(c) make the most efficient use of available processor capacity;

(d) maximize the chances of satisfying all the timing constraints;

(e) provide firm and tight response time guarantees for all the processes whose characteristics are known before run-time; and (f) make it easier to verify that all timing constraints and dependencies will always be satisfied.

In accordance with another embodiment, an alternative procedure can be used to re-compute, at run-time, using a very short amount of time, the latest start time LS(p) of an uncompleted process p that has not overrun, when given a most recent latest-start-time schedule. This provides flexibility to minimize system overhead at run-time when time is critical.

DRAWINGS

Figures

FIGS. 1A, 1B and 1C are flowchart diagrams showing an embodiment of a procedure for computing the latest start times of each process given a pre-run-time schedule.

FIGS. 2A, 2B, 2C, 2D, 2E, 2F, 2G, and 2H are flowchart diagrams showing an embodiment of a run-time scheduler method for scheduling process executions during run-time given a latest-start-time schedule.

Figure 5A:
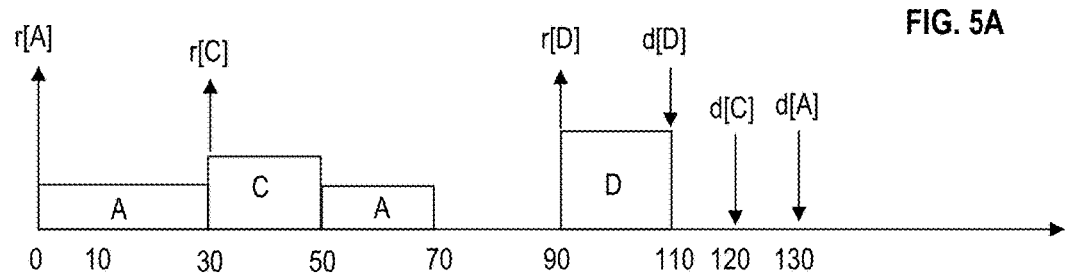
FIG. 5A is another example of a feasible pre-run-time schedule.
Figure 5B:
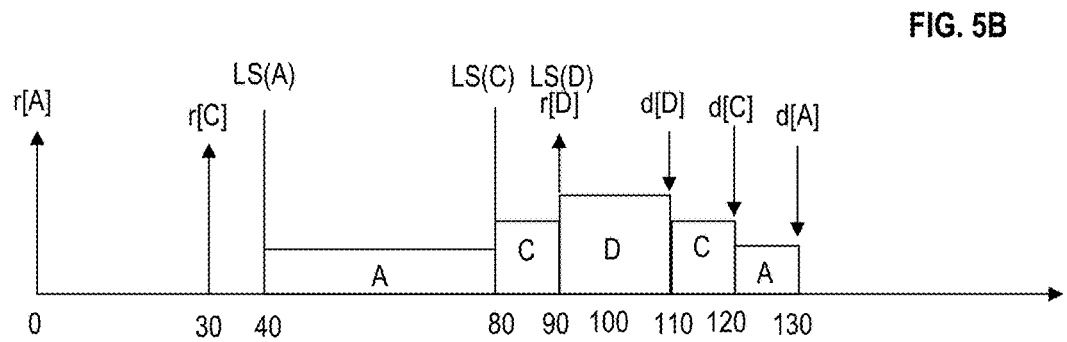
FIG. 5B is an example of a latest-start-time schedule computed by a Time Slot Right Shift Procedure from the feasible pre-run-time schedule in FIG. 5A.
Figure 5C:
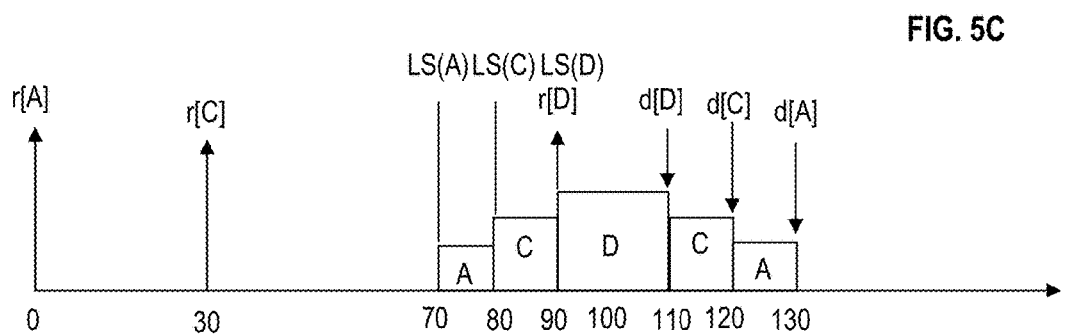
Figure 5D:
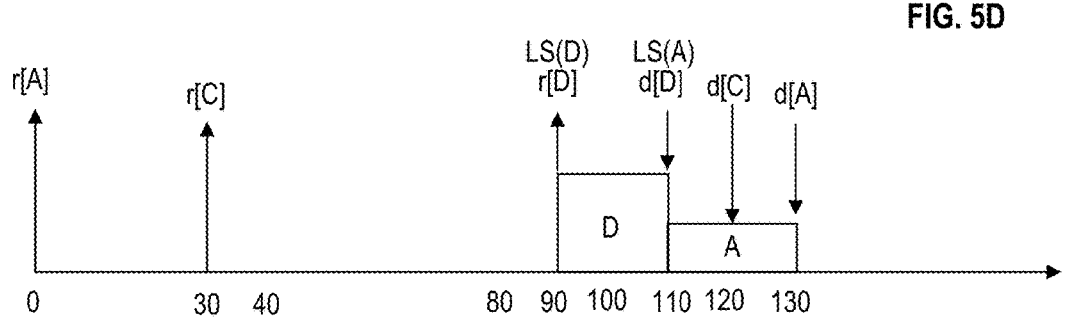

FIGS. 5C, and 5D are examples of latest-start-time schedules computed by a Time Slot Right Shift Procedure.

Figure 5E:
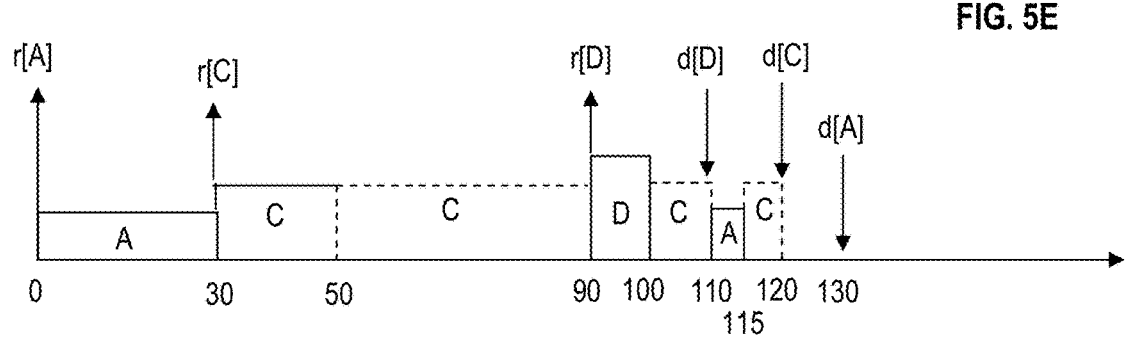

FIG. 5E is a timing diagram of a possible run-time execution of the processes scheduled by the run-time scheduler using the latest-start-time schedules in FIG. 5B, FIG. 5C, and FIG. 5D.

Figure 6A:
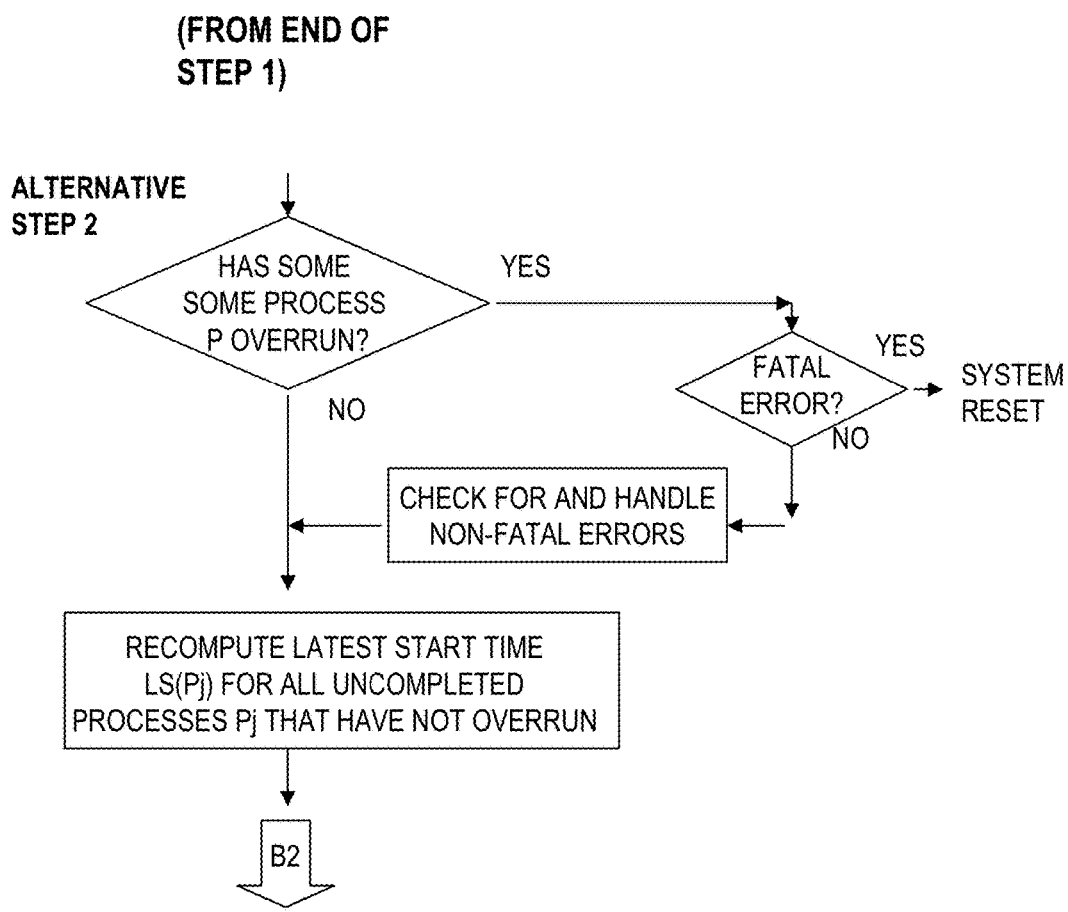
Figure 6B:
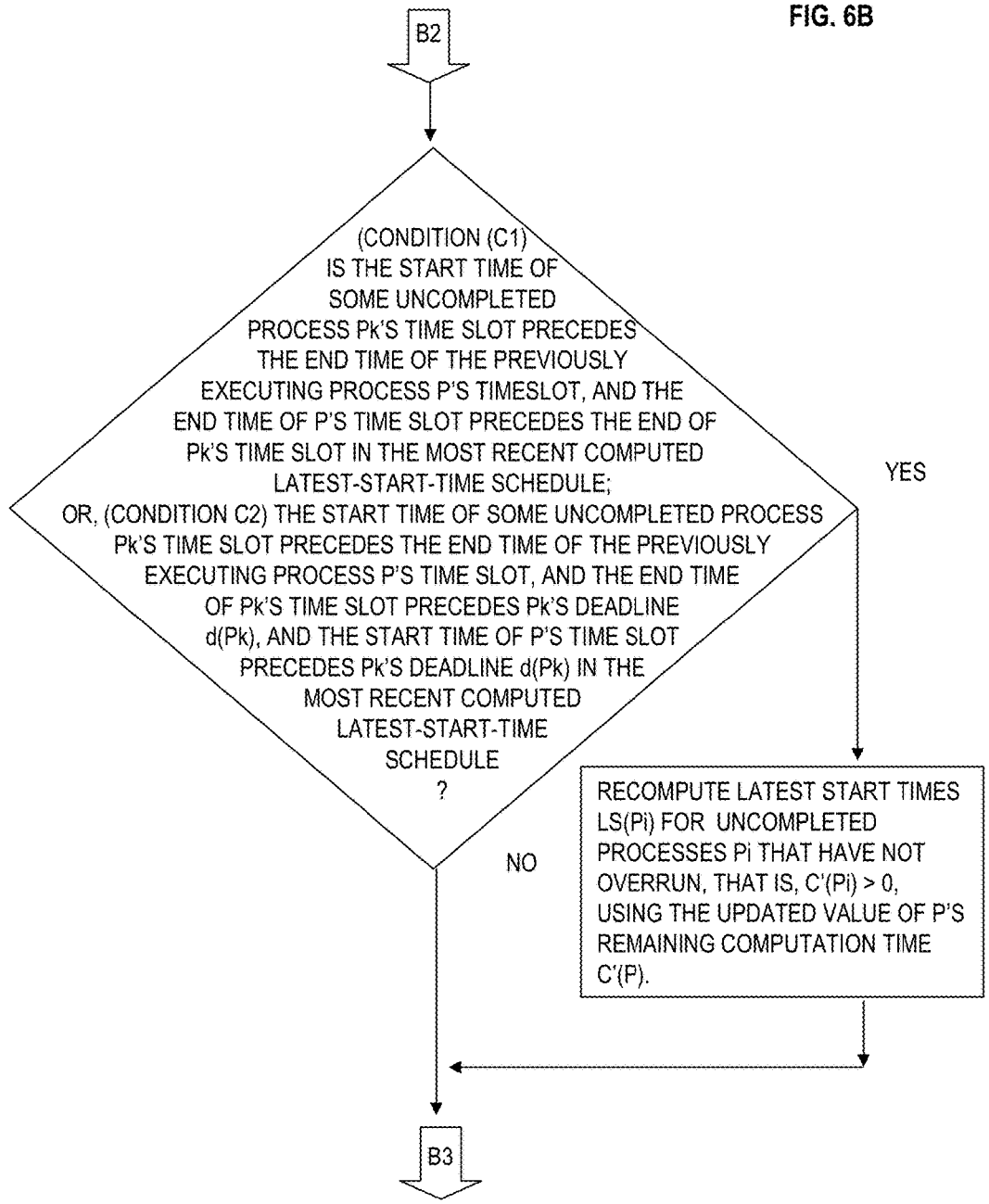
Figure 6C:
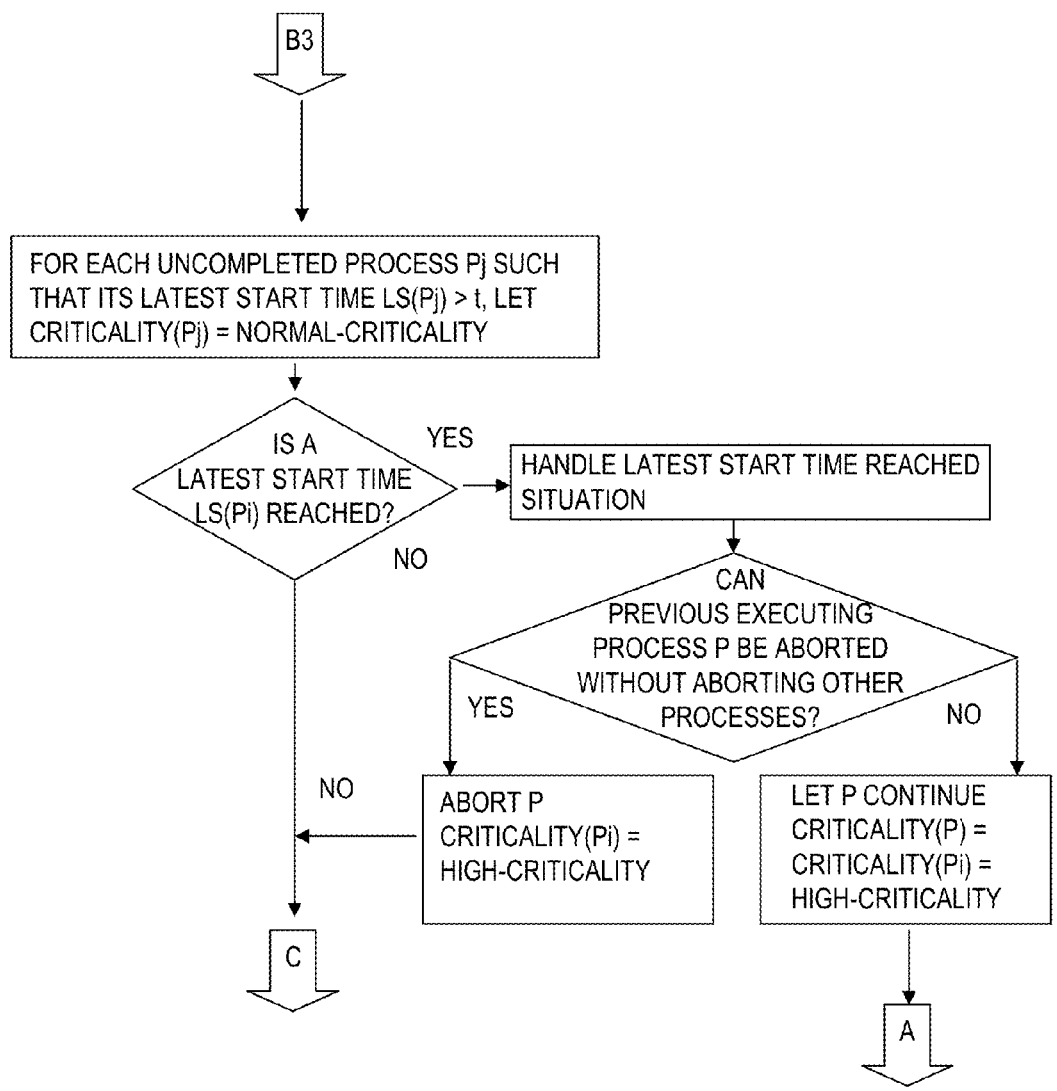

FIGS. 6A, 6B, and 6C are flowchart diagrams showing an alternative Step 2 of an alternative embodiment for a run-time scheduler method.

Figure 7:
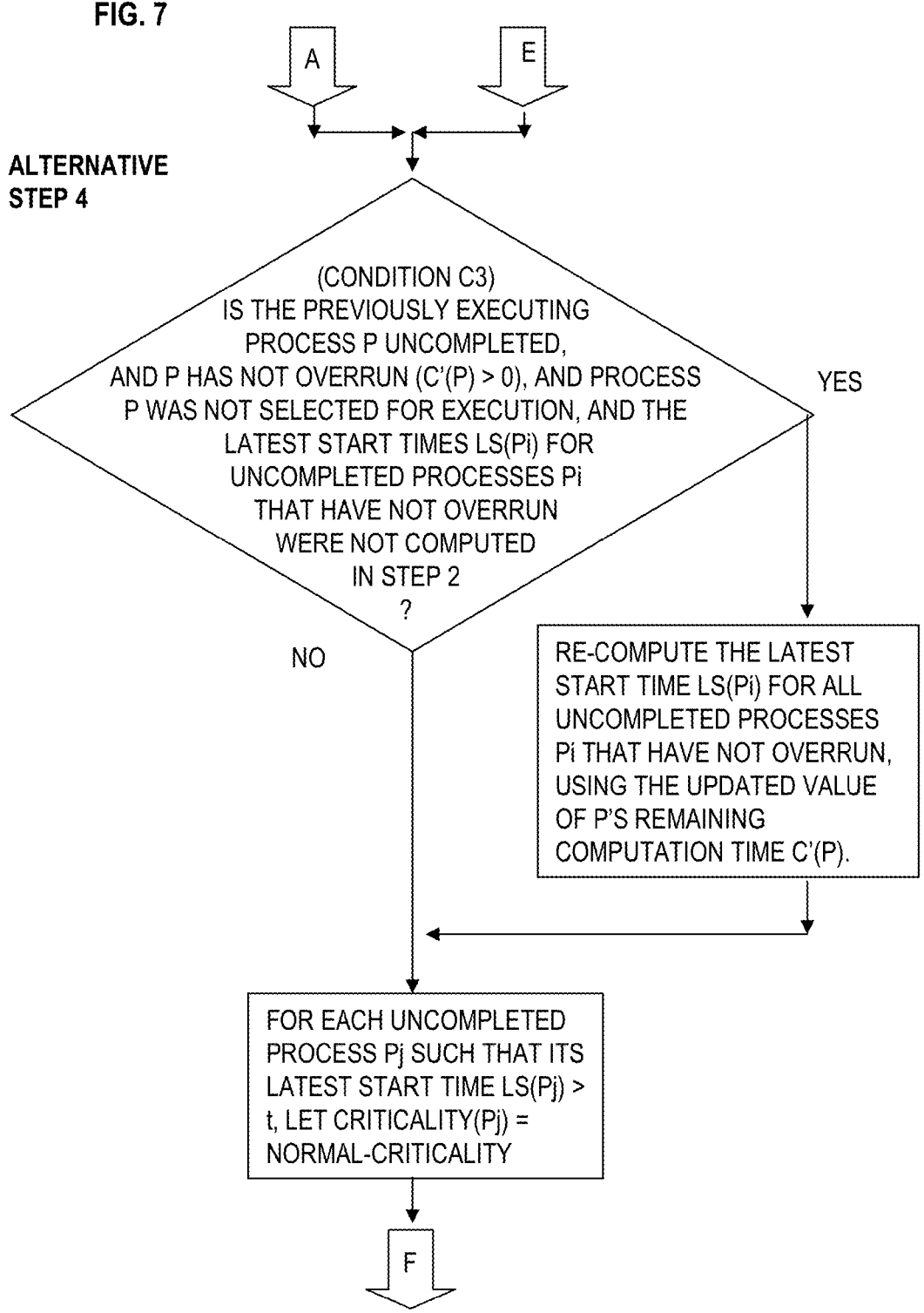

FIG. 7 is a flowchart diagram showing an alternative Step 4 of an alternative embodiment for a run-time scheduler method.

Figure 8A:
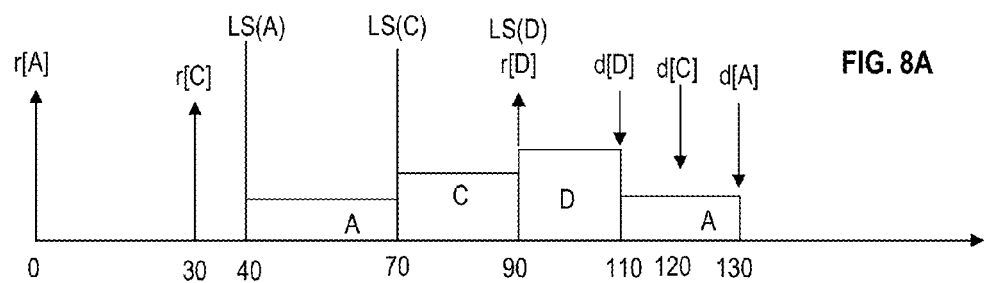

FIG. 8A is an example of a latest-start-time schedule computed by a Time Slot Right Shift Procedure from the feasible pre-run-time schedule in FIG. 5A, when the relation C EXCLUDES D is added.

Figure 8B:
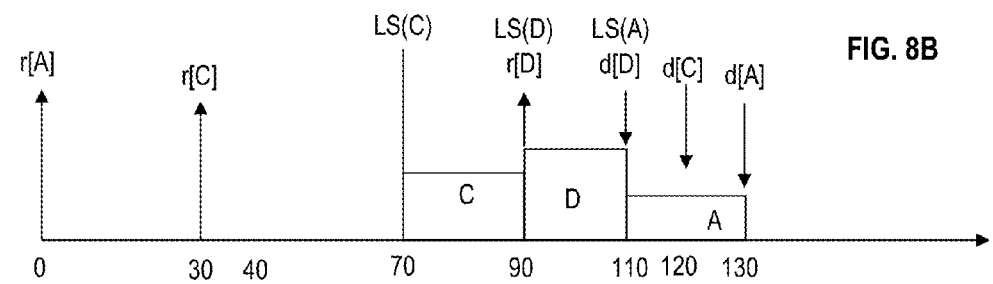

FIG. 8B is an example of a latest-start-time schedule computed by a Time Slot Right Shift Procedure.

Figure 8C:
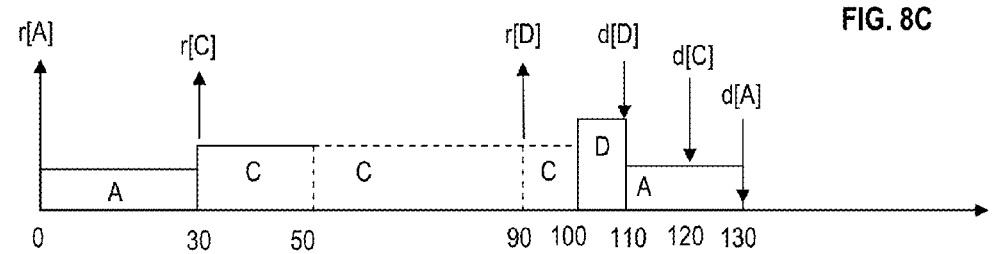

FIG. 8C is a timing diagram of a possible run-time execution of the processes scheduled by the run-time scheduler using the latest-start-time schedules in FIG. 8A, and FIG. 8B, when the relation C EXCLUDES D is added, if C is allowed to continue past LS(D).

FIG. 9 is a flowchart diagram showing an alternative Step 5 of an alternative embodiment for a run-time scheduler method.

Figure 10:
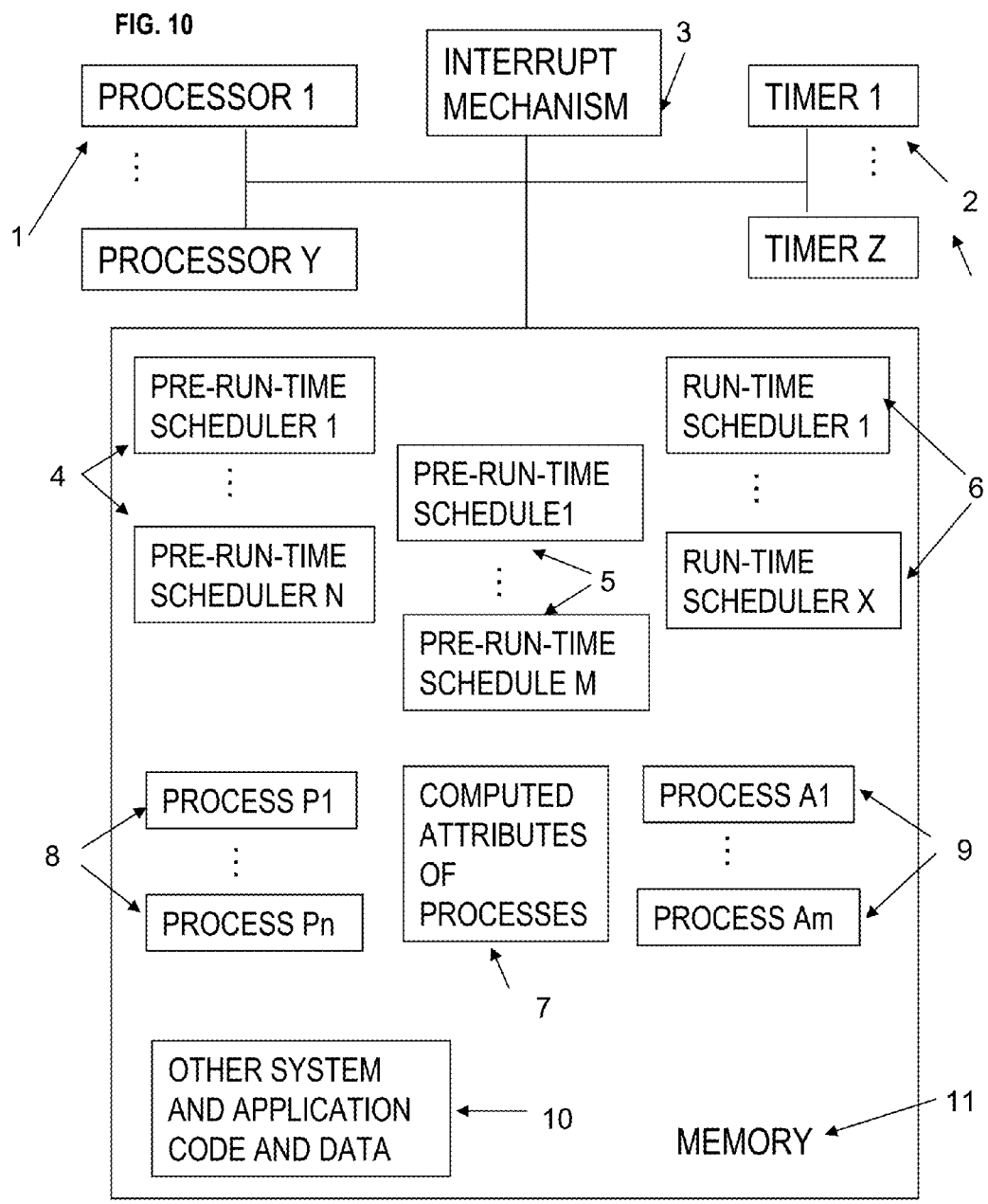

FIG. 10 is a block diagram showing various possible computer system components that various embodiments may involve, including processor(s), timer(s), interrupt mechanism, system and application code and data in memory, including run-time scheduler, pre-run-time scheduler, pre-run-time schedule, processes P1 to Pn, A1 to Am, and other possible system and application code and data.

Figure 11A:
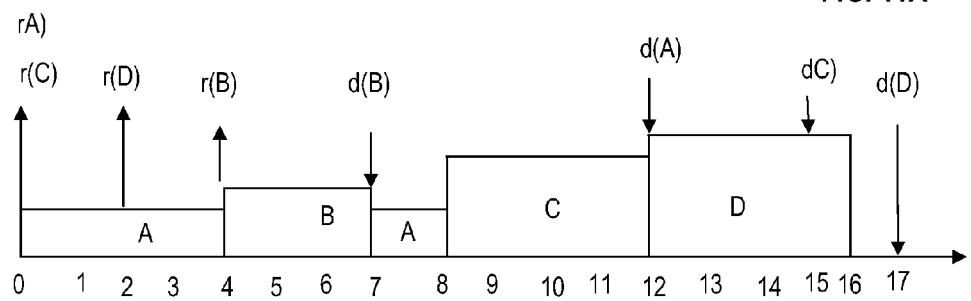

FIG. 11A is another example of a feasible pre-run-time schedule.

Figure 11B:
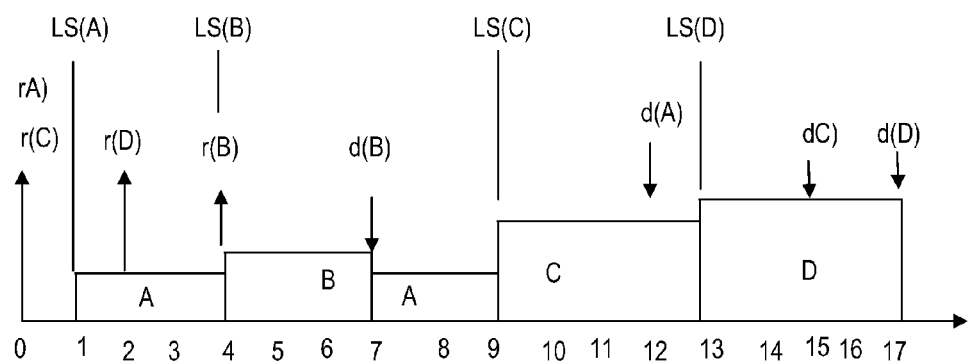

FIG. 11B is an example of a latest-start-time schedule computed by a Time Slot Right Shift Procedure from the feasible pre-run-time schedule in FIG. 11A.

Figure 11C:
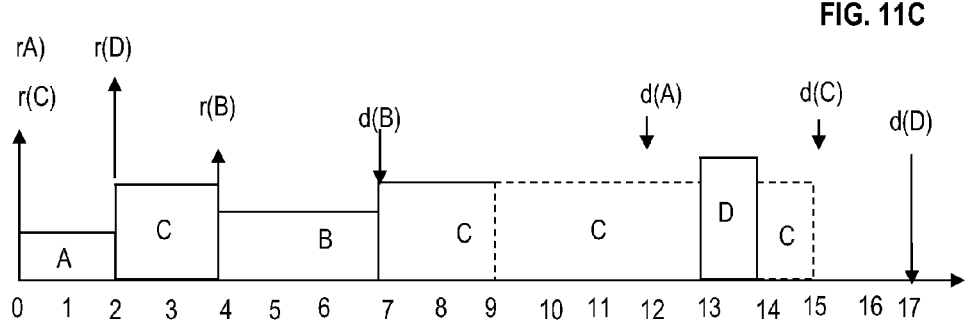

FIG. 11C is a timing diagram of a possible run-time execution of the processes scheduled by the run-time scheduler using the latest-start-time schedule in FIG. 11B.

Figure 12A:
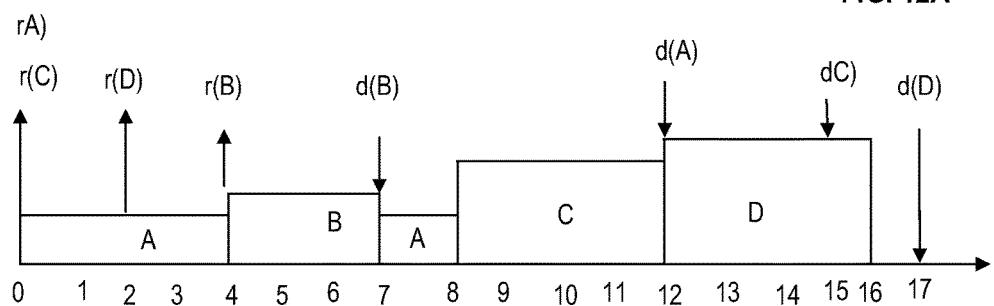

FIG. 12A is another example of a feasible pre-run-time schedule.

Figure 12B:
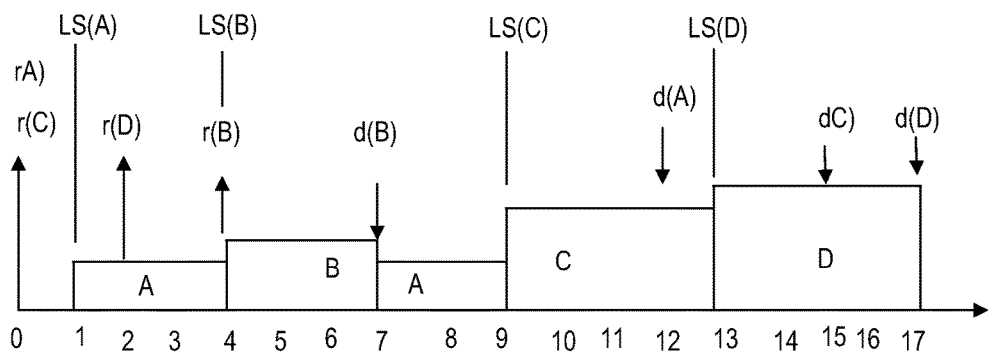

FIG. 12B is an example of a latest-start-time schedule computed by a Time Slot Right Shift Procedure from the feasible pre-run-time schedule in FIG. 12A.

Figure 12C:
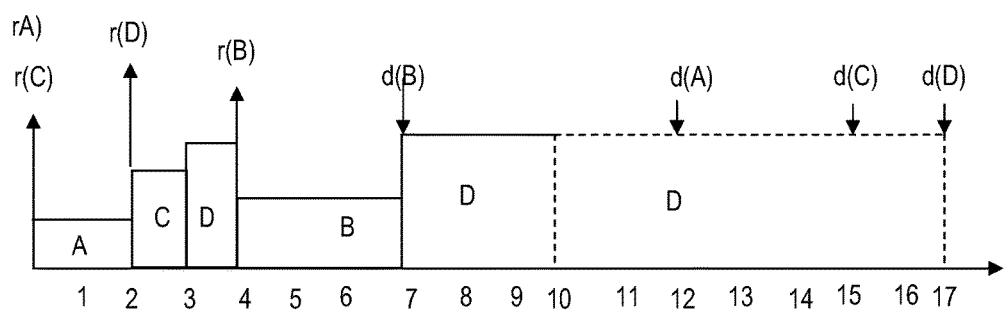

FIG. 12C is a timing diagram of a possible run-time execution of the processes scheduled by the run-time scheduler using the feasible pre-run-time schedule in FIG. 12B.

Figure 13A:
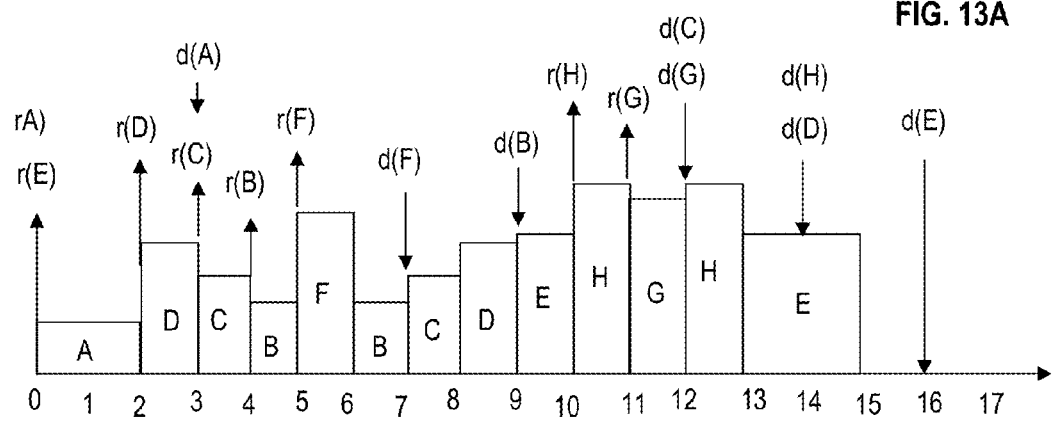

FIG. 13A is another example of a feasible pre-run-time schedule.

Figure 13B:
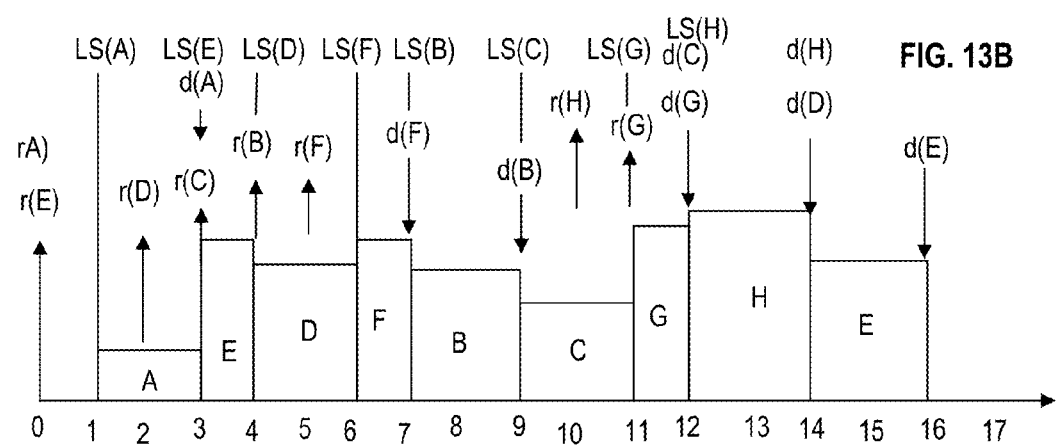

FIG. 13B is an example of a latest-start-time schedule computed by a Time Slot Right Shift Procedure from the feasible pre-run-time schedule in FIG. 13A.

Figure 13C:
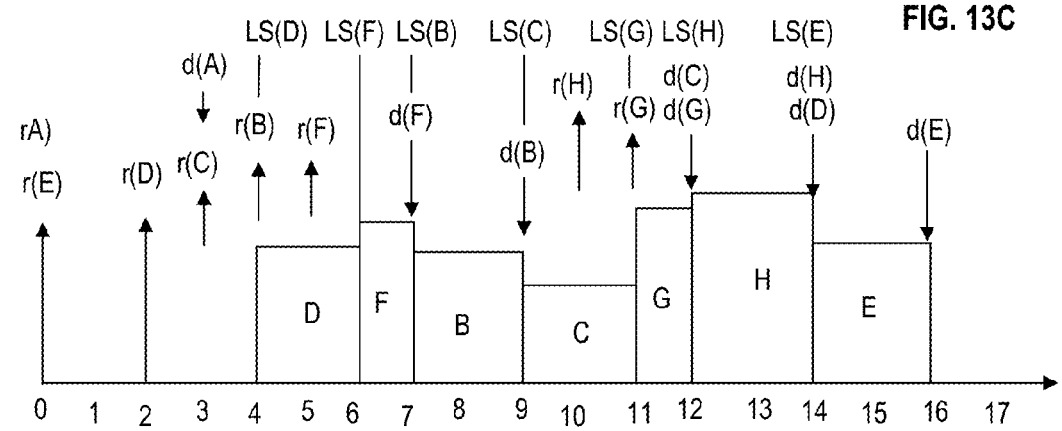
Figure 13D:
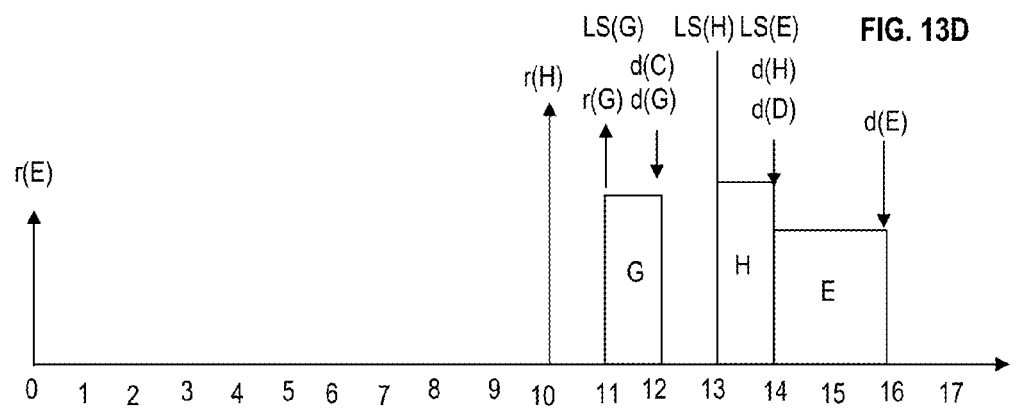

FIGS. 13C, and 13D are examples of latest-start-time schedules computed by a Time Slot Right Shift Procedure.

Figure 13E:
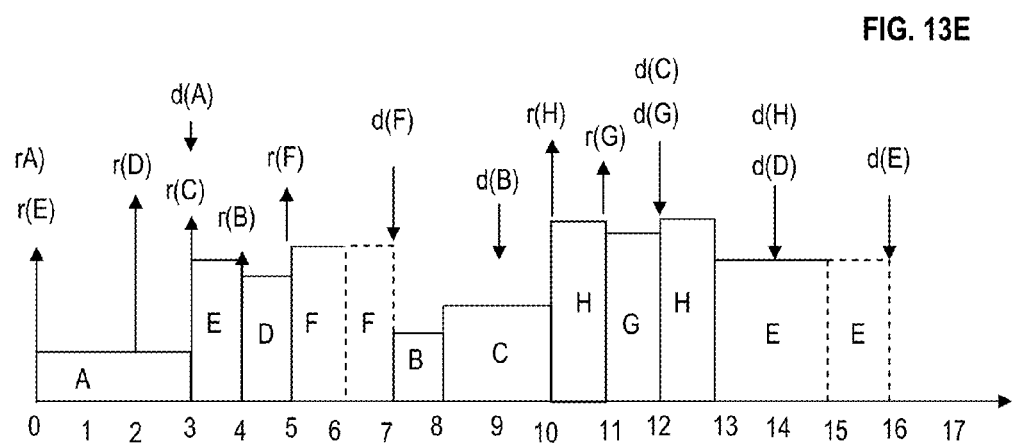

FIG. 13E is a timing diagram of a possible run-time execution of the processes scheduled by the run-time scheduler using the latest-start-time schedules in FIG. 13B, FIG. 13C, and FIG. 13D.

Figure 14A:
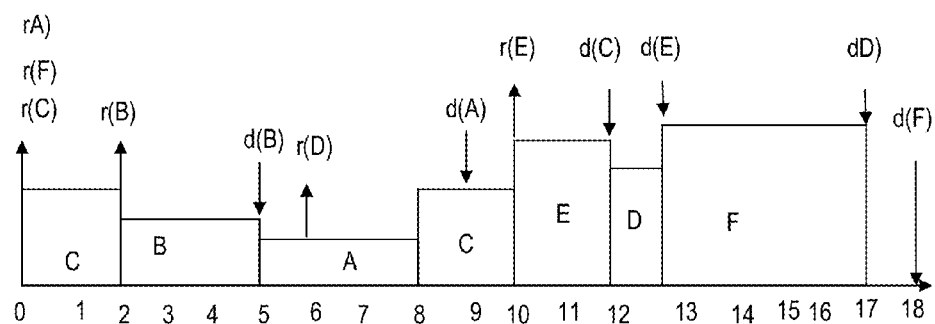

FIG. 14A is another example of a feasible pre-run-time schedule.

Figure 14B:
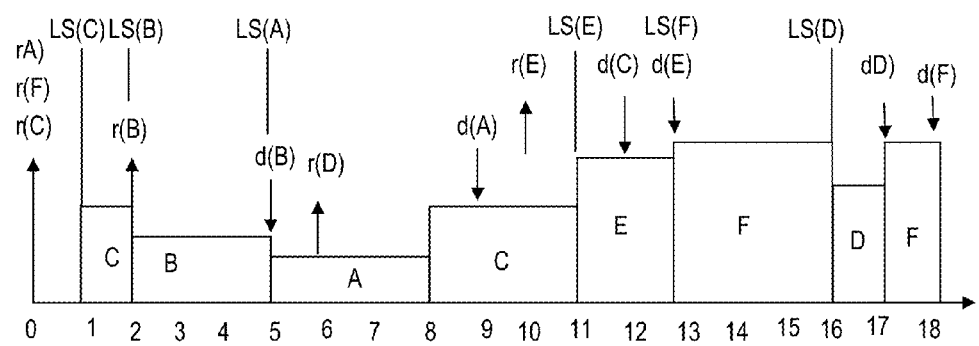

FIG. 14B is an example of a latest-start-time schedule computed by a Time Slot Right Shift Procedure from the feasible pre-run-time schedule in FIG. 14A.

Figure 14C:
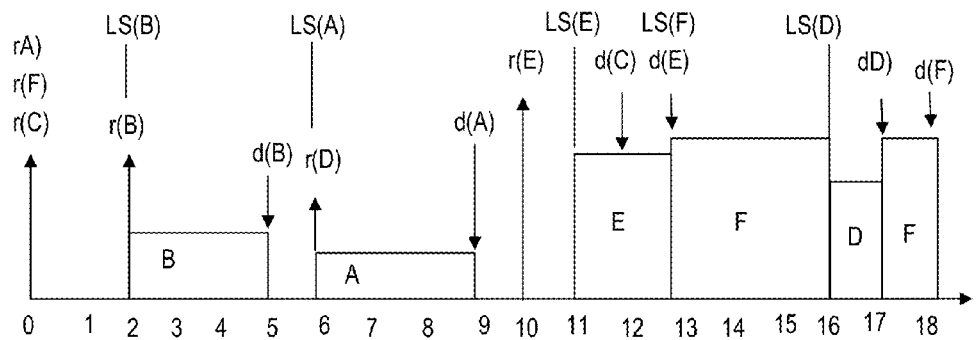

FIG. 14C is an example of a latest-start-time schedule computed by a Time Slot Right Shift Procedure.

Figure 14D:
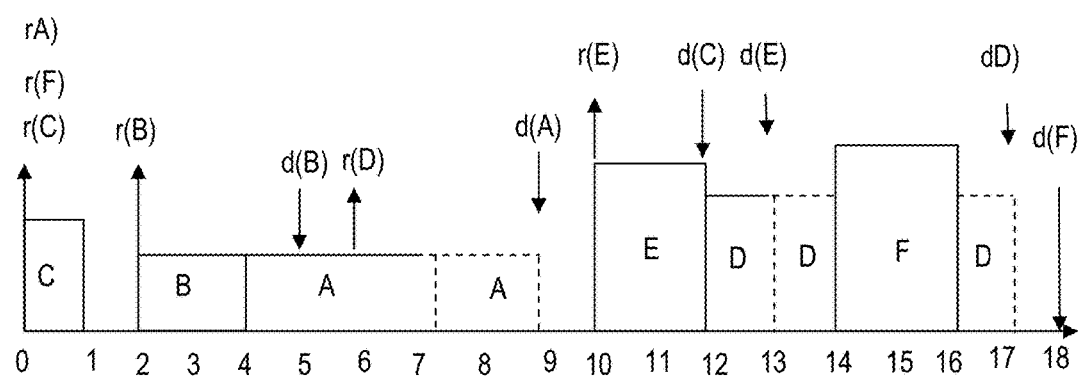

FIG. 14D is a timing diagram of a possible run-time execution of the processes scheduled by the run-time scheduler using the latest-start-time schedules in FIG. 14B, and FIG. 14C.

Figure 15:
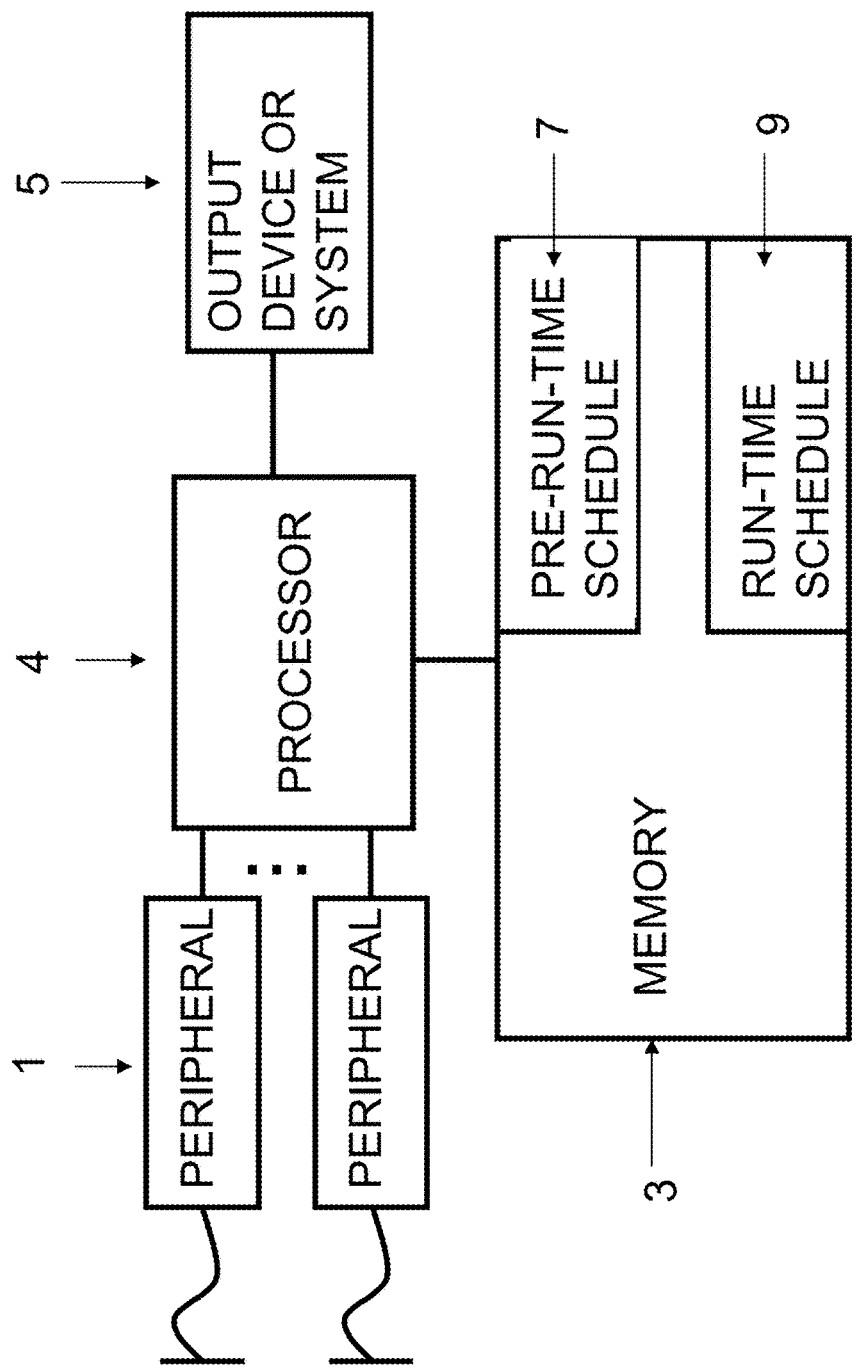

FIG. 15 is a block diagram showing various possible computer system components that various embodiments may involve.

Figure 16A:
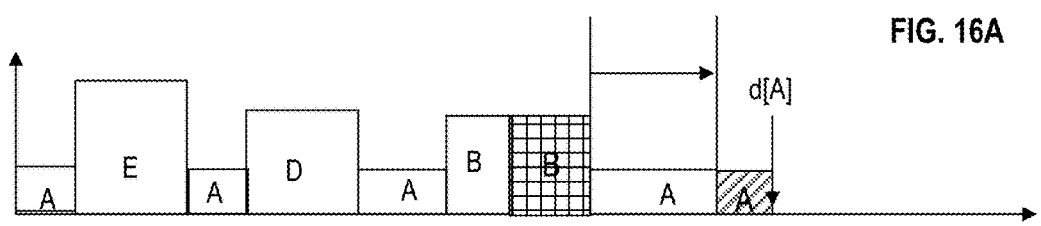
Figure 16B:
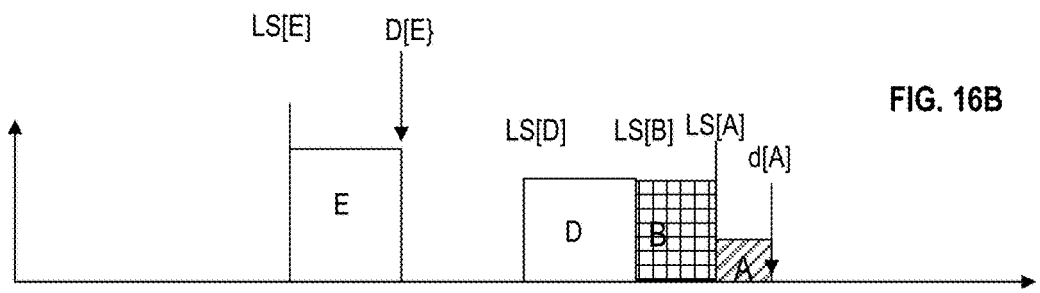
Figure 17A:
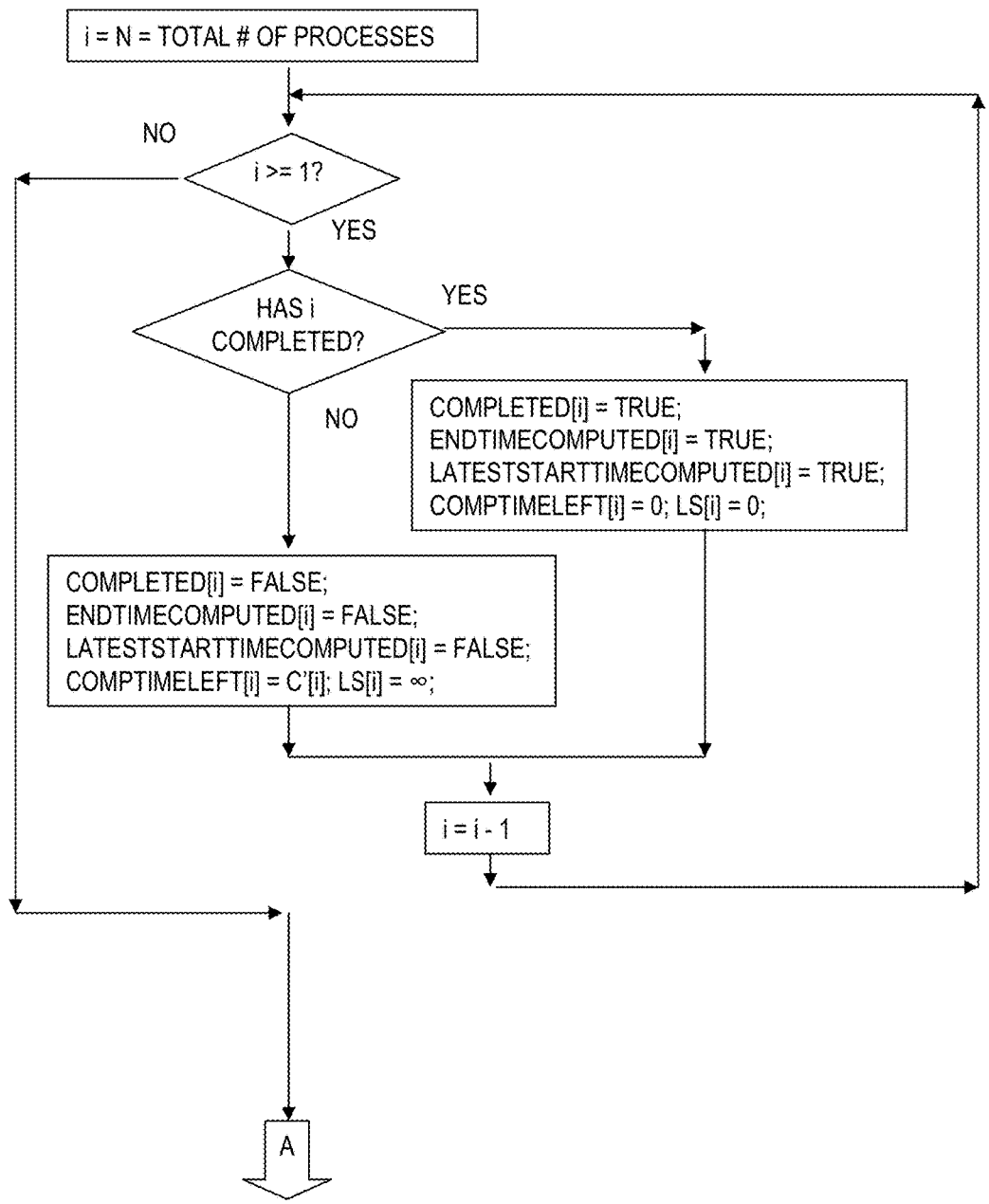
Figure 17B:
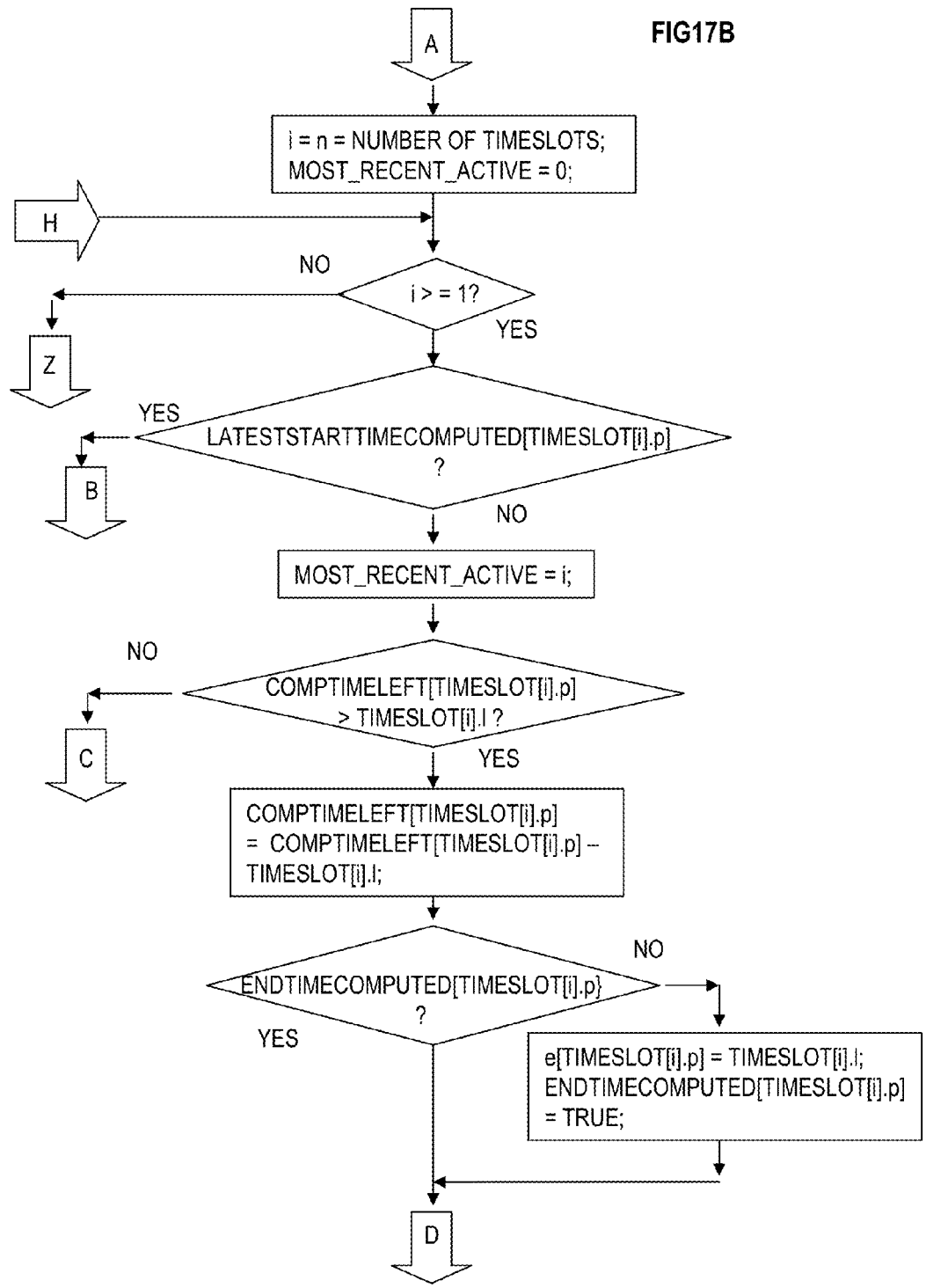
Figure 17C:
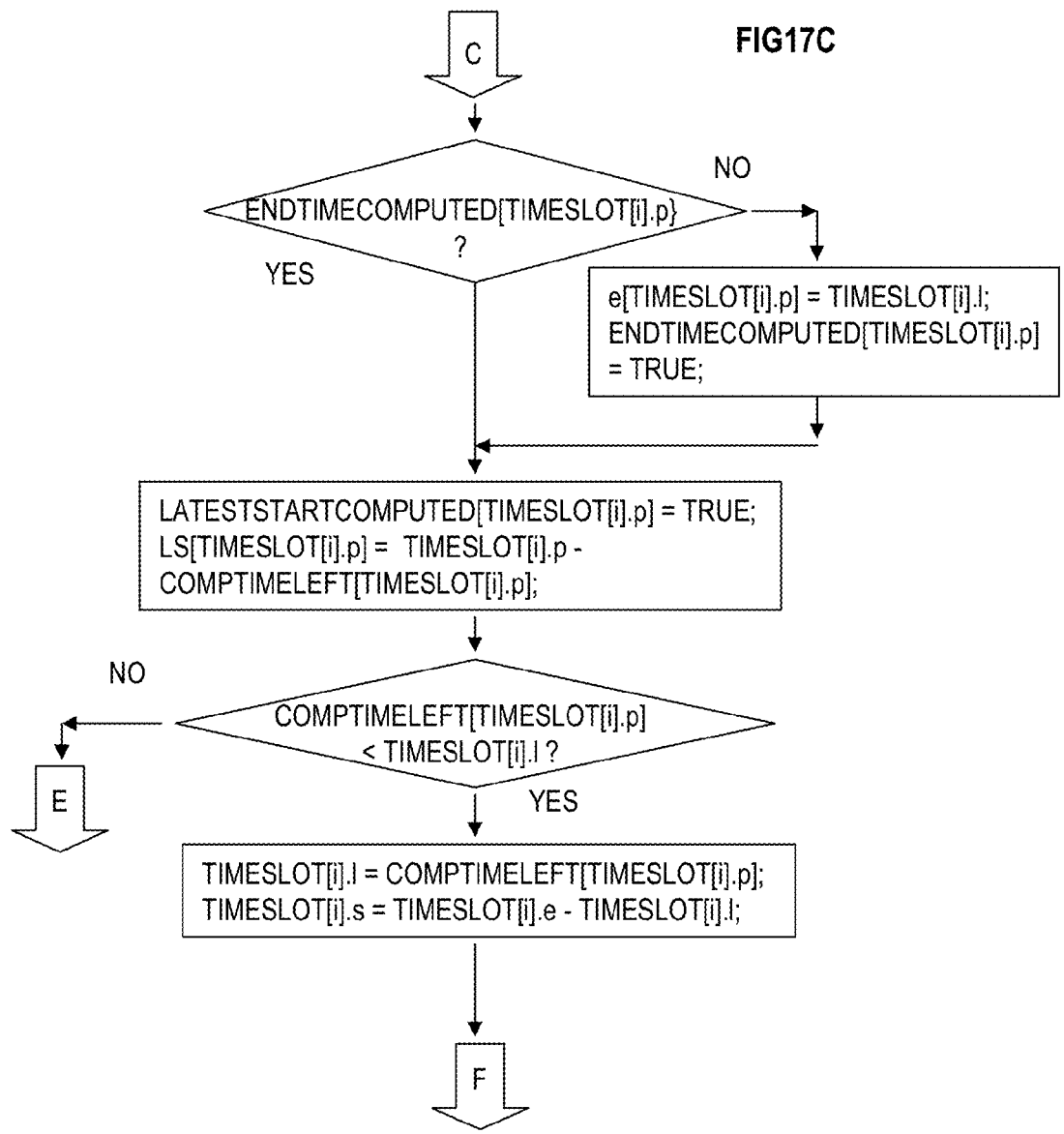

FIGS. 16A and 16B are timing diagrams that illustrate how the Third Time Slot Right Shift Procedure computes latest start times while modifying a pre-run-time schedule.

FIGS. 17A-17F are flowchart diagrams showing an embodiment of a Third Time Slot Right Shift Procedure for computing a latest-start-time schedule, and the latest start times, for a set of periodic processes with arbitrary precedence and exclusion relation given a pre-run-time schedule.

Figure 18A:
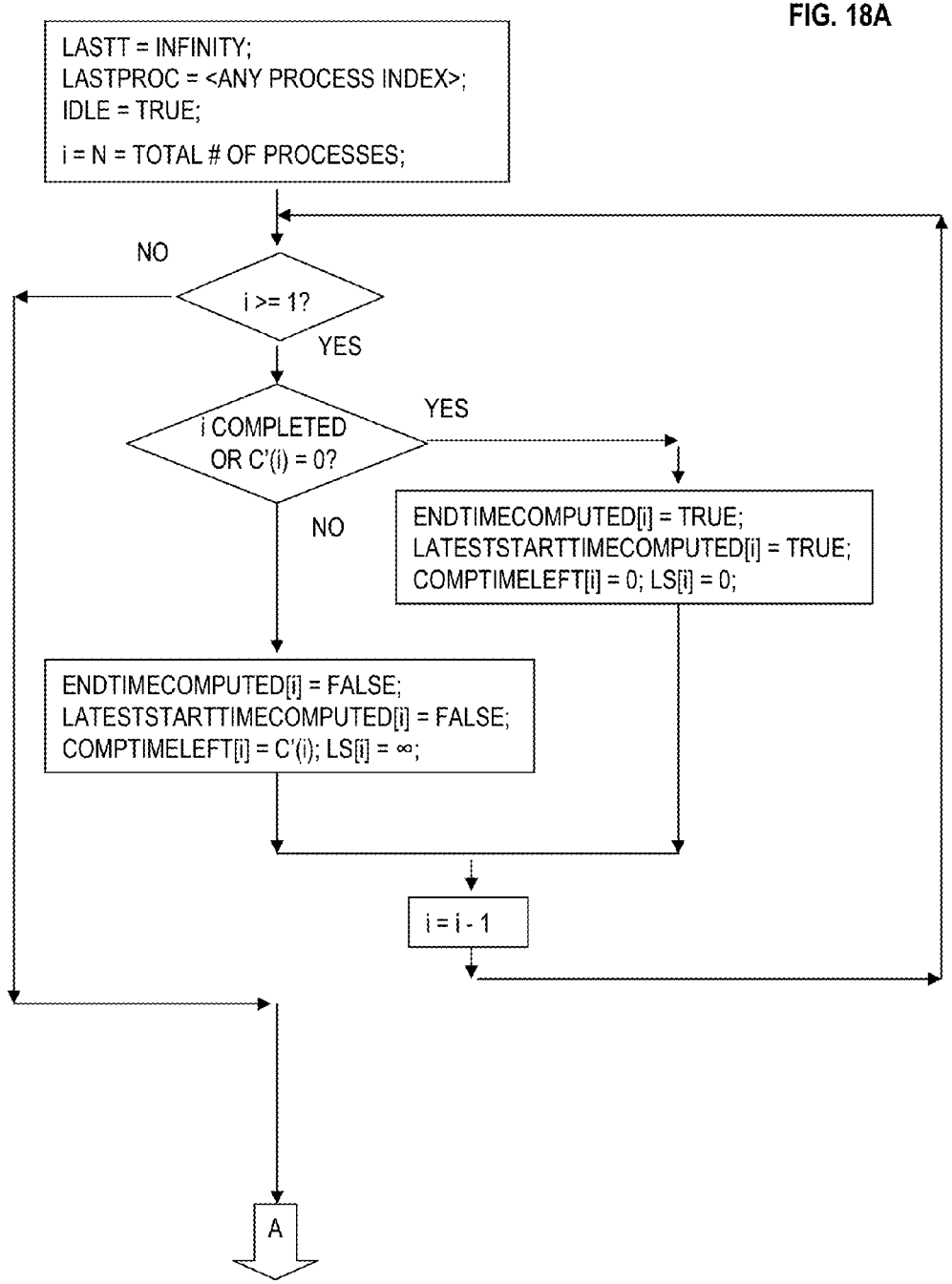
Figure 18B:
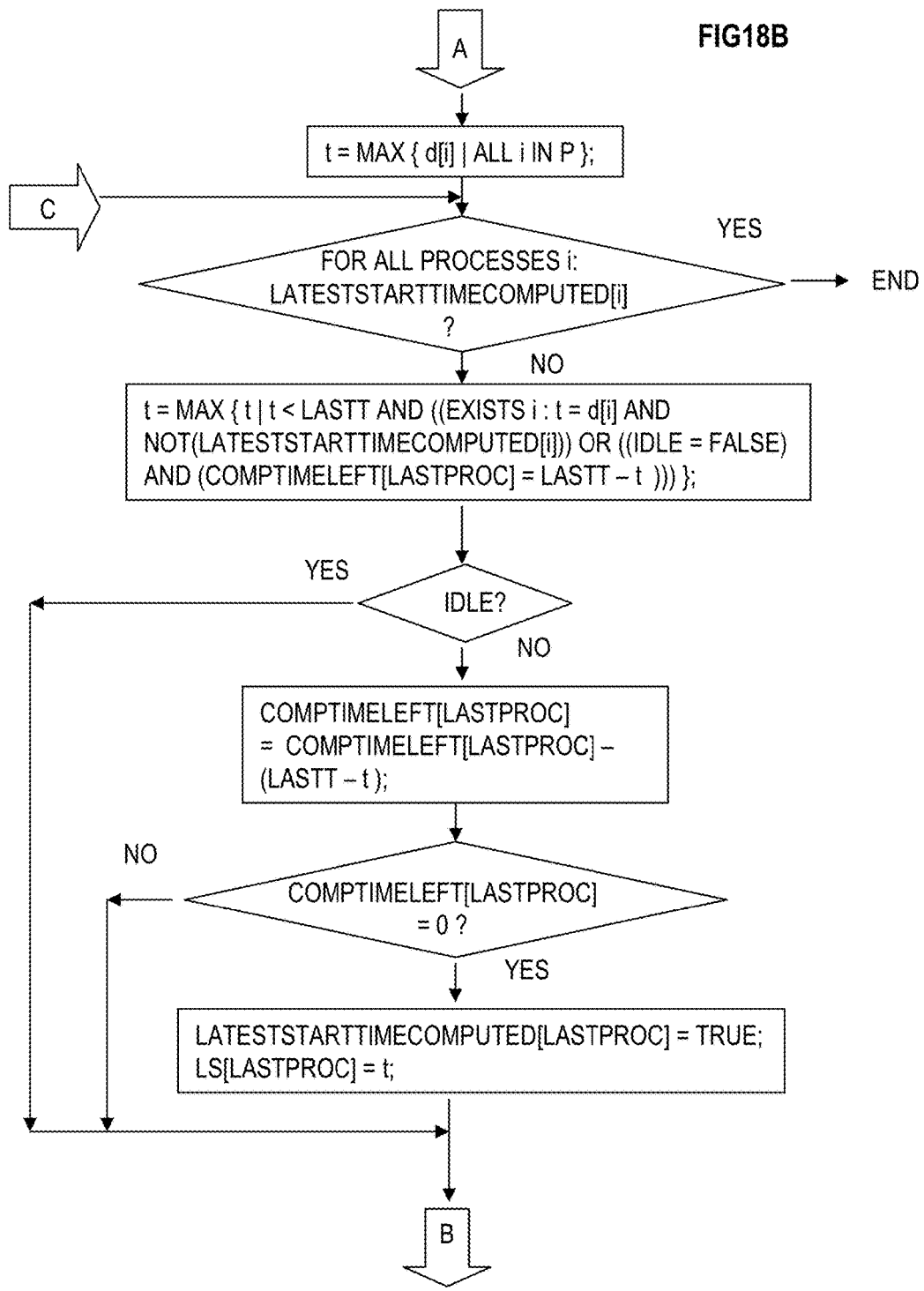
Figure 18C:
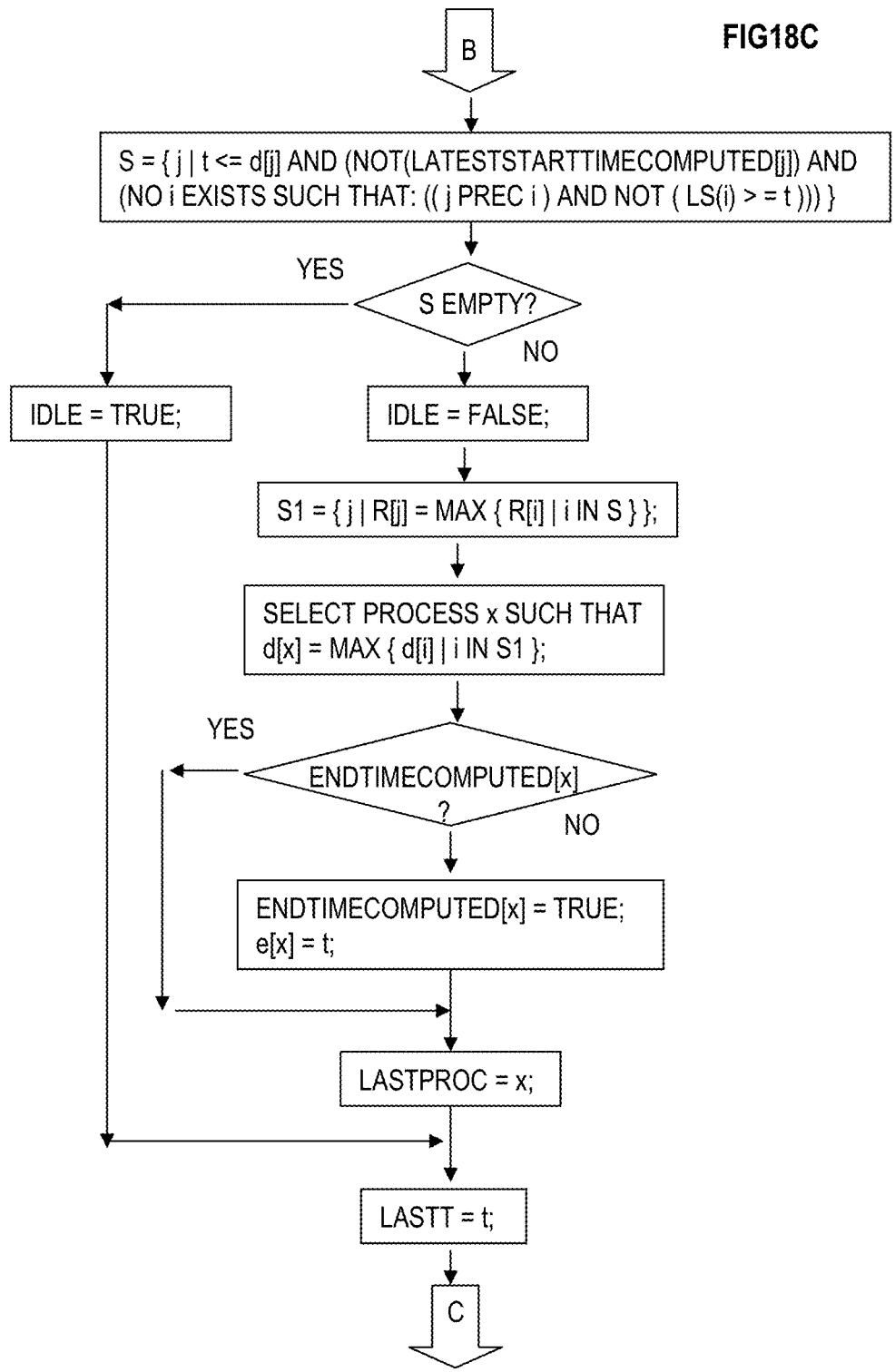

FIGS. 18A-18C are flowchart diagrams showing an embodiment of a Second Time Slot Right Shift Procedure for computing a latest-start-time schedule, and the latest start times, for a set of periodic processes with arbitrary precedence and exclusion relation given a pre-run-time schedule.

Figure 19A:
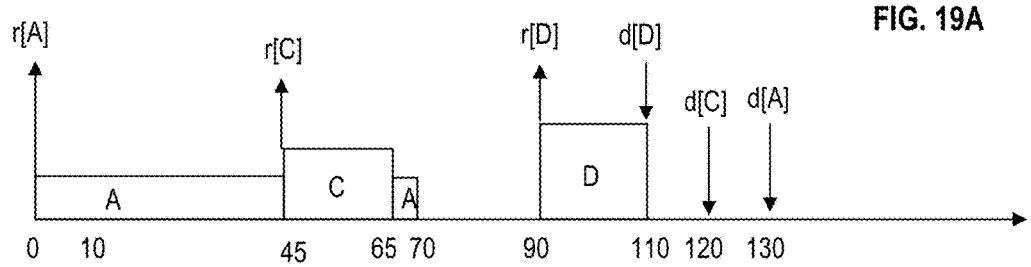

FIG. 19A is another example of a feasible pre-run-time schedule.

Figure 19B:
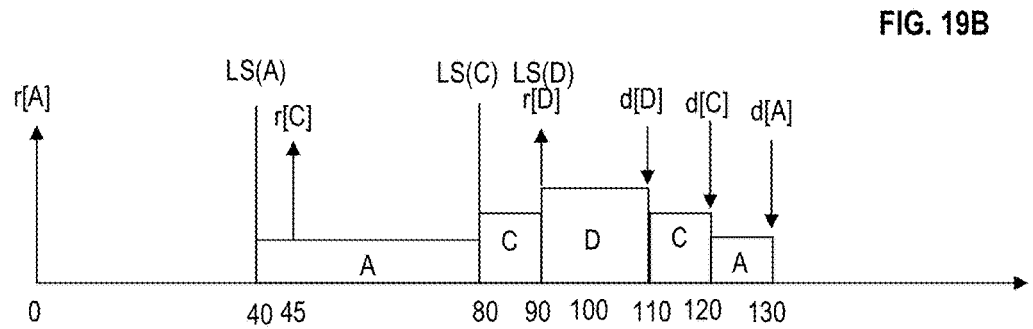

FIG. 19B is an example of a latest-start-time schedule computed by a Time Slot Right Shift Procedure from the feasible pre-run-time schedule in FIG. 19A.

Figure 19C:
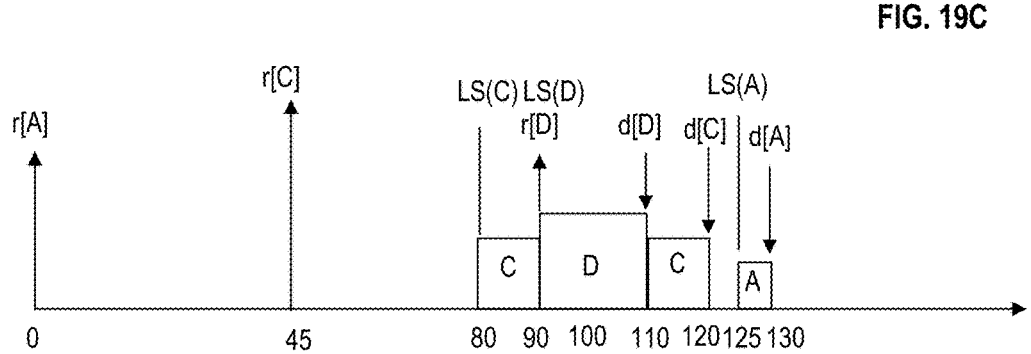

FIG. 19C is an example of a latest-start-time schedule computed by either a Time Slot Right Shift Procedure, or an embodiment of Procedure B for re-computing the latest start time LS(p) of an uncompleted process p that has not overrun when given a most recent latest-start-time schedule.

Figure 19D:
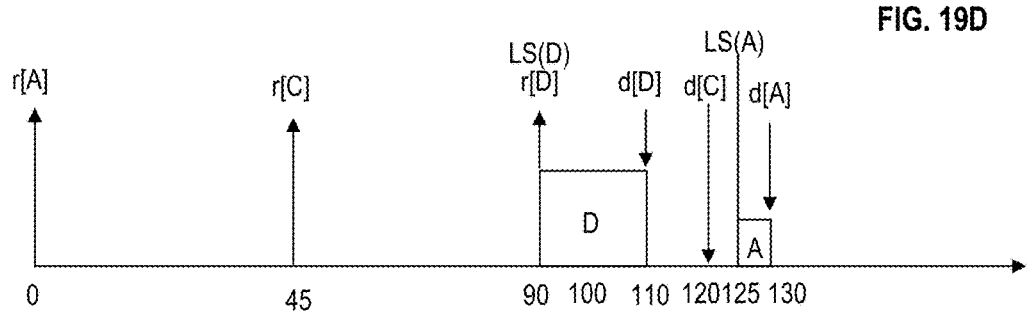

FIG. 19D is an example of a latest-start-time schedule computed by a Time Slot Right Shift Procedure.

Figure 19E:
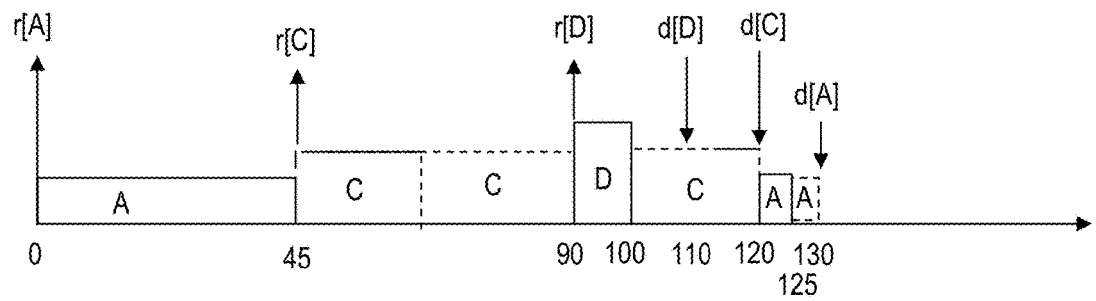

FIG. 19E is a timing diagram of a possible run-time execution of the processes scheduled by the run-time scheduler using the latest-start-time schedules in FIG. 19B, FIG. 19C, and FIG. 19D.

Figure 20:
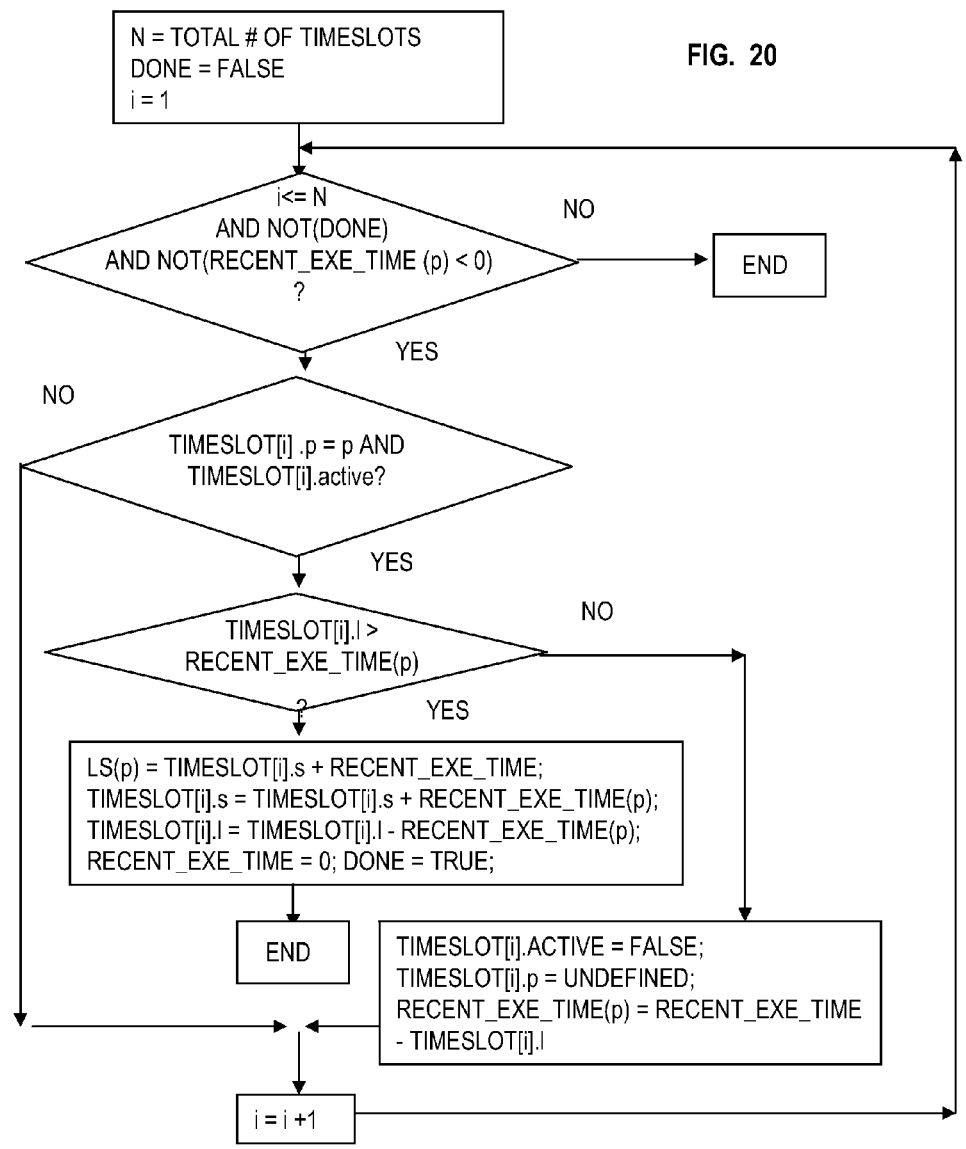

FIG. 20 is a flowchart diagram showing an embodiment of Alternative Procedure B for re-computing the latest start time LS(p) of an uncompleted process p that has not overrun when given a most recent latest-start-time schedule.

DESCRIPTION OF THE EMBODIMENTS

In the following detailed description of embodiments of the method, reference is made to the accompanying drawings which form a part hereof, and in which is shown by way of illustration specific embodiments in which the methods may be practiced. These embodiments are described in sufficient detail to enable those skilled in the art to practice the method, and it is to be understood that other embodiments may be utilized and that logical, mechanical, and electrical changes may be made without departing from the spirit and scope of the present methods. The following detailed description is, therefore, not to be taken in a limiting sense, and the scope of the present method is defined only by the appended claims.

Example embodiments will now be given which illustrate operation and advantages of the present method as compared with systems and methods that perform all scheduling activities at run-time. It should be noted that existing systems and methods that perform all scheduling activities at run-time are not able to guarantee the schedulability of the set of processes given in these examples. Some of the embodiments will be described in pseudocode, which is a shorthand form of English understandable to persons skilled in the field of this method.

Periodic Processes

A periodic process consists of a computation that is executed repeatedly, once in each fixed period of time. A typical use of periodic processes is to read sensor data and update the current state of internal variables and outputs.

A periodic process p can be described by a quintuple $(o_p, r_p, c_p, d_p, prd_p)$, wherein $prd_p$ is the period. $c_p$ is the worse case computation time required by process p, $d_p$ is the deadline, i.e., the duration of the time interval between the beginning of a period and the time by which an execution of process p must be completed in each period, $r_p$ is the release time, i.e., the duration of the time interval between the beginning of a period and the earliest time that an execution of process p can be started in each period, and $o_p$ is the offset, i.e., the duration of the time interval between the beginning of the first period and time 0.

When there exists flexibility in assigning an offset value for a periodic process, a permitted range of the offset, offsetlowerbound(p)$\leq o_p \leq$offsetupperbound(p), instead of one fixed offset, can be specified for that process. A single offset value constraint is a special case of a permitted range of offset constraint.

It is assumed that $o_p$, $r_p$, $c_p$, $d_p$, $prd_p$ as well as any other parameters expressed in time have integer values. A periodic process p can have an infinite number of periodic process executions $p_0, p_1, p_2, \ldots$, with one process execution for each period. For the ith process execution $p_i$ corresponding to the ith period, $p_i$'s release time is $r_{p_i} = o_p + r_p + prd_p \times (i-1)$; and $p_i$'s deadline is $d_{p_i} = o_p + d_p + prd_p \times (i-1)$.

Either uppercase letters or lowercase letters may be used to denote the release time and deadline respectively of a periodic process execution of some periodic process p.

It is noted that it is of common practice to include the system overhead in the computation time of the processes.

Reference is made to FIG. 11 and FIG. 12 in U.S. Pat. No. 7,444,638, and U.S. Pat. No. 7,165,252, for examples of periodic processes. FIG. 11 in U.S. Pat. No. 7,444,638, and U.S. Pat. No. 7,165,252, illustrates the periodic process $p_B = (o_{p_B}, r_{p_B}, c_{p_B}, d_{p_B}, prd_{p_B})$ where $r_{p_B} = 1$, $c_{p_B} = 3$, $d_{p_B} = 4$, $prd_{p_B} = 12$, $o_{p_B} = 0$. FIG. 12 in U.S. Pat. No. 7,444,638, and U.S. Pat. No. 7,165,252, illustrates the periodic process $p_D = (o_{p_C}, r_{p_C}, c_{p_C}, d_{p_C}, prd_{p_C})$ where $r_{p_C} = 0$, $c_{p_C} = 4$, $d_{p_C} = 4$, $prd_{p_C} = 12$, $o_{p_C} = 7$.

Asynchronous Processes

An example of an asynchronous process is one which consists of a computation that responds to internal or external events. A typical use of an asynchronous process is to respond to operator requests. Although the precise request times for executions of an asynchronous process a are not known in advance, usually the minimum amount of time between two consecutive requests $min_a$ is known in advance. An asynchronous process a can be described by a triple $(c_a, d_a, min_a)$. $c_a$ is the worse case computation time required by process a. $d_a$ is the deadline, i.e., the duration of the time interval between the time when a request is made for process a and the time by which an execution of process a must be completed. An asynchronous process a can have an infinite number of asynchronous process executions $a_0, a_1, a_2, \ldots$, with one process execution for each asynchronous request. For the ith asynchronous process execution $a_i$ which corresponds to the ith request, if $a_i$'s request (arrival) time is $R_{a_i}$, then $a_i$'s deadline is $D_{a_i} = R_{a_i} + d_a$.

Either uppercase letters or lowercase letters may be used to to denote the request (arrival) time and deadline respectively of an asynchronous process execution of some asynchronous process a.

Schedules

If a periodic process p or an asynchronous process a has a computation time of $c_p$ or $c_a$, then it is assumed that that process execution $p_i$ or $a_i$ is composed of $c_p$ or $c_a$ process execution units. Each processor is associated with a processor time axis starting from 0 and is divided into a sequence of processor time units.

A schedule is a mapping from a possibly infinite set of process execution units to a possibly infinite set of processor time units on one or more processor time axes. The number of processor time units between 0 and the processor time unit that is mapped to by the first unit in a process execution is called the start time of that process execution. The number of time units between 0 and the time unit subsequent to the processor time unit mapped to by the last unit in a process execution is called the completion time of that process execution. A feasible schedule is a schedule in which the start time of every process execution is greater than or equal to that process execution's release time or request time, and its completion time is less than or equal to that process execution's deadline.

Reference is made to FIGS. 4, 5, 6, 8, 11A, 12A, 13A, 14A in U.S. Pat. No. 7,444,638, and U.S. Pat. No. 7,165,252, which show examples of feasible schedules, wherein the horizontal axis is the time axis, and time period segments are separated by vertical lines which represent release times and deadlines.

It should be noted that, in order to avoid use in this specification of an exceedingly large number of repetitions of use of the word "executions of process", or "executions of process i", these terms have been in many places herein abbreviated to the word "process", or to simply"i". Thus whenever there is a reference to the term "process" as related to a schedule, the term "process", or "process i", or "i" when i is the name of a process should be understood as meaning "process execution" or "the execution of process i".

Process Segments

Each process p may consist of a finite sequence of segments $p(0), p(1), \ldots, p(n(p))$, where $p(0)$ is the first segment and $p(n(p))$ is the last segment in process p. Given the release time $r_p$, deadline $d_p$ of process p and the computation time of each segment $p[i]$ in process p, one can easily compute the release time and deadline for each segment, as described in the aforenoted 1993 article by Xu and Parnas.

Parallel computations can be represented by several processes, with various types of relations defined between individual segments belonging to different processes, and processes can be executed concurrently; thus requiring each process to be a sequence of segments does not pose any significant restrictions on the amount of parallelism that can be expressed.

Precedence and Exclusion Relations

Various types of relations such as precedence relations and exclusion relations may exist between ordered pairs of processes segments. A process segment i is said to precede another process segment j if j can only start execution after i has completed its computation. Precedence relations may exist between process segments when some process segments require information that is produced by other process segments.

A process segment i is said to exclude another process segment j if no execution of j can occur between the time that i starts its computation and the time that i completes its computation. Exclusion relations may exist between process segments when some process segments must prevent simultaneous access to shared resources such as data and I/O devices by other process segments.

Main Types of Processes

The main types of processes that are considered herein are the following:

Set P-h-k: Periodic processes with hard deadlines and known characteristics. Each such process may consist of one or more segments, with precedence relations defined on them to enforce the proper ordering of segments belonging to the same process. It is assumed that the following characteristics are known for each such process segment before run-time:
  period,
  worst-case execution time,
  release time,
  deadline,
  permitted range of the offset,
  the set of data that each segment reads and writes,
  any exclusion relationships with other process segments,
  any precedence relationships with other periodic process segments.

Set A-h-k: Asynchronous processes with hard deadlines and known characteristics. It is assumed that each such process consists of a single segment and the following are known for each such process before run-time:
  deadline,
  worst-case execution time,
  minimum time between two consecutive requests,
  the set of data that the process reads and writes,
  any exclusion relationships with other process segments.

Set P-s-k: Periodic processes with soft deadlines and known characteristics. Each such process consists of one or more segments, with precedence relations defined on them to enforce the proper ordering of segments belonging to the same process. It is assumed that the following are known for each such process before run-time:
  period,
  worst-case execution time,
  release time,
  deadline,
  permitted range of the offset,
  the set of data that the process reads and writes,
  any exclusion relationships with other process segments,
  any precedence relationships with other periodic process segments.

Set A-s-k: Asynchronous processes with soft deadlines and known characteristics. It is assumed that each such process consists of a single segment and the following are known for each such process before run-time:
  deadline,
  worst-case execution time,
  the set of data that the process reads and writes,
  any exclusion relationships with other process segments.

Set A-s-u: Asynchronous processes with soft deadlines and unknown characteristics. It is assumed that each such process consists of a single segment and nothing else is known about each such process before run-time.

In the following, as well as in the method described in the 1993 article by Xu and Parnas referred to above, it is assumed that the basic scheduling unit is a segment. The terms "segment" and "process will also be considered as having the same meaning.

Pre-Run-Time Phase

Pre-Run-Time Phase 1: Generation of a Feasible Pre-Run-Time Schedule

Embodiments of methods that can be used for generating a feasible pre-run-time schedule in the pre-run-time phase are explained in detail in U.S. Pat. No. 7,444,638, and U.S. Pat. No. 7,165,252. U.S. Pat. No. 7,444,638, and U.S. Pat. No. 7,165,252 are incorporated herein by reference.

Since embodiments of methods that can be used for generating a feasible pre-run-time schedule in the pre-run-time phase are explained in detail in U.S. Pat. No. 7,444,638, and U.S. Pat. No. 7,165,252, in the following we will only briefly describe one of the embodiments of methods to generate a feasible pre-run-time schedule in the pre-run-time phase.

In Pre-Run-Time Phase 1, Step 1, of an embodiment to generate a feasible pre-run-time schedule, the pre-run-time scheduler divides asynchronous processes with hard deadlines and known characteristics, referred to herein as A-h-k processes, into two subsets. One subset of asynchronous processes, referred to herein as A-h-k-p processes, are converted into new periodic processes by the pre-run-time scheduler before run-time. When the pre-run-time scheduler converts an asynchronous process into a new periodic process, it prevents possible timing conflicts with other periodic and asynchronous processes, by reserving enough "room" (time) prior to each new periodic process's deadline, to accommodate the computation times of all the periodic and asynchronous processes that have less latitude in meeting their deadlines, to allow such processes to preempt that new periodic process if possible at run-time. The processes in the other subset of asynchronous processes, referred to herein as A-h-k-a, remain asynchronous and are scheduled by the run-time scheduler at run-time. The pre-run-time scheduler reserves processor capacity for A-h-k-a processes by adding the computation time of each A-h-k-a process to the computation time of every periodic process that has a greater latitude in meeting its deadline than that A-h-k-a process, to allow each A-h-k-a process to preempt the execution of any such periodic process if possible at run-time.

Whether each asynchronous process is converted into a new periodic process or not, is determined based on whether the ratio of the processor capacity that needs to be reserved for the new periodic process, to the processor capacity that needs to be reserved for the asynchronous process if unconverted, exceeds a specified threshold.

(See U.S. Pat. No. 7,444,638, col. 20, line 45, to col. 28, line 25; and U.S. Pat. No. 7,165,252, col. 20, line 29, to col. 28, line 5, "Pre-Run-Time Phase, Step 1: Conversion of A-h-k-p-a processes," for detailed descriptions of embodiments of a Pre-Run-Time Phase 1, Step 1, to generate a feasible pre-run-time schedule.)

In Pre-Run-Time Phase 1, Step 2, of an embodiment to generate a feasible pre-run-time schedule, the pre-run-time scheduler determines the schedulability of the set of all periodic processes with hard deadlines and known characteristics, referred to herein as P-h-k processes, which also include the new periodic processes converted from A-h-k-p processes. The pre-run-time scheduler constructs a pre-run-time schedule in which one or more time slots are reserved for the execution of every P-h-k process, including every new P-h-k process converted from an A-h-k-p process. The time slots reserved for each P-h-k process also include time reserved for the executions of all A-h-k-a processes that have less latitude in meeting their deadlines than that P-h-k process, and which may preempt the execution of that P-h-k process. The pre-run-time scheduler adjusts the lengths of the periods using for example user or otherwise specified parameters which control the balance between the utilization level and the length of the pre-run-time schedule.

The pre-run-time scheduler is able to schedule periodic processes that have offsets, i.e., intervals between the start of a periodic process' first period and time zero. The pre-run-time scheduler takes advantage of any flexibility in periodic process offsets to increase schedulability. An embodiment of the present method allows the pre-run-time scheduler to use existing methods (including manual methods) which statically schedule set of processes, to construct the pre-run-time schedule of periodic processes in Step 2 and in Step 4 (to be described below), without requiring any change in the methods used in any of the other steps of the present method. This allows the system and methods to have the flexibility to incorporate and take advantage of any future new static scheduling method for satisfying any additionally desired constraints among the most important and numerous type of processes in real-time applications, the periodic processes.

The pre-run-time scheduler includes a function "adjust-period" which uses a sorted list of reference periods to adjust the length of the period of each periodic process. Each reference period is equal to $2^i*3^j*5^k*7^l*11^f, \ldots$, for some integers i, j, k, l, f, . . . where $0 \leq i \leq exp2$, $0 \leq j \leq exp3$, $0 \leq k \leq exp5$, $0 \leq l \leq exp7$, $0 \leq f \leq exp11$, exp2, exp3, exp5, exp7, exp11, . . . , are the upperbounds on the exponents i, j, k, l, f, . . . , that are applied to the prime numbers 2, 3, 5, 7, 11, . . . . Application dependent parameters are used to fine tune the exponent upperbounds which control the balance between the utilization level and the length of the pre-run-time schedule.

(See U.S. Pat. No. 7,444,638, col. 28, line 27, to col. 37, line 27; and U.S. Pat. No. 7,165,252, col. 28, line 7, to col. 36, line 47, "Pre-Run-Time Phase, Step 2: Construct a Feasible Pre-Run-Time Schedule for the P-h-k Processes," for detailed descriptions of embodiments of a Pre-Run-Time Phase 1, Step 2, to generate a feasible pre-run-time schedule.)

In Pre-Run-Time Phase 1, Step 3, of an embodiment to generate a feasible pre-run-time schedule, the pre-run-time scheduler uses knowledge about the time slots reserved for the P-h-k processes in the pre-run-time schedule, to determine, before run-time, the worst-case response times of all A-h-k-a processes. The pre-run-time scheduler may use one of two methods, one a formula, the other a simulation procedure, for determining the worst-case response time of each A-h-k-a process. The pre-run-time scheduler verifies the schedulability of each A-h-k-a asynchronous process by checking whether its deadline is greater than or equal to its worst-case response time. Thus, the pre-run-time scheduler provides an a priori guarantee that all periodic and asynchronous processes with hard deadlines and known characteristics will always meet their deadlines.

(See U.S. Pat. No. 7,444,638, col. 37, line 28, to col. 45, line 3; and U.S. Pat. No. 7,165,252, col. 36, line 48, to col. 44, line 57, "Pre-Run-Time Phase, Step 3: Determine the Worst-Case Response Times of the A-h-k-a Processes," for detailed descriptions of embodiments of a Pre-Run-Time Phase 1, Step 3, to generate a feasible pre-run-time schedule.)

In Pre-Run-Time Phase 1, Step 4, of an embodiment to generate a feasible pre-run-time schedule, the pre-run-time scheduler determines the schedulability of all the periodic processes with soft deadlines and known characteristics, called P-s-k processes, under the condition that all the P-h-k processes and A-h-k-a processes that are guaranteed to be schedulable in the previous steps are still schedulable. The pre-run-time scheduler re-constructs the pre-run-time schedule in which one or more time slots are reserved for the execution of every P-h-k process (including every new P-h-k process converted from an A-h-k-p process), and for every P-s-k process. The time slots reserved for each P-h-k or P-s-k process also include time reserved for the executions of all A-h-k-a processes that have deadlines that are shorter than that P-h-k or P-s-k process' deadline, and which may preempt the execution of that P-h-k or P-s-k process. The pre-run-time scheduler uses the methods in the previous step that take into account knowledge about the time slots reserved for the P-h-k and P-s-k processes in the pre-run-time schedule to determine again, before run-time, the worst-case response times of every A-h-k-a process.

(See U.S. Pat. No. 7,444,638, col. 45, line 4, to col. 48, line 44; and U.S. Pat. No. 7,165,252, col. 44, line 59, to col. 48, line 50, "Pre-Run-Time Phase, Step 4: A Feasible Pre-Run-Time Schedule for the P-s-k and P-h-k Processes is Constructed," for detailed descriptions of embodiments of a Pre-Run-Time Phase 1, Step 4, to generate a feasible pre-run-time schedule.)

In Pre-Run-Time Phase 1, Step 5, of an embodiment to generate a feasible pre-run-time schedule, the pre-run-time scheduler uses knowledge about the time slots reserved for the P-h-k and P-s-k processes in the pre-run-time schedule to determine, before run-time, the worst-case response times of asynchronous processes with soft deadlines and known characteristics, i.e., A-s-k processes.

(See U.S. Pat. No. 7,444,638, col. 48, line 46, to col. 50, line 29; and U.S. Pat. No. 7,165,252, col. 48, line 51, to col. 50, line 47, "Pre-Run-Time Phase, Step 5: Determine the Worst-Case Response Times of the A-s-k Processes," for detailed descriptions of embodiments of a Pre-Run-Time Phase 1, Step 5, to generate a feasible pre-run-time schedule.)

At the end of an embodiment of Pre-Run-Time Phase 1, a feasible schedule for a set of processes that satisfies all the release times, deadlines, precedence and exclusion constraints, on a uniprocessor, or on a multiprocessor, will have been constructed for all occurrences of all the P-h-k and P-s-k processes within the interval [0, $\max\{o_{p_i}|\forall p_i\} + 3*\text{prd}_{LCM}$], where $\text{prd}_{LCM}$ is the least common multiple of the process periods.

The set of P-h-k and P-s-k processes will be referred to as the set of guaranteed periodic processes P-g.

It is hereby emphasized that, for the methods described in the remaining part of this disclosure to function correctly and properly, it is not necessary to use the above embodiments of Pre-Run-Time Phase 1, to generate a feasible schedule. For the methods described in the remaining part of this disclosure to function correctly and properly, any method for generating a feasible schedule can be used, as long as the feasible schedule satisfies all the important constraints that need to be satisfied by the application, including offset, release times, deadlines, precedence and exclusion constraints for all the periodic processes with hard deadlines; and worst-case response times for all the asynchronous processes with hard deadlines.

Pre-Run-Time Phase 2: Determining the Latest Start Time for Each P-h-k Process Given a Feasible Pre-Run-Time Schedule Notation The following notation is used below to denote the beginning and end of the time slot of each process in a pre-run-time schedule, the actual start time and actual completion time of each process, the remaining worst-case computation time of each process, and the most recent actual arrival time of an asynchronous process at run-time.

s(p): s(p) is the time of the beginning of the time slot that was reserved for periodic process p in the pre-run-time schedule.

s'(x): s'(x) is the actual time that periodic process or asynchronous process x was/will be put into execution at run-time. At any time t, if periodic or asynchronous process x has been put into execution after or at time t, then $t \le s'(x)$ is true, otherwise $\neg (t \le s'(x))$ is true.

s'(p) depends on the arrival times of asynchronous processes $a_j$ and whether and at what time they preempt periodic processes. s'(p) also depends on the actual execution times of other processes that are executed prior to p's execution at run-time.

e(p): e(p) is the time of the end of the time slot that was reserved for periodic process p in the pre-run-time schedule.

e'(x): e'(x) is the actual time at which asynchronous or periodic process x's execution ends at run-time. At any time t, if periodic or asynchronous process x's execution has ended after or at time t, then $t \le (x)$ is true, otherwise if x's execution has not ended before or at time t, then $\neg (t \le e'(x))$ is true.

C'(x): C'(x) is the remaining worst-case computation time of periodic process or asynchronous process x at run-time.

R'(a): R'(a) is the most recent actual arrival time of asynchronous process a at run-time. At any time t, if asynchronous process a has arrived before or at time t, then $R'(a) \le t$ is true, otherwise $\neg (R'(a) \le t)$ is true. At any time t, if asynchronous process a has arrived at least once before time t and after or at time 0, then $0 \le R'(a)$ is true, otherwise if a has never arrived before or at time t, then $\neg (0 \le R'(a))$ is true.

Given any feasible pre-run-time schedule for a set of periodic processes P with arbitrary PRECEDES and EXCLUDES relations defined on ordered pairs of processes in P, we can use the procedure below to compute the latest start time LS(p) for each process p, $p \in P$ and C'(p)>0.

Note that the latest start time LS(p) will only be computed for each uncompleted process p that has a remaining worst-case computation time that is greater than zero, that is, C'(p)>0 and $\neg (e'(p) \le t)$.

Procedure a for Computing the Latest Start Times for a Set of Processes Given a Feasible Pre-Run-Time Schedule

---

$\forall p$:
$$LS(p) = \min\{ \text{FRONTSET\_LS}(p), d_p \} - C'(p) - \Sigma_{p_k \in PREEMPTSET(p)} C'(p_k)$$

where
    if $\exists p_j, e(p_j) > e(p) \wedge p \notin \text{PREEMPTSET}(p_j)$
    then FRONTSET_LS(p)
        = $\min\{LS(p_j) \mid (e(p_j) > e(p)) \wedge p \notin \text{PREEMPTSET}(p_j)$
    else FRONTSET_LS(p) = $\infty$ and
$$\text{PREEMPTSET}(p) = \{p_k \mid s(p) < s(p_k) < e(p)$$
$$\wedge\ e(p_k) >$$
$$(\min\{\text{FRONTSET\_LS}(p), d_p\}$$
$$-C'(p) - \Sigma_{p_l \in PREEMPTSET(p) \wedge (e(p_l) < e(p_l) < e(p))}$$
$$C'(P_l))\}$$

---

Note that when using Procedure A, it is always possible to compute FRONT_LS(p), PREEMPTSET(p) and LS(p) for all the processes $p \in P$, strictly in the reverse order of the end times e(p) of the time slots reserved for each process p in the pre-run-time schedule. That is, if the total number of periodic processes in P is n:

Step 1: use the procedure to calculate FRONT_LS($p_1$), PREEMPTSET($p_1$) and LS($p_1$) for $p_1$ such that $e(p_1) = \max\{e(p) \mid \forall p, p \in P\}$ Step 2: use the procedure to calculate FRONT_LS($p_2$), PREEMPTSET($p_2$) and LS($p_2$) for $p_2$ such that $e(p_2) = \max\{e(p) \mid \forall p, p \in (P - \{p_1\})\}$ Step n: use the procedure to calculate FRONT_LS($p_n$), PREEMPTSET($p_n$) and LS($p_n$) for $p_n$ such that $e(p_n) = \max\{e(p) \mid \forall p, p \in (P - \{p_1, p_2, \ldots, p_{n-1}\})\}$.

Similarly, when using the procedure to determine whether each process $p_k$ is a member of the PREEMPTSET(p) while computing FRONT_LS(p), PREEMPTSET(p) and LS(p) for each process p, it is always possible to perform that determination strictly in the reverse order of the end times of the time slots reserved for each process $p_k$ in the pre-run-time schedule.

Example 1

Figure 4:
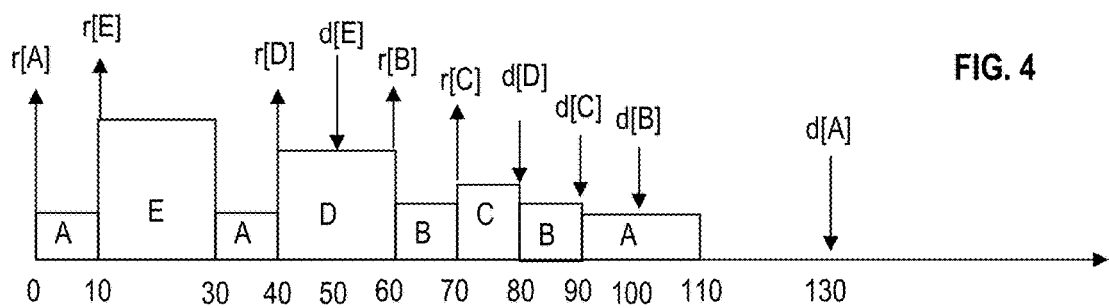
FIG. 4 is an example of a pre-run-time schedule.

Applying the Procedure A above for computing the latest start times for the set of processes A, B, C, D, E in the feasible pre-run-time schedule in FIG. 4, provides the following results:

(a) For LS(A): FRONTSET_LS(A)=$\infty$. B$\notin$PREEMPTSET (A), because the condition "$e(p_k) > (\min\{\text{FRONTSET\_LS}(p), d_p\} - C'(p) - \Sigma_{p_l \notin PEPREEMPTSET(p) \wedge (e(p_l) < e(p_l) < e(p))} C'(p_l))$" in the procedure is not satisfied, since e(B)=90 and $(\min\{\text{FRONTSET\_LS}(A), d_A\} - C'(A) - \Sigma_{p_l \notin PEPREEMPTSET(p) \wedge (e(B) < e(p_l) < e(A))} C'(p_l)) = \min\{\infty, 130\} - 40-0=90$. For similar reasons, C, D, E$\notin$PREEMPTSET(A), so PREEMPTSET(A)=$\emptyset$. Thus LS(A)= $\min\{\text{FRONTSET\_LS}(A), d_A\} - C'(A) - \Sigma_{p_k \in PREEMPTSET(A)} C'(p_k) = \min\{\infty, 130\} - 40-0=90$.

(b) For LS(B): FRONTSET_LS(B)=LS(A)=90, since (e(A) >e(B))$\wedge$ B$\notin$PREEMPTSET(A). C$\notin$PREEMPTSET(B), because the condition "$e(p_k) > (\min\{\text{FRONTSET\_LS}(p), d_p\} - C'(p) - \Sigma_{p_l \notin PEPREEMPTSET(p) \wedge (e(p_l) < e(p_l) < e(p))}$" in the procedure is satisfied, since e(C)=80 and (min{FRONTSET_LS (B), $d_B$}−C'(B)−$\Sigma_{p_l \notin PEPREEMPTSET(p) \wedge (e(C)<e(p_l)<e(B))}$C'($p_l$))= min {90, 100}−20−0=70. Similar calculations will show that D, E∉PREEMPTSET(B), so PREEMPTSET(B)= {C}. Thus LS(B)=min{FRONTSET_LS(B), $d_B$}−C'(B)−$\Sigma_{p_k \notin PREEMPTSET(B)}$C'($p_k$)=min{90, 100}−20−C'(C)=90−20−10=60.

(c) For LS(C): FRONTSET_LS(C)=LS(A)=90. PREEMPTSET(C)=∅. Thus LS(C)=min{FRONTSET_LS(C), $d_C$}−C'(C)−$\Sigma_{p_k \notin PREEMPTSET(C)}$C'($p_k$)=min{90, 90}−10−0=80.

(d) For LS(D): FRONTSET_LS(D)=LS(B)=60. PREEMPTSET(D)=∅. Thus LS(D)=min{FRONTSET_LS(D), $d_D$}−C'(D)−$\Sigma_{p_k \notin PREEMPTSET(D)}$C'($p_k$)={60, 80}−20−0=40.

(e) For LS(E): FRONTSET_LS(E)=LS(D)=40. PREEMPTSET(E)=∅. Thus LS(E)=min{FRONTSET_LS(E), $d_E$}C'(E)−$\Sigma_{p_k \notin PREEMPTSET(E)}$C'($p_k$)=min{40, 50}−20−0=20.

In the following, another Procedure A1 is provided for computing the latest start times for a set of processes given a feasible pre-run-time schedule. This Procedure A1 will compute latest start times that are identical to the latest start times that are computed by the Procedure A above.

First, we assume that the process indices i of each process $p_i$ correspond to the order of the end times $e(p_i)$ of the time slots reserved for each process $p_i$ in the pre-run-time schedule. That is, if there is a total number of n processes, then process $p_1$'s time slot end time $e(p_1)$ is the earliest among all processes in the pre-run-time schedule; and process $p_n$'s time slot end time $e(p_n)$ is the latest among all processes in the pre-run-time schedule; and for all 1≤j≤n, if i<j, then $e(p_i)$ $e(p_j)$.

Figure 1A:
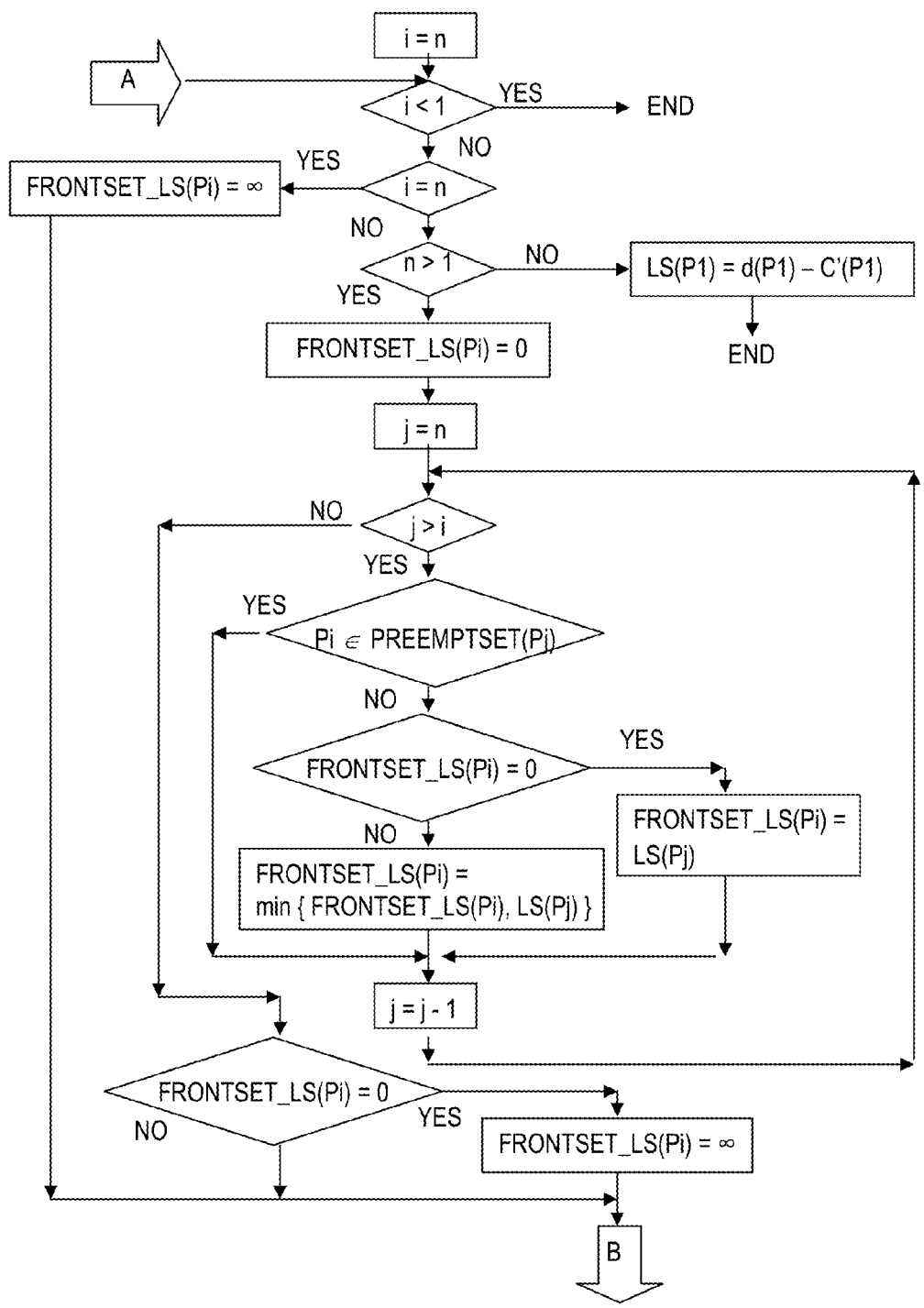
Figure 1B:
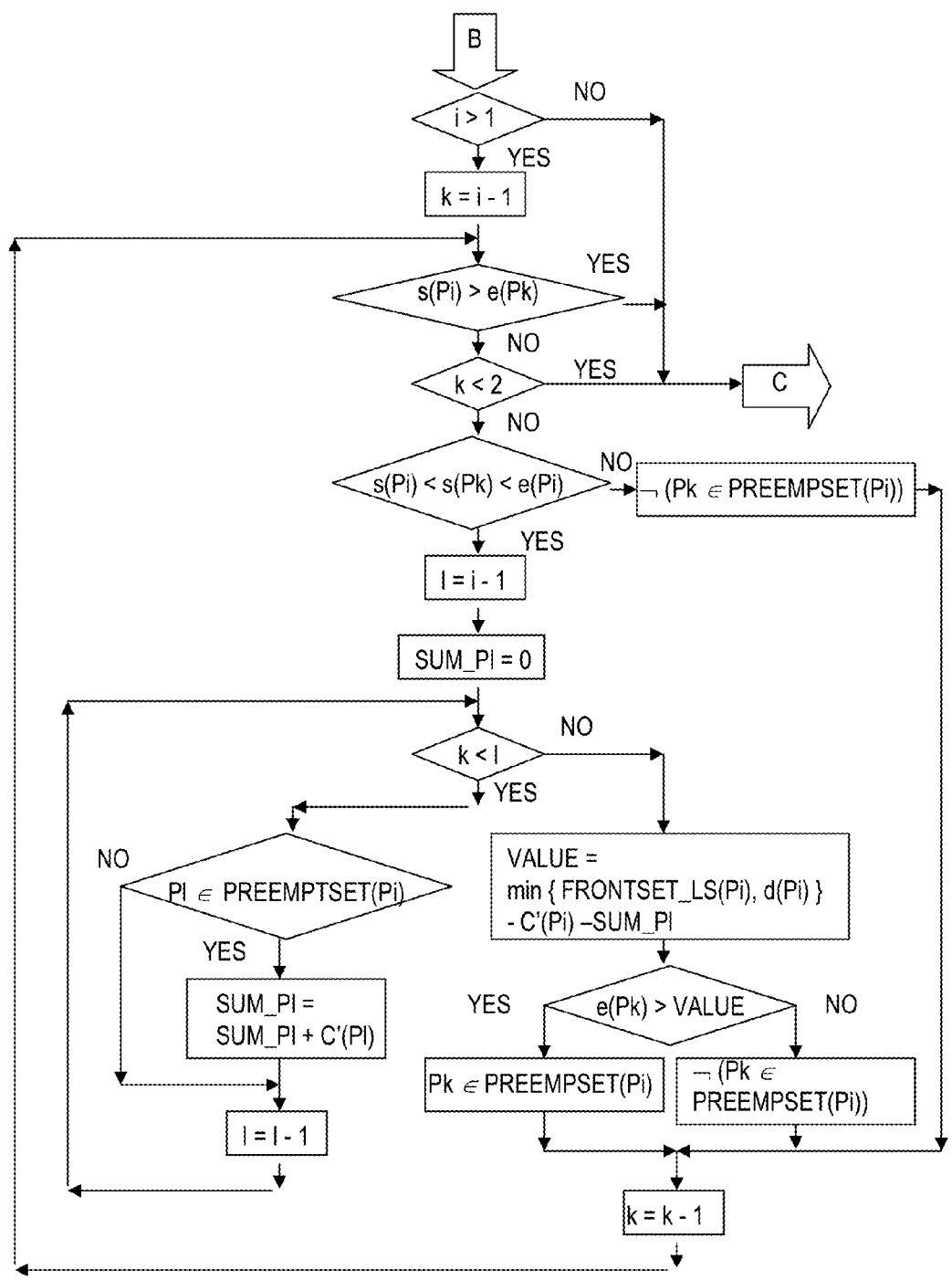
Figure 1C:
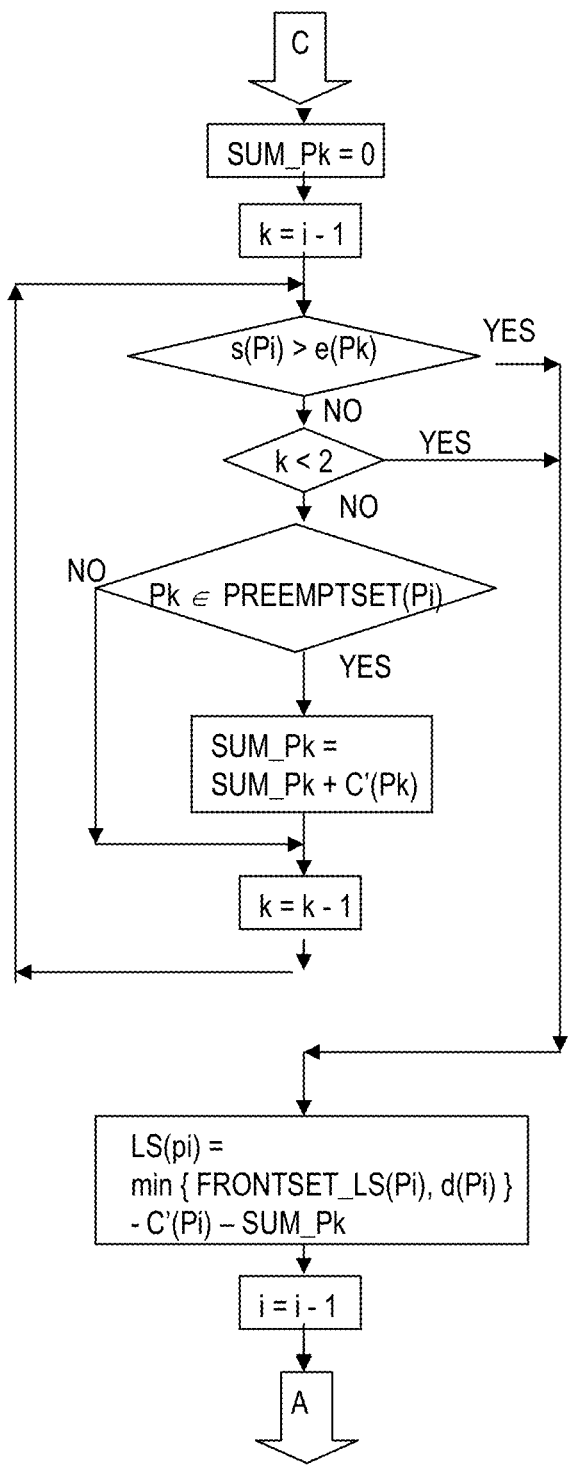
Figure 2A:
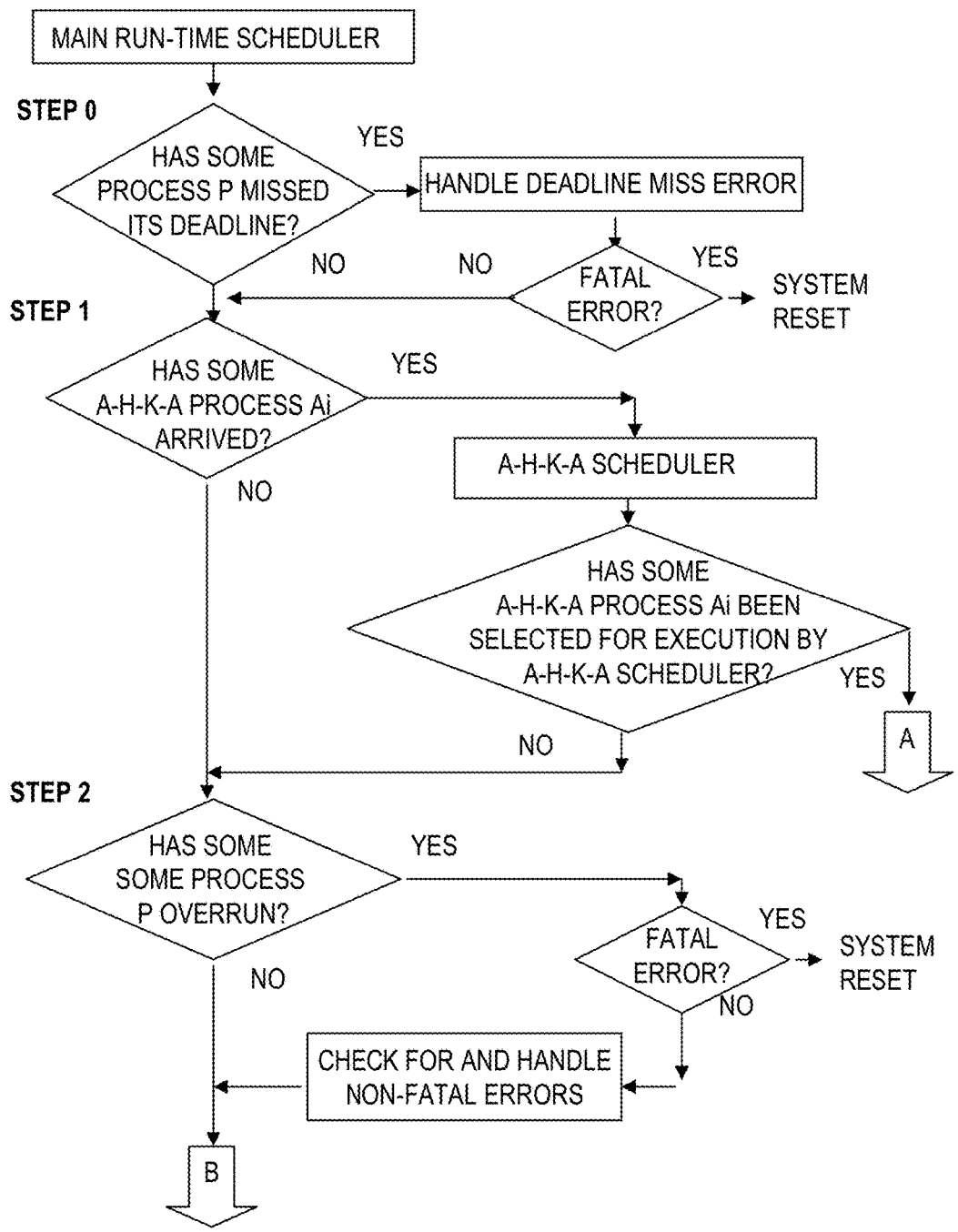
Figure 2B:
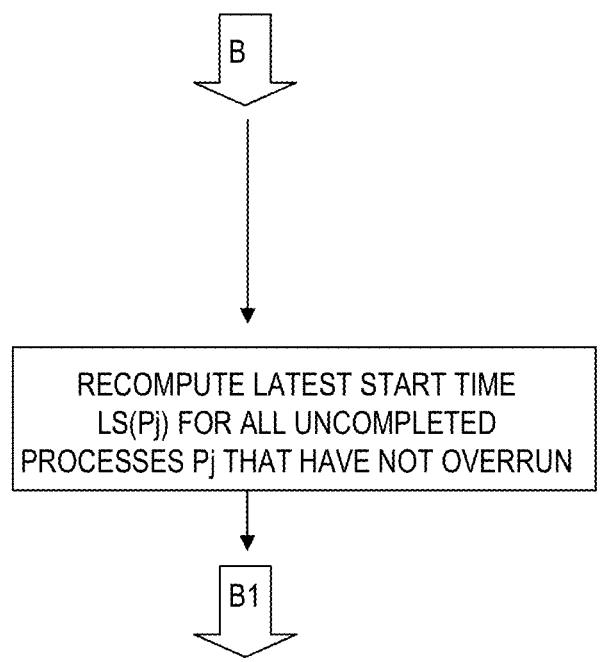
Figure 2C:
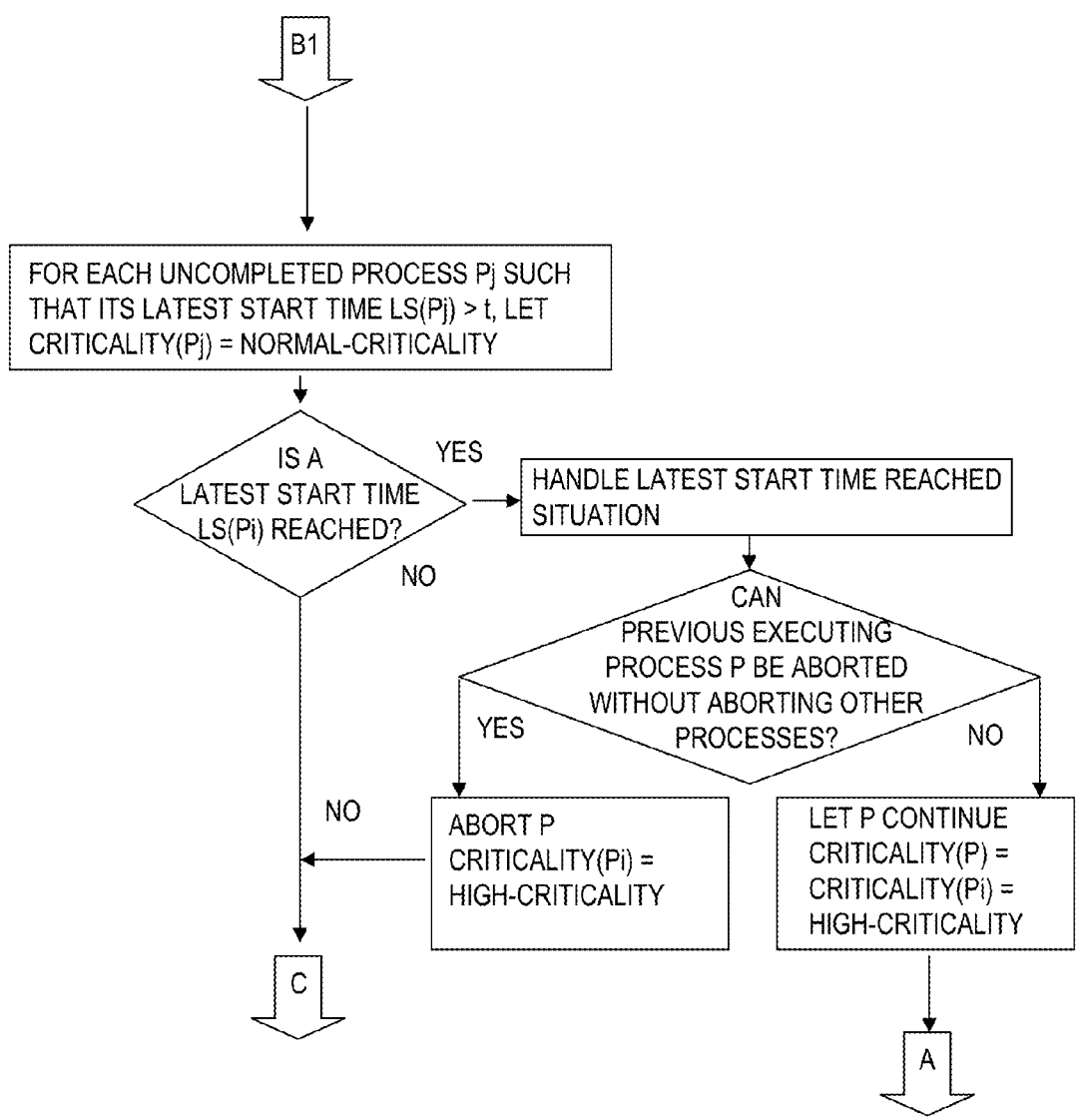
Figure 2D:
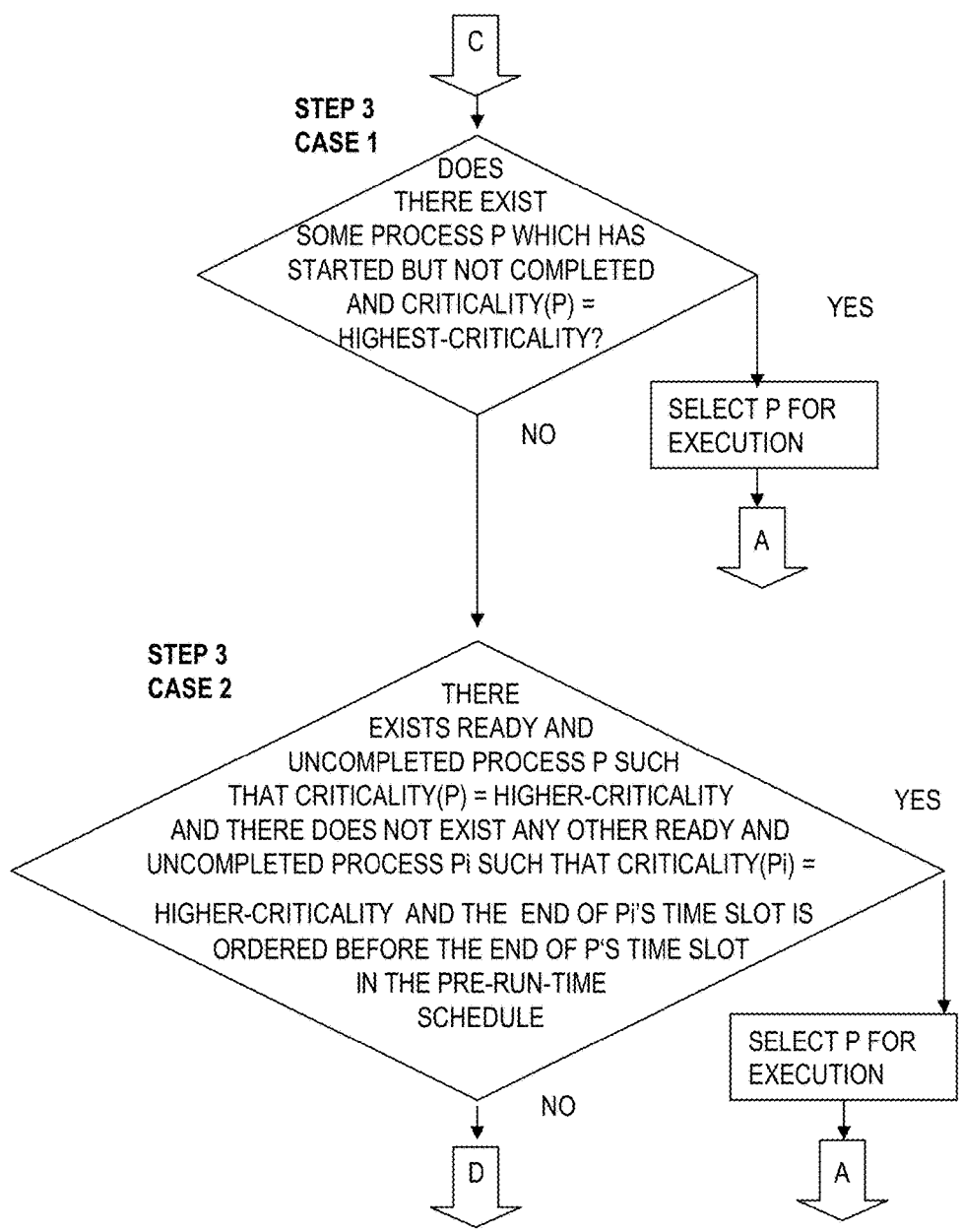
Figure 2F:
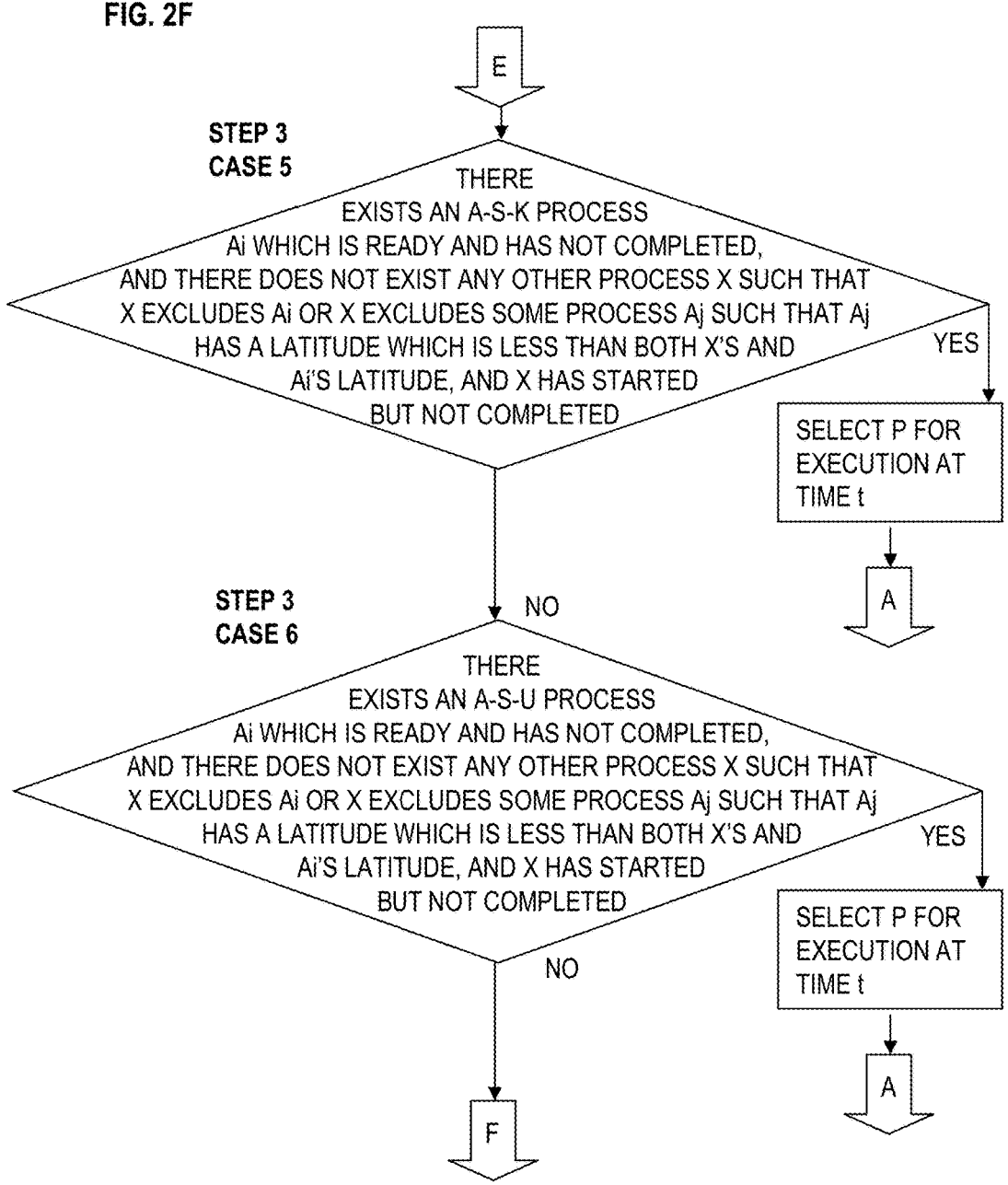
Figure 2G:
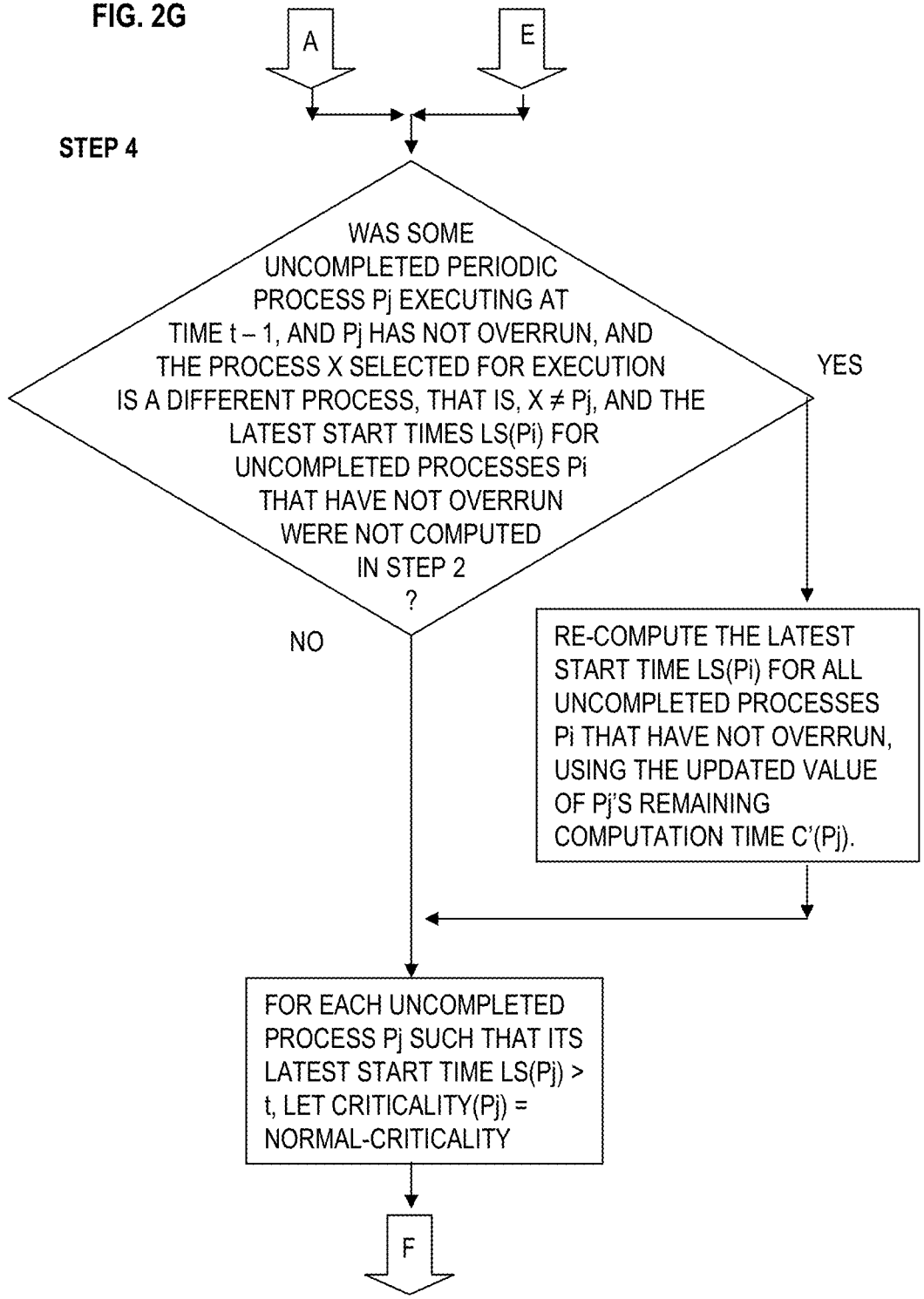

Procedure A1 for Computing the Latest Start Times for a Set of Processes with Arbitrary Precedence and Exclusion Relations Given a Feasible Pre-Run-Time Schedule (See FIGS. 1A, 1B, and 1C for flowchart diagrams for an embodiment of the Procedure A1 for computing the latest start times for a set of processes with arbitrary precedence and exclusion relations given a feasible pre-run-time schedule.)

```
i = n;
while (i ≥ 1)
begin
    A: % Compute FRONTSET_LS(p_i) for process p_i:
    if (i = n) then FRONTSET_LS(p_i) = ∞;
    else
    begin
        if (n ≤ 1) then
        begin
            LS(p_1) = d(p_1) − C'(p_1);
            exit % n = 1: only one process p_1
        end
        else
        begin
            FRONTSET_LS(p_i) = 0;
            j = n;
            while (j > i)
            begin
                if (pi ∉ PREEMPTSET (p_j)) then
                begin
                    if (FRONTSET_LS(p_i) = 0) then
                        FRONTSET_LS(p_i) = LS(p_j);
                    else
                        FRONTSET_LS(p_i) = min
                        { FRONTSET_LS(p_i), LS(p_j) };
                end
                j = j − 1;
            end
            if (FRONTSET_LS(p_i) = 0) then
                FRONTSET_LS(p_i) = ∞;
        end
    end
```

```
    B: % Compute PREEMPTSET(p_i) for process p_i
    if (i > 1) then
    begin
        k = i − 1;
        while (s(p_i) ≤ e(p_k) ∧ k ≥ 2)
        begin
            if (s(p_i) < s(p_k) ∧ s(p_k) < e(p_i)) then
            begin
                l = i − 1;
                SUM_P1 = 0;
                while (k < l)
                begin
                    if (p_l ∈ PREEMPTSET (p_i)) then
                        SUM_P1 = SUM_P1 + C'(p_l);
                    l = l − 1;
                end
                VALUE = min{ FRONTSET_LS(p_i), d(p_i)} −
                    C'(p_i) − SUM_P1;
                if (e(p_k) > VALUE) then
                    p_k ∈ PREEMPTSET (p_i);
                else
                    p_k ∉ PREEMPTSET (p_i);
            end
            else p_k ∉ PREEMPTSET (p_i);
            k = k − 1;
        end
    end
    C: % Compute Latest Start Time LS(p_i) for process p_i:
    SUM_Pk = 0;
    k = i − 1;
    while (s(p_i) ≤ e(p_k) ∧ k ≥ 2)
    begin
        if p_k ∈ PREEMPTSET (p_i) then
            SUM_Pk = SUM_Pk + C'(p_k);
        k = k − 1;
    end
    LS(p_i) = min{ FRONTSET_LS(p_i), d(p_i)} − C'(p_i) −
    SUM_Pk;
    i = i − 1;
end
```

In the following a "First Time Slot Right Shift Procedure" is provided for computing "latest-start-time schedule", and latest start times, for a set of periodic processes P with arbitrary PRECEDES and EXCLUDES relations defined on ordered pairs of processes in P, given a feasible pre-run-time schedule, in which the time slots of all processes in the original feasible pre-run-time schedule are shifted to the right as far as possible while still satisfying the original PRECEDES and EXCLUSION relations.

Note that the latest start time LS(p) will only be computed for each uncompleted process p that has a remaining worst-case computation time that is greater than zero, that is, C'(p)>0 and ¬(e'(p)≤t).

First Time Slot Right Shift Procedure for Computing a Latest-Start-Time Schedule and Latest Start Times, for a Set of Periodic Processes P with Arbitrary PRECEDES and EXCLUDES Relations, Given a Feasible Pre-Run-Time Schedule Given any original pre-run-time schedule, we first define a set of "PREC" relations on ordered pairs of processes in the set of periodic processes P in the original pre-run-time schedule:

$\forall p_i \in P, p_j \in P,$ if $e(p_i)<e(p_j) \wedge ((p_i \text{EXCLUDES} p_j) \vee (p_j \text{EXCLUDES} p_i) \vee (p_i \text{PRECEDES} p_j))$ then let $p_i \text{PREC} p_j$ The following (simplified) procedure computes a latest-start-time schedule by scheduling all processes in P starting from time t equal to the latest deadline among all the process in P, that is, $t=\max\{d_p | \forall p \in P\}$, in reverse time order, using a "Latest-Release-Time-First" scheduling strategy that is equivalent to a reverse application of the Earliest-Deadline-First strategy, which satisfies all the PREC relations defined above as follows.

Note that in the procedure below, "$s_{new}(p_j)$" refers to the "start time" of $p_j$, or the time value of the left boundary of the leftmost time unit that will be assigned by the procedure to $p_j$ in the newly constructed latest-start-time schedule, which is also equal to the time value of the left boundary of the last time unit [t−1, t] that will be assigned by the procedure to $p_j$ while constructing the latest-start-time schedule. For each process $p_j$, $s_{new}(p_j)$ is also equal to the latest start time $LS(p_j)$ for process $p_j$.

Figure 3:
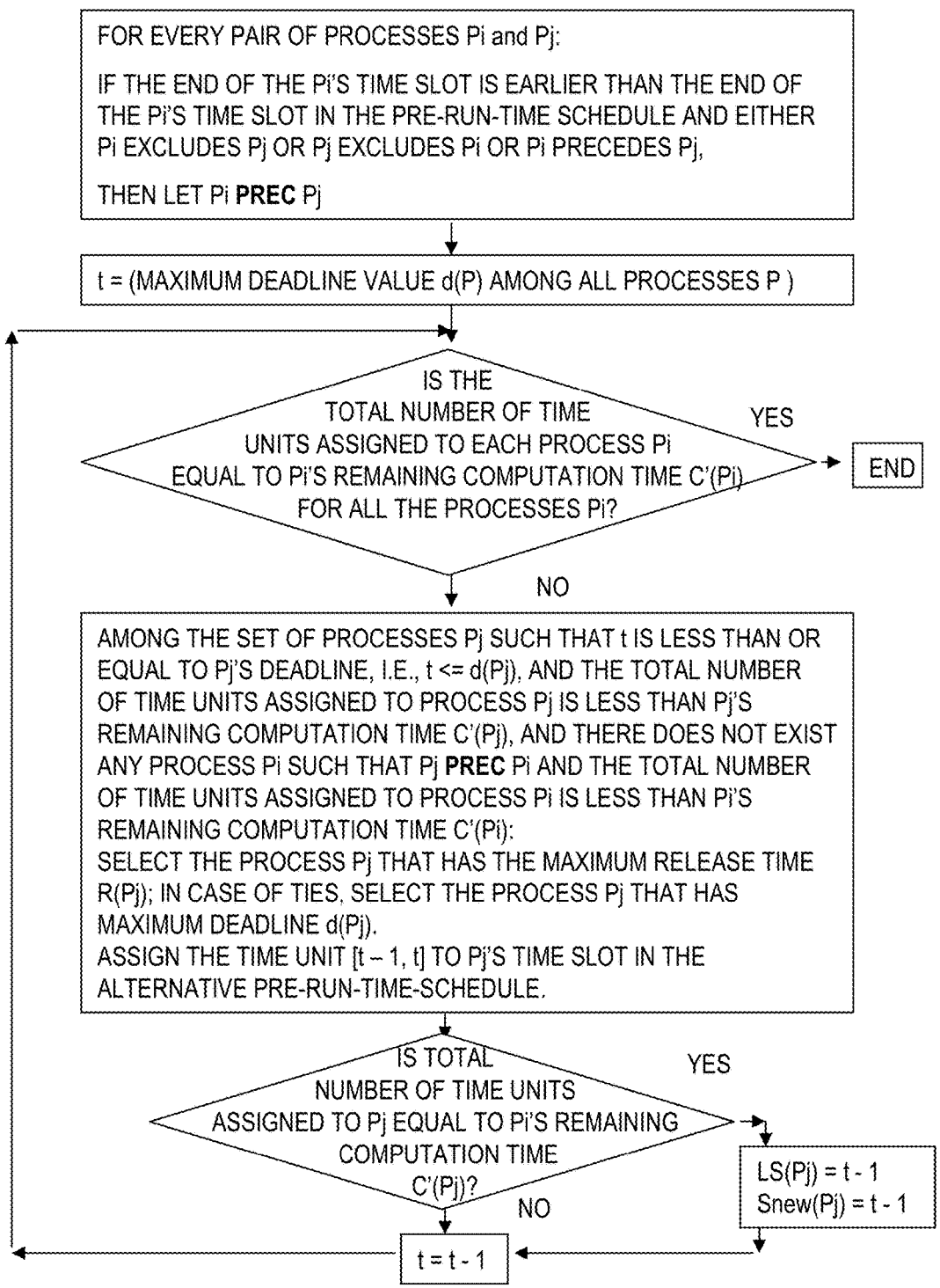
FIG. 3 is a flowchart diagram showing an embodiment of a First Time Slot Right Shift Procedure for computing a latest-start-time schedule, and the latest start times, for a set of periodic processes with arbitrary precedence and exclusion relation given a pre-run-time schedule.

(See FIG. 3 for a flowchart diagram showing an embodiment of a First Time Slot Right Shift Procedure for computing a latest-start-time schedule, and latest start times for a set of periodic processes with arbitrary precedence and exclusion relations given a feasible pre-run-time schedule.)

```
t = max {d_p | ∀p ∈ P}
while ¬(∀p_i,C'(p_i) > 0 : s_new(p_i) ≥ t) do
    begin
        Among the set
        { p_j | C'(p_j) > 0 ∧ t ≤ d_{p_j} ∧ ¬(s_new (p_j) ≥ t)
                ∧ (∄ p_i : p_j PREC p_i ∧ ¬(s_new(p_i) ≥ t)
        }
        select the process p_j that has the latest release time max R_{p_j}.
        in case of ties, select the process p_j that has maximum
        deadline d_{p_j}.
        assign the time unit [t − 1, t] to p_j in the
        latest-start-time schedule.
            if the total number of time units assigned to p_j
            is equal to p_j's remaining worst-case computation
            time C'(p_j),
                then LS(p_j) = s_new(p_j) = t − 1.
        t = t − 1.
    end
```

In the following, a "Second Time Slot Right Shift Procedure" is provided for computing, either before run-time, or any time during run-time, the latest start times for a set of processes with arbitrary precedence and exclusion relations given a feasible pre-run-time schedule. This Second Time Slot Right Shift Procedure can also be used to compute a latest-start-time schedule for all the processes before run-time, or at any time during run-time. This Second Time Slot Right Shift Procedure will compute latest start times that are identical to the latest start times that are computed by the First Time Slot Right Shift Procedure, but this Second Time Slot Right Shift Procedure is more efficient than the First Time Slot Right Shift Procedure.

Note that the latest start time $LS(p)$ will only be computed for each uncompleted process p that has a remaining worst-case computation time that is greater than zero, that is, $C'(p)>0$ and $\neg(e'(p) \leq t)$.

This Second Time Slot Right Shift Procedure computes latest start times for a set of process by scheduling all processes in P starting from time t equal to the latest deadline among all the process in P, that is, $t=\max\{d_p | \forall p \in P\}$, in reverse time order, using a "Latest-Release-Time-First" scheduling strategy that is equivalent to a reverse application of the Earliest-Deadline-First strategy, which satisfies all the PREC relations defined earlier as follows.

(See FIGS. 18A-18C for a flowchart diagram showing an embodiment of a Second Time Slot Right Shift Procedure for computing a latest-start-time schedule, and the latest start times for a set of periodic processes with arbitrary precedence and exclusion relations given a feasible pre-run-time schedule.)

Second Time Slot Right Shift Procedure for Computing a Latest-Start-Time Schedule and Latest Start Times for a Set of Processes with Arbitrary Precedence and Exclusion Relations Given a Feasible Pre-Run-Time Schedule

```
lastt = infinity;
lastproc = <any process index>;
idle = true;
for each process i do
    begin
        if i has completed or C' (i) = 0 then
            % if procedure is used at run-time for re-computing latest
            start times,
            % then only compute latest start times for each uncompleted
            % process i that has a remaining worst-case computation
            time that is
            % greater than zero, that is C' (i) > 0, see Run-Time
            Scheduler
            begin
                endtimecomputed[i] = true;
                lateststarttimecomputed[i] = true;
                comptimeleft[i] = 0;
                LS[i] = 0;
            end;
        else
            begin
                endtimecomputed[i] = false;
                lateststarttimecomputed[i] = false;
                comptimeleft[i] = C' (i);
                LS[i] = infinity;
            end;
    end
t = max{d[i] | all i in P};
while not(for all processes i: (lateststarttimecomputed[i] = true)) do
begin
    t = max{t | t < lastt and
                ((exists i: t = d[i] and not
                (lateststarttimecomputed[i])) or
                ((idle = false) and (comptimeleft[lastproc] =
                lastt − t))) };
    if idle = false then
    begin
        % lastproc can be allocated time on processor until
        % no remaining computation time left:
        comptimeleft[lastproc] = comptimeleft[lastproc] − (lastt − t);
        if comptimeleft[lastproc] = 0 then
            begin
                lateststarttimecomputed[lastproc] = true;
                LS[lastproc] = t;
            end;
    end;
    S = { j | t <= d[j] and not(lateststarttimecomputed[j] and
            (no i exists such that: ((j PREC i) and not(LS(i) >= t))
        }
    if S is empty then idle = true % no process selected at time t
    else
        begin % a process was selected at time t
            idle = false;
            S1 = { j | R[j] = max{ R[i] | in S } }
            select process x such that d[x] = max { d[i] | in S1 }
            to be allocated time in the latest-start-time
            schedule starting from time t;
            if not endtimecomputed[x] then
                begin
                    endtimecomputed[x] = true;
                    e[x] = t;
                end;
            lastproc = x;
        end;
    lastt = t;
end;
```

The procedure shown above, computes a latest-start-time schedule, which includes the latest start time LS [i], and the end time e[i], for each uncompleted periodic process i, while maintaining the order defined in the "PREC" relations, such that the beginning of the time slot for each uncompleted process i is equal to its "latest start time" LS [i].

In the procedure for computing a latest-start-time schedule and the latest start times for a set of processes with arbitrary precedence and exclusion relations, "lastt" is the last time that the procedure tried to select a process to allocate processor time. "lastproc" is the process that was last allocated processor time. "idle" indicates whether there was any process selected at lastt. "endtimecomputed[i]" indicates whether the end time e[i] for process i has been computed. "lateststarttimecomputed[i]" indicates whether the latest start time LS[i] for process i has been computed. "comptimeleft[i]" is the remaining computation time of process i that needs to be allocated time on the processor in the latest-start-time schedule. R[i] is the release time of $p_i$.

The following "Third Time Slot Right Shift Procedure" is another alternative procedure provided for computing, either before run-time, or any time during run-time, a latest-start-time schedule and the latest start times for a set of processes with arbitrary precedence and exclusion relations given a feasible pre-run-time schedule.

Note that the latest-start-time schedule and the latest start time LS(p) will only be computed for each uncompleted process p that has a remaining worst-case computation time that is greater than zero, that is, $C'(p){>}0$ and $\neg(e'(p){\le}t)$. Third Time Slot Right Shift Procedure for Computing the Latest-Start-Time Schedule and the Latest Start Times for a Set of Processes with Arbitrary Precedence and Exclusion Relations Given a Feasible Pre-Run-Time Schedule The latest-start-time schedule produced by using the Time Slot Right Shift Procedure given any feasible pre-run-time schedule, can be used as the initial feasible pre-run-time schedule used by the Third Time Slot Right Shift Procedure.

Suppose that in the pre-run-time schedule there are a total of n time slots, numbered 1, 2, n, where the first time slot is numbered 1, and the last time slot is numbered n.

The data associated with each time slot i in the pre-run-time schedule is represented by the data structure:

```
structure {
    s: int;
    e: int;
    l: int;
    p: int;
    active: Boolean.
} timeslot[i];
``` where:
timeslot[i].s is the start time of time slot i,
timeslot[i].e is the end time of time slot i,
timeslot[i].l is the length of time slot i,
timeslot[i].p is the index of the process that was allocated that time slot,
timeslot[i].active is the active/inactive status of the process that was allocated that time slot;
timeslot[i].active is initialized to have a true value for every time slot i in the pre-run-time schedule at time 0, and at the start of each system major cycle corresponding to the least common multiple of the process periods.

For example, the pre-run-time schedule in FIG. 4 has a total of n=8 time slots. Assuming that the processes A, B, C, D, E have the process indexes 1, 2, 3, 4, 5, respectively, then the last time slot in FIG. 4 would have the following time slot data values: timeslot[8].s=90; timeslot[8].e=110; timeslot[8].l=20; timeslot[8].p=1; timeslot[8].active=true.

At the start of each system major cycle corresponding to the least common multiple of the process periods, the timeslot data will be initialized/restored to be consistent with a feasible pre-run-time schedule of all the uncompleted processes, such as the latest-start-time schedule produced by using the Time Slot Right Shift Procedure given any feasible pre-run-time schedule.

During run-time, some values in the timeslot data may change when the remaining computation time of some of the processes change.

(See FIGS. 17A-17F for a flowchart diagram showing an embodiment of a Third Time Slot Right Shift Procedure for computing a latest-start-time schedule, and the latest start times for a set of periodic processes with arbitrary precedence and exclusion relations given a feasible pre-run-time schedule.)

Note that in all the pseudo code in the present disclosure, comments are preceded by a percentage sign "%".

```
% (see Fig 17A.)
for each process p do
    begin
        if p has completed or if C' [p] = 0 then
            % if procedure is used at run-time for re-computing latest
            start times,
            % then only compute latest start times for each uncompleted
            % process p that has a remaining computation time that is greater
            % than zero, that is, C' [p] > 0, see Run-Time Scheduler
            begin
                completed[p] = true;
                endtimecomputed[p] = true;
                lateststarttimecomputed[p] = true;
                comptimeleft[p] = 0;
                LS(p) = 0;
            end;
        else
            begin
                completed[p] = false;
                endtimecomputed[p] = false;
                lateststarttimecomputed[p] = false;
                comptimeleft[p] = C' [p];
                LS(p) = infinity;
            end;
    end
% Label A (see Fig 17B):
most recent active = 0;
% start from the last, rightmost time slot
i = n;
% Label H (see Fig 17B):
while (i > = 1) do
% if (i < 1) then exit while loop and go to Label Z in Fig 17F.
    begin
        if (not(lateststarttimecomputed[timeslot[i].p])) then
        % else if (lateststarttimecomputed[timeslot[i].p]) go to
        % Label B (see Fig 17E).
            begin
                most recent active = i;
                if (comptimeleft[timeslot[i].p] > timeslot[i].l) then
                % else if (comptimeleft[timeslot[i].p] <= timeslot[i].l) go to
                % Label C (see Fig 17C).
                    begin
                        % process owning the time slot needs to use the full
                        length
                        % of the time slot, so time slot data does not change
                        comptimeleft[timeslot[i].p] =
                        comptimeleft[timeslot[i].p]
                                                    - timeslot[i].l;
                        if (not(endtimecomputed[timeslot[i].p])) then
                            begin
                                e[timeslot[i].p] = timeslot[i].e;
                                endtimecomputed[timeslot[i].p] = true;
                            end
                    end
                % go to Label D (see Fig. 17E).
            else
                % Label C (see Fig 17C):
                % comptimeleft[timeslot[i].p] < = timeslot[i].l
                begin
                    % this is the last time slot that the process owning the
```

```
            % timeslot needs
            if (not(endtimecomputed[timeslot[i].p])) then
              begin
                % this is the only time slot that this process needs
                e[timeslot[i].p] = timeslot[i].e;
                endtimecomputed[timeslot[i].p] = true;
              end
            lateststarttimecomputed[timeslot[i].p] = true;
            LS[timeslot[i].p] = timeslot[i].e
                                - comptimeleft[timeslot[i].p];
            if (comptimeleft[timeslot[i].p] < timeslot[i].l) then
            % else if (comptimeleft[timeslot[i].p] >= timeslot[i].l)
            go to
            % Label E (see Fig 17 D).
              begin
                % process owning the time slot does not need all
                % the current time slot length
                % adjust length and start time of time slot i to
                % only the length needed
                timeslot[i].l = comptimeleft[timeslot[i].p];
                timeslot[i].s = timeslot[i].e - timeslot[i].l;
                % Label F (see Fig 17D):
                % need to move up end time of next time slot
                % mark and skip any timeslot allocated to
                any process j
                % that does not need the timeslot
                j = i - 1;
                while (lateststarttimecomputed[timeslot[j].p]
                       and (j >= 1)) do
                  begin
                    timeslot[j].active = false;
                    j = j - 1;
                  end
                if ((not(lateststarttimecomputed[timeslot[j].p]))
                    and (j >= 1)) then
                % else if (lateststarttimecomputed[timeslot[j].p])
                % or (j < 1) exit while loop and go to Label Z
                % (see Fig 17F).
                  begin
                    % move up most adjacent earlier active time
                    % slot's end time to be equal to the
                      minimum of
                    % its own deadline, and the most recent active
                    % time slot's start time
                    timeslot[j].e
                      = min{d[timeslot[j].p],
                            timeslot[most_recent_active].s };
                    timeslot[j].s
                      = timeslot[j].e - timeslot[j].l;
                  end
                else %all done
                  exit; % exit while loop and go to Label Z
                        % (see Fig 17F).
                i = j + 1; % so that i - 1 will point to correct time
                           % slot[j] such that the latest start time
                           % of process j has not been computed after
                           % decrement of i at end of main while loop
              end
            % Label E (see Fig 17D):
            comptimeleft[timeslot[i].p] = 0;
          end
        end (if) % go to Label G (see Fig 17E).
      else
      % Label B (see Fig 17E):
      begin
        % encountered a time slot such that
        % lateststarttimecomputed[timeslot[i].p] is true.
        % if timeslot[i].active already set to false in a previous
        % step, then do not need to do anything.
        if (timeslot[i].active) then
          % process owning the time slot does not need it anymore
          % but its processor time has not been re-assigned yet.
          % need to move up the end time of most adjacent earlier
          % time slot for which lateststarttimecomputed[timeslot[i].p]
          % is false
          begin
            j = i;
            while (lateststarttimecomputed[timeslot[j].p]
                   and (j >= 1)) do
              begin
                timeslot[j].active = false;
                j = j - 1;
              end
            if (not(lateststarttimecomputed[timeslot[j].p])
                and (j >= 1)) then
            % else if (lateststarttimecomputed[timeslot[j].p])
            % or (j < 1) then exit while loop and go to Label Z
            % (see Fig 17F).
              begin
                if (most_recent_active = 0) then
                  timeslot[j].e = d[timeslot[j].p];
                else
                  timeslot[j].e
                    = min{d[timeslot[j].p],
                          timeslot[most_recent_active].s};
                timeslot[j].s
                  = timeslot[j].e - timeslot[j].l;
              end
            else %all done
              exit; %exit while loop and go to Label Z
                    %(see Fig 17F).
            i = j + 1; % so that i - 1 will point to correct time
                       % slot[j] such that the latest start time
                       % of process j has not been computed after
                       % decrement of i at end of main while loop
          end (if)
        end (else)
      % Label D and Label G (see Fig 17E):
      i = i - 1;
      % go to Label H (see Fig 17B).
    end (while)
    % cleanup: combine consecutive time slots that have same owner
      process,
    % remove any unused time slots
    % Label Z (see Fig 17F):
    newindex = 1;
    i = 1;
    last_valid_timeslot_process = 0;
    while (i <= n) do % n is previous total number of time slots
    begin
      if ((timeslot[i].valid) then
        begin
          if (not(timeslot[i].p = last_valid_timeslot_process)) then
            begin
              last_valid_timeslot_process = timeslot[i].p;
              last_valid_timeslot_newindex = i;
              % let contents of timeslot[newindex] be same as timeslot[i],
              % either through change in pointer/address, or copying
              timeslot[newindex] = timeslot[i];
              newindex = newindex + 1;
            end
          else
            begin
              timeslot[last_valid_timeslot_newindex].e = timeslot[i].e;
              timeslot[last_valid_timeslot_newindex].l = timeslot[i].l
                + timeslot[last_valid_timeslot_newindex].l
            end
        end
      i = i + 1;
    end
    n = newindex - 1;
    % the new total number of time slots n will be equal to newindex - 1.
```

FIG. 16A and FIG. 16B illustrate how the procedure works. Assume that process A underruns, with the length of the remaining computation time C'(A) represented by the shaded area in the last timeslot[i] in FIG. 16A. Assume also that process B underruns, with the length of the remaining computation time C'(B) represented by the shaded area in the second last timeslot[i−1] in Figure A. Then timeslot[i−1].e should be set to be equal to timeslot[i].s, which is also equal to the latest start time LS(A). All other timeslots for A should be removed, with timeslot[D].e set to be equal to timeslot[B].s for the timeslots for D and B. Note that timeslot[E].e cannot be set to be equal to timeslot[D].s for the timeslots for E and D, because the timeslot for E cannot be moved beyond its deadline. After all timeslots have been processed in this manner, the start time of the first time slot for each process p will be equal to that latest start time LS(p) for process p.

Example 2

FIG. 5A shows an original feasible pre-run-time schedule of processes A, C, D. When the Procedure A or A1 for computing the latest start times is applied to the original feasible pre-run-time schedule of processes A, C, D in FIG. 5A, the following results are obtained:
(a) For LS(D): FRONTSET_LS(D)=∞. PREEMPTSET(D)=∅. Thus LS(D)=min{FRONTSET_LS(D), $d_D$}−C'(D)−$\Sigma_{p_k \notin PREEMPTSET(D)}$C'($p_k$)=mm{∞, 110}−20−0=90.
(b) For LS(A): FRONTSET_LS(A)=LS(D)=90. PREEMPTSET(A)={C}. Thus LS(A)=min{FRONTSET_LS(A), $d_A$}−C'(A)−$\Sigma_{p_k \notin PREEMPTSET(A)}$C'($p_k$)=min{90, 130}−50−C'(C)=90−50−20=20.
(c) For LS(C): FRONTSET_LS(C)=LS(D)=90. PREEMPTSET(C)=∅. Thus LS(C)=min{FRONTSET_LS(C), $d_C$}−C'(C)−$\Sigma_{p_k \notin PREEMPTSET(C)}$C'($p_k$)=min{90, 120}−20−0=70.

FIG. 5B shows the latest-start-time schedule of processes A, C, D computed by any of the First, Second, or Third, Time Slot Right Shift Procedures from the feasible pre-run-time schedule in FIG. 5A. The latest start times computed by a Time Slot Right Shift Procedure are respectively equal to the start times of the processes in FIG. 5B, that is LS(A)=40, LS(C)=80, LS(D)=90.

When the Procedure A or A1 for computing the latest start times is applied to the latest-start-time schedule of processes A, C, D computed by a Time Slot Right Shift Procedure in FIG. 5B, the following results are obtained:
(a1) For LS(A): FRONTSET_LS(A)=∞. PREEMPTSET(A)= {C, D}. Thus LS(A)=min{FRONTSET_LS(A), $d_A$}−C'(A)−$\Sigma_{p_k \notin PREEMPTSET(A)}$C'($p_k$)=min{∞, 130}−50−(C'(C)+C'(D))=130−50−40=40.
(b1) For LS(C): FRONTSET_LS(C)=∞. PREEMPTSET(C)= {D}. Thus LS(C)=min{FRONTSET_LS(C), $d_C$}−C'(C)−$\Sigma_{p_k \notin PREEMPTSET(C)}$C'($p_k$)=min{∞, 120}−20−C'(D)=120−20−20=80.
(c1) For LS(D): FRONTSET_LS(D)=∞. PREEMPTSET(D)=∅. Thus LS(D)=min{FRONTSET_LS(D), $d_D$}−C'(D)−$\Sigma_{p_k \notin PREEMPTSET(D)}$C'($p_k$)=min{∞, 110}−20−0=90.

Note that the latest start times computed by the Procedure A or A1 when using the latest-start-time schedule in FIG. 5B, are identical to the latest start times computed by any of the First, Second, or Third Time Slot Right Shift Procedures, which are respectively equal to the start times of the processes in FIG. 5B, that is, LS(A)=40, LS(C)=80, LS(D)=90.

Note that compared with applying the Procedure A or A1 to the original feasible pre-run-time schedule in FIG. 5A above, when the Procedure A or A1 for computing the latest start times is applied to the latest-start-time schedule of processes A, C, D computed by a Time Slot Right Shift Procedure in FIG. 5B, the latest start time for A, LS(A), improved/increased from 20 to 40; the latest start time for C, LS(C), also improved/increased, from 70 to 80; while the latest start time for D, LS(D), was kept the same at 90.

Note that even though the First, Second, and Third Time Slot Right Shift Procedures above have been described within this section titled "Pre-Run-Time Phase 2: Determining the Latest Start Time for Each P-h-k Process Given a Feasible Pre-Run-Time Schedule", any of the First, Second, and Third Time Slot Right Shift Procedures above can be used for computing or re-computing, the latest-start-time schedule, and the latest start times, for any process, either before run-time, or during run-time, when given a feasible pre-run-time schedule.

Any of the First, Second, and Third Time Slot Right Shift Procedures above can be used for computing or re-computing, the latest-start-time schedule, and the latest start times, for any process, either before run-time, or during run-time when given any of the feasible pre-run-time schedules in any of the Examples 1-9.

Note also that when using any of the First, Second, and Third Time Slot Right Shift Procedures above at run-time, at the start of each system major cycle corresponding to the least common multiple of the process periods, the feasible pre-run-time schedule should be initialized/restored to be consistent with a latest-start-time schedule of all the uncompleted processes.

Run-Time Phase

Scheduling A-h-k-a Processes

Each time the Run-Time Scheduler is executed, it will first try to schedule A-h-k-a processes according to an A-h-k-a Scheduler Method. Possible embodiments of an A-h-k-a Scheduler Method are provided in U.S. Pat. No. 7,444,638, and U.S. Pat. No. 7,165,252.

It is assumed in this paper that the worst-case computation times of A-h-k-a processes are estimated correctly. This can be achieved in practice by keeping the computations in interrupt service routines associated with asynchronous events very short and predictable, and shifting any remaining computation to periodic processes.

The Main Run-Time Scheduler

At run-time, the main run-time scheduler uses the order of the end times of the time slots of processes in the latest-start-time schedule for scheduling periodic processes.

A process x may be assigned a "criticality level", criticality(x), that is either NORMAL-CRITICALITY, HIGHER-CRITICALITY or HIGHEST-CRITICALITY. Initially, the criticality of all processes is set to NORMAL-CRITICALITY. Criticality levels for processes are used in combination with other conditions to increase the flexibility of the main run-time scheduler when making scheduling decisions at run-time.

An Embodiment I of the Main-Run-Time-Scheduler Method:

In an embodiment of the main-run-time-scheduler method, given a pre-run-time schedule of all the processes, at run-time there are the following main situations when the run-time scheduler may need to be invoked to perform a scheduling action:
(a) At a time t when some asynchronous process a has arrived and made a request for execution.
(b) At a time t when some process x has just completed its computation.
(c) At a time t that is equal to the latest start time LS($p_j$) of a process $p_j$.
(d) At a time t that is equal to the release time $R_{p_k}$ of a process $p_k$ that has not started execution.
(e) At a time t that is equal to the deadline $d_{p_i}$ of an uncompleted process $p_i$. (In this case, $p_i$ has just missed its deadline, and the system should handle the error.)

In situation (a) above, the run-time scheduler is usually invoked by an interrupt handler responsible for servicing requests generated by an asynchronous process.

In situation (b) above, the run-time scheduler is usually invoked by a kernel function responsible for handling process completions.

In situations (c), (d), and (e) above, the run-time scheduler is invoked by programming the timer to interrupt at the appropriate time.

Run-Time Scheduler Method

An embodiment of the run-time scheduler method is described below:

Let t be the current time.

Step 0.

In situation (e) above, check whether any process p has missed its deadline $d_p$. If so perform error handling.

if $\exists p, d_p \leq t \wedge \neg (e'(p) \leq t)$:

(p's deadline has passed, but p has not completed.)
then Handle_Deadline_Miss_Error(p)

Step 1.

In situation (a) above, if an A-h-k-a process $a_i$ has arrived, execute the A-h-k-a-Scheduler-Subroutine.

(See U.S. Pat. No. 7,444,638, col. 50, line 31, to col. 55, line 6; and U.S. Pat. No. 7,165,252, col. 50, line 47, to col. 55, line 55, "Run-Time Phase, A-h-k-a Scheduler Method," for detailed descriptions of possible embodiments of a Run-Time Phase, A-h-k-a-Scheduler-Subroutine.)

If some A-h-k-a process $a_i$ is selected for execution at time t by the A-h-k-a Scheduler, then goto Step 4 below.

Step 2.

In situation (c) above, at a time t that is equal to the latest start time $LS(p_i)$ of a process $p_i$, some process p may have overrun, that is, its remaining computation time is not greater than zero, and p has not yet completed its computation, that is, $\neg (C'(p) > 0) \wedge \neg (e(p) \leq t)$.

Re-compute latest start times $LS(p_j)$ for each uncompleted process $p_j$ that has not overrun, that is, $p_j$'s remaining computation time is greater than zero, and $p_j$ has not yet completed its computation, that is, $C'(p_j) > 0 \wedge \neg (e(p_j) \leq t)$.

Any of the methods for computing the latest start times for a set of processes given a feasible pre-run-time schedule, including any of the Procedures A and A1, and any of the First, Second, and Third, Time Slot Right Shift Procedures described earlier, can be used to recompute a latest-start-time schedule and latest start times $LS(p)$ for uncompleted processes p that have not overrun.

(In an Alternative Embodiment II of the Main Run Time Scheduler Method described later, additional conditions C1, C2, and C3 are used for determining, in situations (a), (b), (c), and (d) above, as well as in situation (f) in an Alternative Embodiment III of the Main Run Time Scheduler Method described later, whether to recompute the latest start time $LS(p_i)$ of each uncompleted periodic processes $p_i$ that has not overrun, using the up-dated value of the remaining worst-case computation time $C'(p)$ of the previously executing process p at time t. Alternative Step 2 and Alternative Step 4 described later in an Alternative Embodiment II of the Main Run Time Scheduler Method, can be used to replace Step 2 and Step 4 in the present embodiment of the Main Run Time Scheduler respectively. Such replacement of Step 2 and Step 4, will result in an alternative main run-time scheduler method in which additional conditions are used to determine, in situations a), (b), (c), and (d) above, whether to recompute the latest start time $LS(p_i)$ of each uncompleted periodic processes $p_i$ that has not overrun.)

If there exists any process p that has overrun, that is, its remaining computation time is not greater than zero, and p has not yet completed its computation, that is, $\neg (C'(p) > 0) \wedge \neg (e(p) \leq t)$, then check the process p which has overrun for possible errors.

When re-computing the latest start times using the updated value of the remaining computation time $C'(p)$ of any process p that has overrun, that is, p's remaining computation time is not greater than zero, and p has not yet completed its computation, that is, $\neg (C'(p) > 0) \wedge \neg (e(p) \leq t)$, it is possible that the latest start time $LS(p_i)$ for some uncompleted process $p_i$ could be further increased.

For each uncompleted process $p_j$, if its latest start time is greater than t, that is, $LS(p_j) > t$, as a result of re-computing the latest start times, and its criticality was previously set to HIGHER-CRITICALITY, then its criticality should be reset, that is, criticality($p_j$)=NORMAL-CRITICALITY.

If after recomputing latest start times $LS(p_j)$ for each uncompleted process $p_j$ that has not overrun, there does not exist any uncompleted process $p_i$ such that the current time t is equal to the latest start time $LS(p_i)$, then goto to Step 3 below. Uncompleted process $p_j$ may be selected to continue execution in Step 3.

If after recomputing latest start times $LS(p_j)$ for each uncompleted process $p_j$ that has not overrun, the current time t is equal to a latest start time $LS(p_i)$ for some uncompleted process $p_i$, then check whether any process p has overrun and cannot continue without causing another process $p_i$ to start later than $p_i$'s latest start time $LS(p_i)$. If so handle the situation. (When handling such overrun situations, one possible option would be to abort p immediately, in order to guarantee that $p_i$ will not miss its deadline; However, there may exist circumstances in which process $p_i$ cannot start before the preceding process p has completed, and $p_i$ would also have to be aborted if p is aborted; in such cases it may be worth the risk to simply let p continue, and hope that both processes can complete before $p_i$'s deadlines (see Example 8.). If the system designer decides to adopt the latter option, then the criticality level of the preceding process p, criticality(p) should also be set to HIGHER-CRITICALITY, so that p will be scheduled before $p_i$ in Case 2 of Step 3 below.)

if $\exists p, \neg (C'(p) > 0) \wedge \neg (e'(p) \leq t)$ (there exists p that has overrun, that is, $\neg (C'(p) > 0)$ and p has not completed) then Re-compute latest start times $LS(p)$ for uncompleted processes p that have not overrun, that is, p's remaining computation time is greater than zero, and p has not yet completed its computation, that is, $C'(p) > 0 \wedge \neg (e(p) \leq t)$. Check_For_Possible_Overrun_Errors(p)

For $\forall p_j, \neg (e'(p) \leq t) \wedge LS(p_j) \geq t \wedge$ criticality($p_j$)= HIGHER-CRITICALITY:

(for all uncompleted processes $p_j$ such that $p_j$s latest time $LS(p_j)$ is greater than the current time t, and its criticality was previously set to HIGHER-CRITICALITY:)
let criticality($p_j$)=NORMAL-CRITICALITY if $\not\exists p_i, LS(p_i)=t$ (after re-computing the latest start times, there does not exist any process $p_i$ that needs to start because the current time t is $p_i$'s latest start time.)
then goto Step 3
else if $\exists p, s'(p) \leq t \wedge \neg (e'(p) \leq t) \wedge \exists p_i, LS(p_i)=t \wedge (p \text{EX-CLUDES} p_i \vee p \text{PRECEDES} p_i)$ (there exists p that has already started and has not completed, and there exists $p_i$ that needs to start because the current time t is $p_i$'s latest start time; but once $p_i$ starts p will never be able to resume, because p EXCLUDES $p_i$, or p PRECEDES $p_i$.)
then Handle_Overrun_Situation(p)

Increase the criticality level of any process p for which p's latest start time has been reached after re-computing the latest start times.

if $\exists p, p \in P\text{-}g : (LS(p)=t)$ (there exists p such that its latest start time LS(p) is equal to t. Starting from time t, p's criticality level will be increased to be higher than all processes that have not yet completed and their latest start times have not been reached.)

then criticality(p)←HIGHER-CRITICALITY

Step 3.

Determine which process should be executed at time t as follows.

begin (Case 1)

if $\exists p, p \in P\text{-}g : \neg (s'(p) < t \wedge \text{criticality}(p) = \text{HIGHEST-CRITICALITY})$ (there exists p that has not completed and has a criticality level equal to HIGHEST-CRITICALITY.)

then select p for execution at time t.

else (Case 2)

if $\exists p, p \in P\text{-}g : \neg (e'(p) \le t) \wedge \text{criticality}(p) = \text{HIGHER-CRITICALITY} \wedge \not\exists p_i : p_i \in P\text{-}g : \text{criticality}(p_i) = \text{HIGHER-CRITICALITY} \wedge \neg (e'(p_i) \le t) \wedge e(p_i) < e(p))$ (there exists a critical process p with criticality level equal to HIGHER-CRITICALITY that has not completed, and there does not exist any other critical process $p_i$ with criticality level equal to HIGHER-CRITICALITY that has not yet completed, such that the end time of $p_i$'s time slot is ordered before the end time of p's time slot in the latest-start-time schedule) then select p for execution at time t.

else (Case 3)

if $\exists p, p \in P\text{-}g : R_p \le t \wedge \neg (e'(p) \le t) \wedge \forall p_i, p_i \in P\text{-}g, \neg (e'(p_i) \le t), e(p_i) < e(p) : \neg ((p_i \text{PRECEDES} p) \vee (p \text{EXCLUDES} p_i)) \wedge e(p) = \min\{e(p_j) | p_j \in P\text{-}g : R_{p_j} \le t \wedge \neg (e'(p_j) \le t) \wedge \forall p_i, p_i \in P\text{-}g, \neg (e'(p_i) \le t), e(p_i) < e(p_j) : \neg ((p_i \text{PRECEDES} p_j) \vee (p_j \text{EXCLUDES} p_i))\}$ (there exists p that is ready and has not completed, and for all $p_i$ that has not completed and the end time of $p_i$'s time slot is ordered before the end time of p's time slot in the latest-start-time schedule, $p_i$ does not PRECEDE p and p does not EXCLUDE $p_i$; and there does not exist any other $p_j$ such that its time slot end time is earlier than p's time slot end time in the latest-start-time schedule which satisfies these same conditions as p.)

then select p for execution at time t.

else (Case 4) (optional)

if $\exists p, p \in P\text{-}g : R_p \le t \wedge \neg (e'(p) \le t) \wedge \forall p_i, p_i \in P\text{-}g, \neg (e'(p_i) \le t), e(p_i) < e(p) : \neg (p_i \text{PRECEDES} p) \wedge C'(p) \le (\min\{R_{p_k} | p \ne p_k \wedge \neg (e'(p_k) \le t)\} - t) \wedge (\max\{d_{p_k} | p \ne p_k \wedge \neg (e'(p_k) \le t)\} > d_p - C'(p)) \wedge e(p) = \min\{e(p_j) | p_j \in P\text{-}g : R_{p_j} \le t \wedge \neg (e'(p_j) \le t) \wedge \forall p_i, p_i \in P\text{-}g, \neg (e'(p_i) \le t), e(p_i) < e(p_j) : \neg (p_i \text{PRECEDES} p_j) \wedge C'(p_j) \le (\min\{R_{p_k} | p_j \ne p_k \wedge \neg (e'(p_k) \le t)\} - t) \wedge (\max\{d_{p_k} | p_j \ne p_k \wedge \neg (e'(p_k) \le t)\} > d_{p_j} - C'(p_j))\}$ (there exists p that is ready and has not completed, and for all $p_i$ that has not completed and the end time of $p_i$'s time slot is ordered before the end time of p's time slot in the latest-start-time schedule, $p_i$ does not PRECEDE p, and p's remaining computation time is less than or equal to: the earliest release time of all uncompleted processes $p_k$ that are not equal to p, minus t; and there does not exist any other $p_j$ such that its time slot end time is earlier than p's time slot end time in the latest-start-time schedule which satisfies these same conditions as p.)

then criticality(p)←HIGHEST-CRITICALITY select p for execution at time t.

else (Case 5)

if $\exists a_i, a_i \in A\text{-}s\text{-}k : R_{a_i} \le t \wedge \neg (e'(a_i) \le t) \wedge \not\exists x : (s'(x) < t \wedge \neg (e'(x) \le t) \wedge ((x \text{ excludes } a_i) \vee (\exists a_j, a_j \in A\text{-}s\text{-}k : s'(x) < t \wedge \neg (e'(x) \le t) \wedge x \text{ excludes } a_j \wedge d_{a_j} < d_x \wedge d_{a_j} < d_{a_i})))$ (there exists A-s-k process $a_i$ that is ready and has not completed, and there does not exist any other process x such that x excludes $a_i$ or x excludes some process $a_j$ such that $a_j$ has a deadline that is less than x's and $a_i$'s deadline, and x has started but not completed)

then select among them, a process $a_i$ that has the shortest deadline;

if among such processes there are some that have already started, then choose a process that has already started.

then select $a_i$ for execution at time t else (Case 6)

if $\exists a_i, a_i \in A\text{-}s\text{-}u : R_{a_i} \le t \wedge \neg (e'(a_i) \le t) \wedge \not\exists x : (s'(x) < t \wedge \neg (e'(x) \le t) \wedge ((x \text{ excludes } a_i) \vee (\exists a_j, a_j \in A\text{-}s\text{-}u : s'(x) < t \wedge \neg (e'(x) \le t) \wedge x \text{ excludes } a_j \wedge d_{a_j} < d_x \wedge d_{a_j} < d_{a_i})))$ (there exists A-s-u process $a_i$ that is ready and has not completed, and there does not exist any other process x such that x excludes $a_i$ or x excludes some process $a_j$ such that $a_j$ has a deadline that is less than both x's and $a_i$'s deadline, and x has started but not completed)

then select among them, a process $a_i$ that has the shortest deadline;

if among such processes there are some that have already started, then choose a process that has already started.

then select $a_i$ for execution at time t end.

Step 4.

If some uncompleted periodic process $p_j$, was executing at time t−1, and $p_j$ has not overrun, that is, $C'(p_j) > 0 \wedge \neg (e'(p_j) \le t)$, and the process x selected for execution at time t is a different process, that is, $x \ne p_j$, or if some process has just completed its computation, and if the latest start time $LS(p_i)$ for uncompleted processes had not been previously re-computed in Step 2, then re-compute the latest start time $LS(p_i)$ for uncompleted processes $p_i$ that have not overrun, that is, $C'(p_i) > 0 \wedge \neg (e'(p_i) \le t)$, using the updated value of $p_j$'s remaining computation time $C'(p_j)$.

(As mentioned earlier, in an Alternative Embodiment II of the Main Run Time Scheduler Method described later, an Alternative Step 4 can be used to replace Step 4 above. Alternative Step 4 uses a condition C3 to determine whether to recompute the latest start time $LS(p_i)$ of each uncompleted periodic processes $p_i$ that has not overrun, using the up-dated value of the remaining worst-case computation time C'(p) of the previously executing process p at time t.)

(In accordance with an Alternative Embodiment IV of the Main Run Time Scheduler Method described later, an embodiment of an Alternative Procedure B, can be used to re-compute, at run-time, using a very short amount of time, the latest start time LS(p) of an uncompleted process p that has not overrun, when given a most recent latest-start-time schedule. This provides flexibility to minimize system overhead at run-time when time is critical.)

For each uncompleted process $p_j$, if its latest start time is greater than t, that is, $LS(p_j) > t$, as a result of re-computing the latest start times, and its criticality was previously set to HIGHER-CRITICALITY, then its criticality should be reset, that is, criticality($p_j$)=NORMAL-CRITICALITY.

Step 5.

At time 0 and after servicing each timer interrupt, and performing necessary error detection, error handling, latest start time re-calculations, and making scheduling decisions;
—reset the timer to interrupt at the earliest time that any of the events (c), (d), and (e) above may occur as follows:

$$\text{Next\_Interrupt\_Time} = \min\{D, LS, R\}$$

where $D = \min\{d_{p_i} | (d_{p_i} > t) \wedge \neg(e'(p_i) \leq t))\}$ $LS = \min\{LS(p_j) | \neg(e'(p_j) \leq t) \wedge (LS(p_j) > t) \wedge (p_j$ was NOT selected for execution at run-time t)$\}$ $R = \min\{R_{p_k} | (\neg(p_k) \leq t) \wedge R_{p_k} > t \wedge (\forall p_i, p_i \in P\text{-g}, \neg(s'(p_k) \leq t) \wedge e(p_i) < e(p_k): \neg((p_i \text{PRECEDES} p_k) \vee (p_k \text{EXCLUDES} p_i))) \wedge (\neg(\exists p: p \text{ was selected for execution at run-time } t) \wedge (e(p) < e(p_k))))\}$ (R is equal to the earliest release time $R_{p_k}$ such that $p_k$ has not started, and for all $p_i$ that has not started and the end time of $p_i$'s time slot is ordered before the end time of $p_k$'s time slot in the latest-start-time schedule, $p_i$ does not PRECEDE $p_k$ and $p_k$ does not EXCLUDE $p_i$; and there does not exist any process p such that p was selected for execution at run-time t and the end time of p's time slot is ordered before the end time of $p_k$'s time slot in the latest-start-time schedule)

(In an Alternative Embodiment III of the Main Run Time Scheduler Method described later, the run-time scheduler may also be invoked at a time when some process p has overrun, that is, its remaining computation time is not greater than zero, and p has not yet completed its computation, that is, $\neg(C'(p) > 0) \wedge \neg(e(p) \leq t)$. The latter event is called situation (f) in an Alternative Embodiment III of the Main Run Time Scheduler Method. Alternative Step 5 described later in an Alternative Embodiment III of the Main Run Time Scheduler Method, can be used to replace Step 5 in the present embodiment of the Main Run Time Scheduler. Such replacement of Step 5 will result in an alternative main run-time scheduler method in which the run-time scheduler may also be invoked at a time when some process p has overrun.)

Step 6.

If a process x was selected in the previous steps, then let the selected process x execute at run-time t.

An Alternative Embodiment II of the Main-Run-Time-Scheduler Method:

In an Alternative Embodiment II of the Main Run Time Scheduler Method described below, additional conditions C1, C2, and C3 are used for determining, in situations (a), (b), (c), and (d) when the run-time scheduler is invoked to perform a scheduling action described earlier in the description of an Embodiment I of the Main Run Time Scheduler Method (as well as in situation (f) in an Alternative Embodiment III of the Main Run Time Scheduler Method described later), whether to recompute the latest start time $LS(p_i)$ of each uncompleted periodic processes $p_i$ that has not overrun, using the up-dated value of the remaining worst-case computation time $C'(p)$ of the previously executing process p at time t.

In an Alternative Embodiment II of the Main Run Time Scheduler Method, in situations (a), (b), (c), and (d) (as well as in situation (f) in an Alternative Embodiment III of the Main Run Time Scheduler Method described later), if any one of the additional conditions C1, C2, and C3 is true, the latest start time LS(p) of each uncompleted periodic processes p that has not overrun will be re-computed. Any of the First, Second, and Third, Time Slot Right Shift Procedures described earlier, can be used to recompute latest start times LS(p) for uncompleted processes p that have not overrun, by computing either before run-time, or at run-time, a latest-start-time schedule for uncompleted processes p that have not overrun.

The Alternative Step 2 and Alternative Step 4 described below, can be used to replace Step 2 and Step 4 of an Embodiment I of the Main Run Time Scheduler Method, in an alternative main run-time scheduler method in which additional conditions are used to determine, in situations (a), (b), (c), (d), and (f), whether the latest start time $LS(p_i)$ of each uncompleted periodic processes $p_i$ that has not overrun should be re-computed.

In situations (a), (b), (c), (d), and (f), at time t, when the remaining worst-case computation time $C'(p)$ of the previously executing periodic process p is updated, and the new value of $C'(p)$ is used to compute the latest start time $LS(p_i)$ for some uncompleted periodic processes $p_i$ that has not overrun, that is, $C'(p_i) > 0 \wedge \neg(e'(p_i) \leq t))$, it is possible that the value of $LS(p_i)$ could be further increased.

In situations a), (b), (c), (d), and (f), at time t, it is possible that the previously executing process p has just completed its computation at time t, and did not overrun, that is, $C'(p)=0 \wedge \neg(e(p)=t)$; or the previously executing process p has overrun, that is, its remaining computation time is not greater than zero, and p has not yet completed its computation, that is, $\neg(C'(p) > 0) \wedge \neg(e(p) \leq t)$; or the previously executing process p has not overrun and p has not completed, that is, $C'(p) > 0 \wedge \neg(e(p) \leq t)$.

The conditions C1, C2, and C3 are as follows:

Condition C1: $\exists p, p_k$: (p was executing at time t−1)$\wedge \neg(e'(p_k) \leq t) \wedge C'(p_k) > 0 \wedge s(p_k) < e(p) \wedge (e(p) < e(p_k))$ in the most recent computed latest-start-time schedule (The start time of some uncompleted process $p_k$'s time slot precedes the end time of the previously executing process p's time slot, and the end time of p's time slot precedes the end time of $p_k$'s time slot in the most recent computed latest-start-time schedule.)

Condition C2: $\exists p, p_k$: (p was executing at time t−1)$\wedge \neg(e'(p_k) \leq t) \wedge C'(p_k) > 0 \wedge s(p_k) < e(p) \wedge (e(p_k) < d_{p_k})$ in the most recent computed latest-start-time schedule (The start time of some uncompleted process $p_k$'s time slot precedes the end time of the previously executing process p's time slot, and the end time of $p_k$'s time slot precedes $p_k$'s deadline $d_{p_k}$, and the start time of p's time slot precedes $p_k$'s deadline $d_{p_k}$ in the most recent latest-start-time schedule.)

Condition C3: $\exists p$: (p was executing at time t−1)$\wedge \neg(e'(p) \leq t)) \wedge C'(p) > 0 \wedge (\neg(p \text{ is selected for execution at run-time t}))$ (The previously executing process p is uncompleted and p has not overrun and p is not selected for execution at time t.)

The Conditions C1 and C2 are used in an Alternative Step 2, while Condition C3 is used in an Alternative Step 4 as follows.

Alternative Step 2.

If there exists any process p that has overrun, that is, its remaining computation time is not greater than zero, and p has not yet completed its computation, that is, $\neg(C'(p) > 0) \wedge \neg(e(p) \leq t)$, then check the process p which has overrun for possible errors.

If either Condition C1 or C2 is true, then re-compute latest start time $LS(p_i)$ for each uncompleted periodic processes $p_i$ that has not overrun, using the up-dated value of the remaining worst-case computation time $C'(p)$ of the previously executing process p at time t in Step 2.

For each uncompleted process $p_j$, if its latest start time is greater than t, that is, $LS(p_j)>t$, as a result of re-computing the latest start times, and its criticality was previously set to HIGHER-CRITICALITY, then its criticality should be reset, that is, criticality($p_j$)=NORMAL-CRITICALITY.

If after recomputing latest start times $LS(p_j)$ for each uncompleted process $p_j$ that has a remaining worst-case computation time that is greater than zero, that is, $C'(p)>0$, the current time t is equal to a latest start time $LS(p_i)$ for some uncompleted process $p_i$, then check whether any process p has overrun and cannot continue without causing another process $p_i$ to start later than $p_i$'s latest start time $LS(p_i)$. If so handle the situation. (When handling such overrun situations, one possible option would be to abort p immediately, in order to guarantee that $p_i$ will not miss its deadline; However, there may exist circumstances in which process $p_i$ cannot start before the preceding process p has completed, and $p_i$ would also have to be aborted if p is aborted; in such cases it may be worth the risk to simply let p continue, and hope that both processes can complete before $p_i$'s deadlines (see FIG. 9 in Example 8.). If the system designer decides to adopt the latter option, then the criticality level of the preceding process p, criticality(p) should also be set to HIGHER-CRITICALITY, so that p will be scheduled before $p_i$ in Case 2 of Step 3 below.)

if $\exists p, C'(p)=0 \land \neg(e'(p) \le t)$ (there exists p that has overrun, that is, $C'(p)=0$ and p has not completed) then Check_For_Possible_Overrun_Errors(p)

if ((C1)$\exists p, p_k$: (p was executing at time $t-1) \land C'(p_k)>0 \land \neg(e'(p_k) \le t) \land s(p_k)<e(p) \land (e(p)<e(p_k))$ in the most recent computed latest-start-time schedule)
$\lor$ ((C2)$\exists p, p_k$: (p was executing at time $t-1) \land C'(p_k)>0 \land \neg(e'(p_k) \le t) \land s(p_k)<e(p) \land (e(p_k)<d_{p_k}) \land (s(p)<d_{p_k})$ in the most recent computed latest-start-time schedule)

(If (Condition C1) the start time of some uncompleted process $p_k$'s time slot precedes the end time of the previously executing process p's time slot, and the end time of p's time slot precedes the end time of $p_k$'s time slot in the most recent computed latest-start-time schedule; or, (Condition C2) the start time of some uncompleted process $p_k$'s time slot precedes the end time of the previously executing process p's time slot, and the end time of $p_k$'s time slot precedes $p_k$'s deadline $d_{p_k}$, and the start time of p's time slot precedes $p_k$'s deadline $d_{p_k}$ in the most recent computed latest-start-time schedule)

Then Re-compute latest start times $LS(p_k)$ for processes $p_k$ that have not overrun, that is, $p_k$'s remaining computation time is greater than zero, and $p_k$ has not yet completed its computation, that is, $C'(p_k)>0 \land \neg(e(p_k) \le t)$.

For $\forall p_j, \neg(e'(p) \le t) \land LS(p_j) \le t \land$ criticality($p_j$)= HIGHER-CRITICALITY:

(for all uncompleted processes $p_j$ such that $p_j$'s latest time $LS(p_j)$ is greater than the current time t, and its criticality was previously set to HIGHER-CRITICALITY:)
let criticality($p_j$)=NORMAL-CRITICALITY if $\nexists p_i, LS(p_i)=t$ (after re-computing the latest start times, there does not exist any process $p_i$ that needs to start because the current time t is $p_i$'s latest start time.)

then goto Step 3
else if $\exists p, s'(p) \le t \land \neg(e'(p) \le t) \land \exists p_i, LS(p_i)=t \land (p \text{EXCLUDES} p_i \lor p \text{PRECEDES} p_i)$ (there exists p that has already started and has not completed, and there exists $p_i$ that needs to start because the current time t is $p_i$'s latest start time; but once $p_i$ starts p will never be able to resume, because p EXCLUDES $p_i$, or p PRECEDES $p_i$.)
then Handle_Overrun_Situation(p)

Increase the criticality level of any process p for which p's latest start time has been reached after re-computing the latest start times.

if $\exists p, p \in P\text{-}g:(LS(p)=t)$ (there exists p such that its latest start time $LS(p)$ is equal to t. Starting from time t, p's criticality level will be increased to be higher than all processes that have not yet completed and their latest start times have not been reached.)
then criticality(p)←HIGHER-CRITICALITY (End of Alternative Step 2 of Alternative Embodiment II of the Main Run Time Scheduler Method.)

(See FIGS. 6A, 6B, and 6C for an illustration of Alternative Step 2 in Alternative Embodiment II of the Main Run Time Scheduler Method.)

Alternative Step 4.

If Condition C3 is true, that is, if some uncompleted periodic process p, was executing at time $t-1$, and p has not overrun, and the process x selected for execution at time t is a different process, that is, $x \ne p$, and the latest start time $LS(p_i)$ for uncompleted processes $p_i$ that have not overrun were not re-computed in Step 2, then re-compute the latest start time $LS(p_i)$ for uncompleted processes $p_i$ that have not overrun, using the updated value of p's remaining computation time $C'(p)>0$.

if the latest start time $LS(p_i)$ for uncompleted processes $p_i$ that have not overrun were not re-computed in Step 2 and (C3) $\exists p$: (p was executing at time $t-1) \land \neg(e'(p) \le t) \land C'(p)>0 \land (\neg(p \text{ was selected for execution at run-time } t))$ (If the latest start time $LS(p_i)$ for uncompleted processes $p_i$ that have not overrun were not re-computed in Step 2 and (Condition C3) the previously executing process p is uncompleted and p has not overrun and p is not selected for execution at time t)

Then Re-compute latest start times $LS(p_i)$ for processes $p_i$ that have not overrun, that is, $p_i$'s remaining computation time is greater than zero, and $p_i$ has not yet completed its computation, that is, $C'(p_i)>0 \land \neg(e(p_i) \le t)$.

For each uncompleted process $p_j$, if its latest start time is greater than t, that is, $LS(p_j)>t$, as a result of re-computing the latest start times, and its criticality was previously set to HIGHER-CRITICALITY, then its criticality should be reset, that is, criticality($p_j$)=NORMAL-CRITICALITY.

(End of Alternative Step 4 in Alternative Embodiment II of the Main Run Time Scheduler Method.)

(See FIG. 7 for an illustration of Alternative Step 4 in Alternative Embodiment II of the Main Run Time Scheduler Method.)

Example 3

Here we demonstrate how an embodiment of the run-time scheduler will handle possible overruns and underruns of the set of processes A, C, D in Example 2, FIG. 5A, generating the run-time execution scenario shown in FIG. 5E, in which process C is allowed to overrun, using the latest-start-time schedule shown in FIG. 5B that is computed prior to run-time t=0, and the latest start times LS(A), LS(B), LS(C) of the processes A, C, D, that are computed using the latest-start-time schedules shown in FIGS. 5B, 5C, and 5D with any of the Time Slot Right Shift Procedures.

In FIG. 5E, the portion of the run-time execution during which C overruns is shown using dashed lines.

In the pre-run-time phase, any of the Time Slot Right Shift Procedures, will compute the initial latest-start-time-schedule shown in FIG. 5B, with the following latest start times for time t=0 (see Example 2):
LS(A)=40; LS(C)=80; LS(D)=90.

The run-time execution of the processes A, C, D is shown in FIG. 5E.

At run-time t=0: the run-time scheduler will be invoked since t=$R_A$=0. The run-time scheduler will select process A for execution in Case 3 of Step 3 at time 0.

At t=0 in Step 5, the timer will be programmed to interrupt at process C's release time $R_C$=30, before actually dispatching A for execution in Step 6.

At t=30: the timer interrupts, invoking the run-time scheduler since t=$R_C$=30. The run-time scheduler will select process C for execution in Case 3 of Step 3 at time 30.

At t=30 in Step 4, since a different process C was selected for execution, preempting process A, the latest start time of A, LS(A), will be re-computed, using the up-to-date remaining computation time of A, C'(A)=20, resulting in a newer, increased latest start time for A:
LS(A)=70.

At t=30, the latest start time LS(A) will be re-computed in Step 4 of any of the embodiments of the Run Time Scheduler, including Alternative Step 4 of Alternative Embodiment II of the Run-Time Scheduler because Condition C3 is true, since the previously executing process A is uncompleted and A has not overrun and A is not selected for execution at time t=30. The latest-start-time-schedule computed by any of the Time Slot Right Shift Procedures using the up-to-date remaining computation time of A, C'(A)=20, is shown in FIG. 5C.

At t=30 in Step 5, the timer will be programmed to interrupt at time LS(A)=70, before actually dispatching C for execution in Step 6.

At t=70 the timer interrupts. In Step 2, the latest start times of processes that have not started will be re-computed. Since process C has overrun, that is, its remaining computation time is not greater than zero, and C has not yet completed its computation, that is, ¬(C'(C)>0)∧ ¬(e(C) ≤t), process C will not be considered anymore when re-computing the latest start times. This will result in a new increased latest start time for A:
LS(A)=110.

At t=70, the latest start time LS(A) will be re-computed in Step 2 of any of the embodiments of the Run Time Scheduler, including Alternative Step 2 of Alternative Embodiment II of the Run-Time Scheduler because Condition C1 is true, since the start time s(A)=70 of uncompleted process A's time slot precedes the end time e(C)=120 of the previously executing process C's time slot, and the end time e(C)=120 of C's time slot precedes the end time e(A)=130 of A's time slot in the most recent latest-start-time schedule shown in FIG. 5C. The latest-start-time schedule computed by any of the Time Slot Right Shift Procedures using the up-to-date remaining computation time of C, C'(C)=0, is shown in FIG. 5D.

After checking that no fatal error for C has occurred, the run-time scheduler will select process C for execution in Case 3 of Step 3 at time 70.

At t=70 in Step 5, the timer will be programmed to interrupt at the latest start time for D, LS(D)=90, before actually dispatching C for execution in Step 6.

At t=90: process C has continued to overrun until time 90, at which the timer will interrupt at the latest start time for D, LS(D)=90, invoking the run-time scheduler. The run-time scheduler will set criticality(D) to HIGHER-CRITICALITY in Step 2. Then the run-time scheduler will select process D for execution in Case 2 of Step 3 at time 90.

At t=90 in Step 5, the timer will be programmed to interrupt at D's deadline $d_D$=110, before actually dispatching D for execution in Step 6.

At t=100: process D underruns, completing its computation at time 100 and invoking the run-time scheduler. The run-time scheduler will select process C for execution in Case 3 of Step 3 at time 100.

At t=100 in Step 5, the timer will be programmed to interrupt at the latest start time for A, LS(A)=110, before actually dispatching C for execution in Step 6.

At t=110: process C has continued to overrun until time 110, at which the timer will interrupt at the latest start time for A, LS(A)=110, invoking the run-time scheduler. The run-time scheduler will set criticality(A) to HIGHER-CRITICALITY in Step 2. Then the run-time scheduler will select process A for execution in Case 2 of Step 3 at time 110.

At t=110 in Step 5, the timer will be programmed to interrupt at C's deadline $d_C$=120, before actually dispatching A for execution in Step 6.

At t=115: process A underruns, completing its computation at time 115 and invoking the run-time scheduler. The run-time scheduler will select process C for execution in Case 3 of Step 3 at time 115.

At t=115 in Step 5, the timer will be programmed to interrupt at C's deadline $d_C$=120, before actually dispatching C for execution in Step 6.

At t=120: process C completes its computation before its deadline expires.

Example 4

Here we demonstrate how an embodiment of the run-time scheduler will handle possible overruns and underruns of the set of processes A, C, D, E, F, G, H, to generate the run-time execution scenario shown in FIG. 13E, in which process F and E are allowed to overrun, given the feasible pre-run-time schedule given in FIG. 13A.

In FIG. 13E, the portions of the run-time execution during which F and E overruns are respectively shown using dashed lines.

In the pre-run-time phase of an embodiment, one may use any of the Time Slot Right Shift Procedures when given the original pre-run-time schedule in FIG. 13A to compute the initial latest-start-time schedule illustrated in FIG. 13B.

In the pre-run-time phase, any of the Time Slot Right Shift Procedures for computing the latest start times, will compute the following values at time t=0:
LS(A)=1; LS(E)=3; LS(D)=4, LS(F)=6, LS(B)=7, LS(C)=9, LS(G)=11, LS(H)=12.

The run-time execution of the processes A, C, D, E, F, G, H, is shown in FIG. 13E.

At run-time t=0: the run-time scheduler will be invoked since t=$R_A$=0. The run-time scheduler will select process A for execution in Case 3 of Step 3 at time 0.

At t=0 in Step 5, the timer will be programmed to interrupt at process A's deadline $d_A=3$, before actually dispatching A for execution in Step 6.

At t=3, process A completes before its deadline after overrunning. Since process E's latest start time LS(E)=3, criticality(E) is set to HIGHER-CRITICALITY. The run-time scheduler will select process E for execution in Case 2 of Step 3 at time 3.

At t=3 in Step 5, the timer will be programmed to interrupt at time LS(D)=4, before actually dispatching E for execution in Step 6.

At t=4, the timer interrupts, since t=LS(D)=4. After re-computing the latest start times, the latest start time for E will be increased to LS(E)=14. Since LS(E)=14>t=4, criticality(E) will be set to NORMAL-CRITICALITY. Since process D's latest start time LS(E) is equal to the current time t=4, criticality(D) is set to HIGHER-CRITICALITY.

At t=4, the latest start time LS(E) re-computed in Step 4 of any of the embodiments of the Run Time Scheduler, including Alternative Step 4 of Alternative Embodiment II of the Run-Time Scheduler because Condition C3 is true, since the previously executing process E is uncompleted and E has not overrun and E is not selected for execution at time t=4. The latest-start-time schedule computed by any of the Time Slot Right Shift Procedures using the up-to-date remaining computation time of E, C'(E)=2, is shown in FIG. 13C.

The run-time scheduler will select process D for execution in Case 2 of Step 3, thus D preempts E at time 4.

At t=4 in Step 5, the timer will be programmed to interrupt at time LS(F)=6, before actually dispatching D for execution in Step 6.

At t=5, process D underruns, completing its computation.

The run-time scheduler will select process F for execution in Case 3 of Step 3 at time 5.

At t=5 in Step 5, the timer will be programmed to interrupt at time LS(B)=7, which is also process F's deadline $d_F$, before actually dispatching F for execution in Step 6.

At t=7, process F completes its computation after overrunning. Since process B's latest start time LS(B) is equal to the current time t=7, criticality(B) is set to HIGHER-CRITICALITY.

The run-time scheduler will select process B for execution in Case 2 of Step 3 at time 7.

At t=7 in Step 5, the timer will be programmed to interrupt at time LS(C)=9, before actually dispatching B for execution in Step 6.

At t=8, process B underruns, completing its computation.

The run-time scheduler will select process C for execution in Case 3 of Step 3 at time 8.

At t=8 in Step 5, the timer will be programmed to interrupt at time LS(G)=11, before actually dispatching C for execution in Step 6.

At t=10, process C completes its computation, invoking the run-time scheduler.

The run-time scheduler will select process H for execution in Case 3 of Step 3 at time 10.

At t=10 in Step 5, the timer will be programmed to interrupt at time LS(G)=11, before actually dispatching H for execution in Step 6.

At t=11, the timer interrupts, since t=LS(G)=11. After re-computing the latest start times, the latest start time for H will be increased to LS(H)=13. Since process G's latest start time LS(G) is equal to the current time t=11, criticality(G) is set to HIGHER-CRITICALITY.

At t=11, the latest start time LS(H) is re-computed in Step 4 of any of the embodiments of the Run Time Scheduler, including Alternative Step 4 of Alternative Embodiment II of the Run-Time Scheduler because Condition C3 is true, since the previously executing process H is uncompleted and H has not overrun and H is not selected for execution at time t=11. The latest-start-time schedule computed by any of the Time Slot Right Shift Procedures using the up-to-date remaining computation time of H, C'(H)=1, is shown in FIG. 13D.

The run-time scheduler will select process G for execution in Case 2 of Step 3, thus G preempts H at time 11.

At t=11 in Step 5, the timer will be programmed to interrupt at time $d_G=12$, before actually dispatching G for execution in Step 6.

At t=12, process G completes its computation, invoking the run-time scheduler.

The run-time scheduler will select process H for execution in Case 3 of Step 3 at time 12.

At t=12 in Step 5, the timer will be programmed to interrupt at time LS(E)=14, before actually dispatching H for execution in Step 6.

At t=13, process H completes its computation, invoking the run-time scheduler.

The run-time scheduler will select process E for execution in Case 3 of Step 3 at time 13.

At t=13 in Step 5, the timer will be programmed to interrupt at time $d_E=16$, before actually dispatching E for execution in Step 6.

At t=16, process E completes it computation after overrunning, and still meets its deadline.

Example 5

The following example demonstrates how an embodiment generates the run-time execution scenario shown in FIG. 14D, in which processes A and D are allowed to overrun, when given the feasible pre-run-time schedule shown in FIG. 14A.

In FIG. 14D, the portions of the run-time execution during which A and D overruns are respectively shown using dashed lines.

Suppose that an embodiment of the main run-time scheduler needs to schedule the five periodic processes A, B, C, D, E, F, when given the feasible pre-run-time schedule shown in FIG. 14A.

It is assumed that the following exclusion relations are defined:

A EXCLUDES B, and F EXCLUDES E.

It is assumed that the following precedence relations are defined:

E PRECEDES D.

In the pre-run-time phase of an embodiment, one may use any of the Time Slot Right Shift Procedures when given the original pre-run-time schedule in FIG. 14A to compute the initial latest-start-time schedule illustrated in FIG. 14B.

Here we demonstrate how the run-time scheduler in an embodiment will schedule the set of processes A, B, C, D, E, F, generating the run-time execution scenario shown in FIG. 14D, in which processes A and D are allowed to overrun, using latest start times LS(A), LS(B), LS(C), LS(D), LS(E), LS(F) of the processes A, B, C, D, E, F, that are computed using the initial latest-start-time schedule shown in FIG. 14B that is produced by any of the Time Slot Right Shift Procedures.

In the pre-run-time phase, the embodiment for computing the latest start times, will compute the following latest start time values for time t=0:

LS(C)=1; LS(B)=2; LS(A)=5, LS(E)=11, LS(F)=13, LS(D)= 16.

At run-time t=0: the run-time scheduler will be invoked since t=$R_C$=0. The run-time scheduler will select process C for execution in Case 3 of Step 3 at time 0. Note that if A is scheduled to run at time t=0 instead of C, it may cause B to miss its deadline. A cannot be scheduled before B according to Case 3 of Step 3 of the main run-time scheduler, because A EXCLUDES B, and the end time of the time slot allocated to B is before the end time of the time slot allocated to A, that is, e(B)<e(A) in the feasible pre-run-time schedule in FIG. 14B.

At t=0 in Step 5, the timer will be programmed to interrupt at process B's latest start time LS(B)=2, before actually dispatching C for execution in Step 6.

At t=1: process C underruns, completing its computation at time 1 and invoking the run-time scheduler. Because C's remaining computation C'(C)=0, after re-computing latest start times, the latest start time for A will be increased to LS(A)=6.

At t=1, the latest start time LS(A) is re-computed in Step 2 of any of the embodiments of the Run Time Scheduler, including Alternative Step 2 of Alternative Embodiment II of the Run-Time Scheduler because Condition C2 is true, since the start time s(A)=5 of uncompleted process A's time slot precedes the end time e(C)=11 of the previously executing process C's time slot, and the end time e(A) of A's time slot precedes A's deadline $d_A$=9, and the start time s(C)=1 of C's time slot precedes A's deadline $d_A$=9 in the most recent latest-start-time schedule shown in FIG. 14B. The latest-start-time-schedule computed by any of the Time Slot Right Shift Procedures using the up-to-date remaining computation time of C, C'(C)=0, is shown in FIG. 14C.

At t=1, the processor will be idle, because the run-time scheduler cannot select process A or process F for execution according to the conditions that must be satisfied in Case 3 of Step 3 at time 1, even though the release times of both A and F are 0, and the processor will be idle, because for A there exists B such that B has not completed and the end of the time slot for B is earlier than the end of the time slot for A in the pre-run-time schedule; and for F there exists E such that E has not completed and the end of the time slot for E is earlier than the end of the time slot for F in the pre-run-time schedule. Note that if A was allowed to execute at time 1, it could cause B to miss its deadline since A EXCLUDES B. Similarly, if F was allowed to execute at time 1, it could cause E to miss its deadline since F EXCLUDES E.

At t=1 in Step 5, the timer will be programmed to interrupt at process B's latest start time LS(B)=2, before idling the processor since no process was selected for execution in Step 6.

At t=2: the timer will interrupt at the latest start time for B, LS(B)=2, and invoking the run-time scheduler. The run-time scheduler will set criticality(B) to HIGHER-CRITICALITY in Step 2. Then the run-time scheduler will select process B for execution in Case 2 of Step 3 at time 2.

At t=2 in Step 5, the timer will be programmed to interrupt at process B's deadline $d_B$=5, before actually dispatching B for execution in Step 6.

At t=4, B underruns, completing its computation and invoking the run-time scheduler. Then the run-time scheduler will select process A for execution in Case 3 of Step 3 at time 4.

At t=4, the timer will be programmed to interrupt at process A's deadline $d_A$=9, before actually dispatching A for execution in Step 6.

At t=9, A completes after overrunning, but still meets its deadline. The processor is idle at t=9, because the run-time scheduler cannot select process F for execution according to the conditions that must be satisfied in Case 3 of Step 3 at time 1, even though the release times of F is 0, because for F there exists E such that E has not completed and the end of the time slot for E is earlier than the end of the time slot for F in the pre-run-time schedule. Note that if F was allowed to execute at time 9, it could cause E to miss its deadline since F EXCLUDES E. The scheduler also cannot schedule D for execution at time 9, because E PRECEDES D, and E has not yet completed its computation.

At t=9 in Step 5, the timer will be programmed to interrupt at process E's release time $R_E$=10, before idling the processor since no process was selected for execution in Step 6.

At t=10, the timer interrupts at process E's release time $R_E$=10, invoking the scheduler. The scheduler will select process E for execution in Case 3 of Step 3 at time 10.

At t=10, the timer will be programmed to interrupt at process E's deadline $d_E$=13, before actually dispatching A for execution in Step 6.

At t=12: process E completes its computation and invokes the run-time scheduler. The run-time scheduler will select process D for execution in Case 3 of Step 3 at time 12.

At t=12 in Step 5, the timer will be programmed to interrupt at the latest start time for F, LS(F)=13, before actually dispatching D for execution in Step 6.

At t=13, the timer interrupts at the latest start time for F, LS(F)=13, invoking the scheduler. D still has not completed its computation at time 13. After re-computing the latest start times, because D's remaining computation time C'(D)=0, the latest start time for F will be increased to LS(F)=14.

The scheduler will select process D for execution in Case 3 of Step 3 at time 13, allowing D to overrun.

At t=13, the timer will be programmed to interrupt at process F's adjusted latest start time LS(F)=14, before actually dispatching D for execution in Step 6.

At t=14, the timer interrupts at process F's adjusted latest start time LS(F)=14, invoking the run-time scheduler. The run-time scheduler will set criticality(F) to HIGHER-CRITICALITY in Step 2. Then the run-time scheduler will select process F for execution in Case 2 of Step 3 at time 14. Process D will be preempted by F.

At t=14, the timer will be programmed to interrupt at process F's deadline $d_F$=18, before actually dispatching F for execution in Step 6.

At t=16, F underruns, completing its computation. The run-time scheduler will select D and in Case 3 of Step 3 at time 16, allowing process D to continue to overrun.

At t=16, the timer will be programmed to interrupt at process D's deadline $d_D$=17, before actually dispatching D for execution in Step 6.

At t=17, process D completes its computation before its deadline expires, despite overrunning.

Example 6

The following example demonstrates how an embodiment generates the run-time execution scenario shown in FIG. 11C, in which process C overruns, when given the feasible pre-run-time schedule shown in FIG. 11A.

In FIG. 11C, the portions of the run-time execution during which C overruns are shown using dashed lines.

In the pre-run-time phase of an embodiment, one may use any of the Time Slot Right Shift Procedures when given the original pre-run-time schedule in FIG. 11A to compute the initial latest-start-time schedule illustrated in FIG. 11B.

Here we demonstrate how the run-time scheduler in an embodiment will schedule the set of processes A, B, C and D, using latest start times LS(A), LS(B), LS(C), LS(D) of the processes A, B, C, D, that are computed using the latest-start-time schedule shown in FIG. 11B that is produced by any of the Time Slot Right Shift Procedures.

In the pre-run-time phase, the embodiment for computing the latest start times, will compute the following latest start time values for time t=0:
LS(A)=1; LS(B)=4; LS(C)=9, LS(D)=13.

At run-time t=0: the run-time scheduler will be invoked since t=$R_A$=0. The run-time scheduler will select process A for execution in Case 3 of Step 3 at time 0.

At t=0 in Step 5, the timer will be programmed to interrupt at process B's latest start time LS(B)=4, before actually dispatching A for execution in Step 6.

At t=2: process A underruns, completing its computation at time 2 and invoking the run-time scheduler. The run-time scheduler will select process C for execution in Case 3 of Step 3 at time 2.

At t=2 in Step 5, the timer will be programmed to interrupt at process B's latest start time LS(B)=4, before actually dispatching C for execution in Step 6.

At t=4: the timer will interrupt at the latest start time for B, LS(B)=4, preempting process C and invoking the run-time scheduler. The run-time scheduler will set criticality(B) to HIGHER-CRITICALITY in Step 2. Then the run-time scheduler will select process B for execution in Case 2 of Step 3 at time 4.

At t=4 in Step 4, since a different process B was selected for execution, preempting process C, the latest start time of C, LS(C), will be re-computed, using the up-to-date remaining computation time of C, C'(C), resulting in a newer, increased latest start time for C:
LS(C)=11.

At t=4 in Step 5, the timer will be programmed to interrupt at process B's deadline $d_B$=7, before actually dispatching B for execution in Step 6.

At t=7: process B completes its computation at time 7 and invokes the run-time scheduler. The run-time scheduler will select process C for execution in Case 3 of Step 3 at time 7.

At t=7 in Step 5, the timer will be programmed to interrupt at the latest start time for D, LS(D)=13, before actually dispatching C for execution in Step 6.

At t=13: the timer will interrupt at the latest start time for D, LS(D)=13, preempting process C and invoking the run-time scheduler.

The run-time scheduler will check process C which has overrun for possible errors. No errors are detected.

The run-time scheduler will set criticality(D) to HIGHER-CRITICALITY in Step 2. Then the run-time scheduler will select process D for execution in Case 2 of Step 3 at time 13.

At t=13 in Step 5, the timer will be programmed to interrupt at process D's deadline $d_D$=17, before actually dispatching B for execution in Step 6.

At t=14: process D underruns, completing its computation at time 14 and invoking the run-time scheduler. The run-time scheduler will select process C for execution in Case 3 of Step 3 at time 14.

At t=14 in Step 5, the timer will be programmed to interrupt at C's deadline $d_C$=15, before actually dispatching C for execution in Step 6.

At t=15: process C completes its computation before its deadline expires.

Example 7

The following example demonstrates how an embodiment generates the run-time execution scenario shown in FIG. 12C, in which process D overruns, when given the feasible pre-run-time schedule shown in FIG. 12A.

In FIG. 12C, the portion of the run-time execution during which D overruns is shown using dashed lines.

In the pre-run-time phase of an embodiment, one may use any of the Time Slot Right Shift Procedures when given the original pre-run-time schedule in FIG. 12A to compute the initial latest-start-time schedule illustrated in FIG. 12B.

Here we demonstrate how the run-time scheduler in an embodiment will schedule the set of processes A, B, C and D, using latest start times LS(A), LS(B), LS(C), LS(D) of the processes A, B, C, D, that are computed using the latest-start-time schedule shown in FIG. 12B that is produced by any of the Time Slot Right Shift Procedures.

In the pre-run-time phase, the embodiment for computing the latest start times, will compute the following values for time t=0:
LS(A)=1; LS(B)=4; LS(C)=9, LS(D)=13.

At run-time t=0: the run-time scheduler will be invoked since t=$R_A$=0. The run-time scheduler will select process A for execution in Case 3 of Step 3 at time 0.

At t=0 in Step 5, the timer will be programmed to interrupt at process B's process Bs latest start time LS(B)=4, before actually dispatching A for execution in Step 6.

At t=2: process A underruns, completing its computation at time 2 and invoking the run-time scheduler. The run-time scheduler will select process C for execution in Case 3 of Step 3 at time 2.

At t=2 in Step 5, the timer will be programmed to interrupt at process B's latest start time LS(B)=4, before actually dispatching C for execution in Step 6.

At t=3: process C underruns, completing its computation at time 3 and invoking the run-time scheduler. The run-time scheduler will select process D for execution in Case 3 of Step 3 at time 3.

At t=3 in Step 5, the timer will be programmed to interrupt at the latest start time for B, LS(B)=4, before actually dispatching D for execution in Step 6.

At t=4: the timer will interrupt at the latest start time for B, LS(B)=4, preempting process D and invoking the run-time scheduler. The run-time scheduler will set criticality(B) to HIGHER-CRITICALITY in Step 2. Then the run-time scheduler will select process B for execution in Case 2 of Step 3 at time 4.

At t=4 in Step 4, since a different process B was selected for execution, preempting process D, the latest start time of D, LS(D), will be re-computed, using the up-to-date remaining computation time of D, C'(D), resulting in a newer, increased latest start time for D:
LS(D)=14.

At t=4 in Step 5, the timer will be programmed to interrupt at process B's deadline $d_B$=7, before actually dispatching B for execution in Step 6.

At t=7: process B completes its computation at time 7 and invokes the run-time scheduler. The run-time scheduler will select process D for execution in Case 3 of Step 3 at time 7.

At t=7 in Step 5, the timer will be programmed to interrupt at D's deadline, $d_D$=17, before actually dispatching D for execution in Step 6.

At t=17: process D completes its computation before its deadline expires.

Example 8

FIG. 8A shows a latest-start-time schedule of the processes A, C, D computed by any of the Time Slot Right Shift Procedures from the feasible pre-run-time schedule in FIG. 5A when the relations C EXCLUDES D and C PRECEDES D are added.

FIG. 8C shows a possible run-time execution of the processes A, C, D, when the relations C EXCLUDES D and C PRECEDES D are added, if C is allowed to continue past LS(D)=90 with the hope that both C and D may be able to complete before their respective deadlines. Such a strategy may be worthwhile when D would also have to be aborted if C is aborted. See the earlier discussion in Step 2 of the Run-Time Scheduler Method.

In FIG. 8C, the portions of the run-time execution during which C overruns are shown using dashed lines.

In the pre-run-time phase, any of the Time Slot Right Shift Procedures, will compute the initial latest-start-time-schedule shown in FIG. 8A, with the following values latest start times for time t=0:
LS(A)=40; LS(C)=70; LS(D)=90.

The run-time execution of the processes A, C, D is shown in FIG. 8C.

At run-time t=0: the run-time scheduler will be invoked since t=$R_A$=0. The run-time scheduler will select process A for execution in Case 3 of Step 3 at time 0.

At t=0 in Step 5, the timer will be programmed to interrupt at process C's release time $R_C$=30, before actually dispatching A for execution in Step 6.

At t=30: the timer interrupts, invoking the run-time scheduler since t=$R_C$=30. The run-time scheduler will select process C for execution in Case 3 of Step 3 at time 30.

At t=30 in Step 4, since a different process C was selected for execution, preempting process A, the latest start time of A, LS(A), will be re-computed, using the up-to-date remaining computation time of A, C'(A)=20, resulting in a newer, increased latest start time for A:
LS(A)=110.

At t=30, the latest start time LS(A) is re-computed in Step 4 of any of the embodiments of the Run Time Scheduler, including Alternative Step 4 of Alternative Embodiment II of the Run-Time Scheduler because Condition C3 is true, since the previously executing process A is uncompleted and A has not overrun and A is not selected for execution at time t=30. The latest-start-time-schedule computed by any of the Time Slot Right Shift Procedures using the up-to-date remaining computation time of A, C'(A)=20, is shown in FIG. 8B.

At t=30 in Step 5, the timer will be programmed to interrupt at time LS(D)=90, before actually dispatching C for execution in Step 6.

At t=90: process C has continued to overrun until time 90, at which the timer will interrupt at the latest start time for D, LS(D)=90, invoking the run-time scheduler.

At t=90, it is assumed that D would also have to be aborted if C is aborted (the relations C EXCLUDES D and C PRECEDES D exist), hence C is allowed to continue past LS(D)=90 with the hope that both C and D may be able to complete before their respective deadlines. Both criticality (C) and criticality(D) are set to HIGHER-CRITICALITY, so C will be selected for execution at time t in Case 2 of Step 3 at time 90.

At t=90 in Step 5, the timer will be programmed to interrupt at D's deadline $d_D$=110, which is also A's latest start time LS(A)=110, before actually dispatching D for execution in Step 6.

At t=100: process C completes its computation, invoking the run-time scheduler. The run-time scheduler will select process D for execution in Case 2 of Step 3 at time 100.

At t=100 in Step 5, the timer will be programmed to interrupt at D's deadline $d_D$=110, which is also A's latest start time LS(A)=110, before actually dispatching C for execution in Step 6.

At t=110: process D underruns, being able to complete before D's deadline $d_D$=110, which is also A's latest start time LS(A)=110, invoking the run-time scheduler. The run-time scheduler will set criticality(A) to HIGHER-CRITICALITY in Step 2. Then the run-time scheduler will select process A for execution in Case 2 of Step 3 at time 110.

At t=110 in Step 5, the timer will be programmed to interrupt at A's deadline $d_A$=130, before actually dispatching A for execution in Step 6.

At t=130: process A completes its computation before its deadline expires.

An Alternative Embodiment III of the Main Run Time Scheduler Method

A main difference between the following Alternative Embodiment III of the Main Run Time Scheduler Method and the embodiment of the main run-time scheduler method previously shown, is that the timer is programmed to interrupt and invoke the scheduler in case (f) below, that is, when a process overruns. In comparison, the embodiment previously shown, does not interrupt and invoke the scheduler in case (f) below.

With the following alternative embodiment, given a pre-run-time schedule of all the processes, at run-time there are the following main situations when the run-time scheduler may need to be invoked to perform a scheduling action:

(a) At a time t when some asynchronous process a has arrived and made a request for execution.

(b) At a time t when some process x has just completed its computation.

(c) At a time t that is equal to the latest start time LS($p_j$) of a process $p_j$ that has not started execution.

(d) At a time t that is equal to the release time $R_{p_k}$ of a process $p_k$ that has not started execution when there does not exist any process $p_j \in$P-g that is currently running, that is, has started but not completed.

(e) At a time t that is equal to the deadline $d_{p_i}$ of an uncompleted process $p_i$. (In this case, $p_i$ has just missed its deadline, and the system should handle the error.)

(f) At a time t when some process p has overrun, that is, its remaining computation time is not greater than zero, and p has not yet completed its computation, that is, $\neg$(C'(p)>0)$\wedge$ $\neg$(e(p)≤t).

In situation (a) above, the run-time scheduler is usually invoked by an interrupt handler responsible for servicing requests generated by an asynchronous process.

In situation (b) above, the run-time scheduler is usually invoked by a kernel function responsible for handling process completions.

In situations (c), (d), (e) and (f) above, the run-time scheduler is invoked by programming the timer to interrupt at the appropriate time.

The following describes an Alternative Step 5 that can be used to replace Step 5 of the embodiments of the Main Run Time Scheduler described earlier. In the Alternative Step 5, the timer is programmed to interrupt and invoke the run-time scheduler at a time when some process x has overrun, that is, its remaining computation time is not greater than zero, and p has not yet completed its computation, that is, $\neg(C'(p)>0)\wedge\neg(e(p)\leq t)$. The latter event is situation (f) in Alternative Embodiment III of the Main Run Time Scheduler Method.

Alternative Step 5.

At time 0 and after servicing each timer interrupt, and performing necessary error detection, error handling, latest start time re-calculations, and making scheduling decisions;
—reset the timer to interrupt at the earliest time that any of the events (c), (d), (e), and (f) above may occur as follows:

Next_Interrupt_Time=min{$D$,LS,$R$,($t+C'(p)$)} where
$D$=min{$d_{p_i}|(d_{p_i}>t)\wedge\neg(e'(p_i)\leq t))$}
LS=min{LS($p_j$)|$\neg(e'(p_j)\leq t)\wedge$(LS($p_j$)>t)$\wedge$($p_j$ was NOT selected for execution at run-time t)}
$R$=min{$R_{p_k}|(p_k)\leq t)\wedge R_{p_k}>t \wedge(\forall p_i,p_i\in P$-g,$\neg(p_k)\leq t)\wedge e(p_i)<e(p_k)$: $\wedge((p_i$PRECEDES$p_k)\vee(p_k$EXCLUDES$p_i)))\wedge(\neg(\exists p$: p was selected for execution at run-time t)$\wedge(e(p)<e(p_k))))$}

(R is equal to the earliest release time $R_{p_k}$ such that $p_k$ has not started, and for all $p_i$ that has not started and the end time of $p_i$'s time slot is ordered before the end time of $p_k$'s time slot in the latest-start-time schedule, $p_i$ does not PRECEDE $p_k$ and $p_k$ does not EXCLUDE $p_i$; and there does not exist any process p such that p was selected for execution at run-time t and the end time of p's time slot is ordered before the end time of $p_k$'s time slot in the latest-start-time schedule)

(Above, process p is the process that was selected for execution at run-time t. $t+C'(p)$ is the current run-time t plus p's remaining computation time, which is the time at which process p may overrun if at that time p is still continuing to run and p still has not completed by that time.)

(End of Alternative Step 5 for Alternative Embodiment III of the Main Run Time Scheduler Method.)

(See FIG. 9 for an illustration of Alternative Step 5 in Alternative Embodiment III of the Main Run Time Scheduler Method.)

(The Alternative Step 5 described above in an Alternative Embodiment III of the Main Run Time Scheduler Method, which is used to handle situation (f), can also be used in combination with Alternative Step 2 and Alternative Step 4 of an Alternative Embodiment II of the Main Run Time Scheduler Method described earlier.)

Example 9

Here we demonstrate how an Alternative Embodiment III of the Run-Time Scheduler will handle possible overruns and underruns of the set of processes A, C, D in Example 2, using the latest start times LS(A), LS(B), LS(C) of the processes A, C, D, that are computed using the initial latest-start-time schedule shown in FIG. 5B in the previous section.

In FIG. 5E, the portions of the run-time execution during which C overruns are shown using dashed lines.

In the pre-run-time phase, any of the Time Slot Right Shift Methods for computing the latest start times, will compute the following values for time t=0 (see Example 2): LS(A)=40; LS(C)=80; LS(D)=90.

Any of the Time Slot Right Shift Methods for computing the latest start times, can also be used to re-compute latest start times of processes during run-time.

At run-time t=0: the run-time scheduler will be invoked since $t=R_A=0$. The run-time scheduler will select process A for execution in Case 3 of Step 3 at time 0.

At t=0 in Alternative Step 5, the timer will be programmed to interrupt at process C's release time $R_C$=30, before actually dispatching A for execution in Step 6.

At t=30: the timer interrupts, invoking the run-time scheduler since $t=R_C$=30. The run-time scheduler will select process C for execution in Case 3 of Step 3 at time 30.

At t=30 in Step 4, since a different process C was selected for execution, preempting process A, the latest start time of A, LS(A), will be re-computed, using the up-to-date remaining computation time of A, C'(A), resulting in a newer, increased latest start time for A:
LS(A)=70.

At t=30, the latest start time LS(A) is re-computed in Step 4 of any of the embodiments of the Run Time Scheduler, including Alternative Step 4 of Alternative Embodiment II of the Run-Time Scheduler because Condition C3 is true, since the previously executing process A is uncompleted and A has not overrun and A is not selected for execution at time t=30. The latest-start-time schedule computed by any of the Time Slot Right Shift Procedures using the up-to-date remaining computation time of A, C'(A)=20, is shown in FIG. 5C.

At t=30 in Alternative Step 5, the timer will be programmed to interrupt at time t+C'(C)=30+20=50, which is when process C may overrun, that is, when the remaining computation time of C, C'(C), is 0, before actually dispatching C for execution in Step 6.

At t=50: process C overruns, causing the timer to interrupt, invoking the run-time scheduler since any process overrun falls into the category (f) of scheduling time points when the run-time scheduler may need to be invoked to perform a scheduling action.

At t=50 in Step 2, the latest start times of processes that have not started will be re-computed. Since process C has overrun, that is, its remaining computation time is not greater than zero, and C has not yet completed its computation, that is, $\neg(C'(C)>0)\wedge\neg(e(C)\leq t)$, process C will not be considered anymore when re-computing the latest start times. This will result in a new increased latest start time for A:
LS(A)=110.

At t=50, the latest start time LS(A) is re-computed in Step 2 of any of the embodiments of the Run Time Scheduler, including Alternative Step 2 of Alternative Embodiment II of the Run-Time Scheduler because Condition C1 is true, since the start time s(A)=70 of uncompleted process A's time slot precedes the end time e(C)=120 of the previously executing process C's time slot, and the end time e(C)=120 of C's time slot precedes the end time e(A)=130 of A's time slot in the most recent latest-start-time schedule shown in FIG. 5C. The latest-start-time schedule computed by any of the Time Slot Right Shift Procedures using the up-to-date remaining computation time of C, C'(C)=0, is shown in FIG. 5D.

After checking that no fatal error has occurred, the run-time scheduler will select process C for execution in Case 3 of Step 3 at time 50.

At t=50 in Alternative Step 5, the timer will be programmed to interrupt at the latest start time for D, LS(D)=90, before actually dispatching C for execution in Step 6.

At t=90: process C has continued to overrun until time 90, at which the timer will interrupt at the latest start time for D, LS(D)=90, invoking the run-time scheduler. The run-time scheduler will set criticality(D) to HIGHER-CRITICALITY in Step 2. Then the run-time scheduler will select process D for execution in Case 2 of Step 3 at time 90.

At t=90 in Alternative Step 5, the timer will be programmed to interrupt at time t+C'(D)=90+20=110, which is when process D may overrun, that is, when the remaining computation time of D, C'(D), is 0, which is also D's deadline $d_D$, before actually dispatching D for execution in Step 6.

At t=100: process D underruns, completing its computation at time 100 and invoking the run-time scheduler. The run-time scheduler will select process C for execution in Case 3 of Step 3 at time 100.

At t=100 in Alternative Step 5, the timer will be programmed to interrupt at the latest start time for A, LS(A)=110, before actually dispatching C for execution in Step 6.

At t=110: process C has continued to overrun until time 110, at which the timer will interrupt at the latest start time for A, LS(A)=110, invoking the run-time scheduler. The run-time scheduler will set criticality(A) to HIGHER-CRITICALITY in Step 2. Then the run-time scheduler will select process A for execution in Case 2 of Step 3 at time 110.

At t=110 in Alternative Step 5, the timer will be programmed to interrupt at time t+C'(A)=110+20=130, which is when process A may overrun, that is, when the remaining computation time of A, C'(A)=0, which is also A's deadline $d_A$, before actually dispatching A for execution in Step 6.

At t=115: process A underruns, completing its computation at time 115 and invoking the run-time scheduler. The run-time scheduler will select process C for execution in Case 3 of Step 3 at time 115.

At t=115 in Alternative Step 5, the timer will be programmed to interrupt at C's deadline $d_C$=120, before actually dispatching C for execution in Step 6.

At t=120: process C completes its computation before its deadline expires.

This Alternative Embodiment III of the Run-Time Scheduler generates the run-time execution sequence shown in FIG. 5E.

An Alternative Embodiment IV of the Main-Run-Time-Scheduler Method:

In an Alternative Embodiment IV of the Main-Run-Time-Scheduler Method, the following Alternative Procedure B can be used to re-compute, at run-time, using a very short amount of time, the latest start time LS(p) of an uncompleted process p that has not overrun, when given a most recent latest-start-time schedule as described earlier in the description of an Alternative Embodiment II of the Run Time Scheduler.

An Alternative Procedure B for Re-Computing the Latest Start Time of a Uncompleted Process that has not Overrun An Alternative Procedure B for re-computing, at run-time, the latest start time LS(p) of an uncompleted process p that has not overrun, may use a data structure similar to the time slots data structure used in the Third Time Slot Right Shift Procedure described earlier.

Any latest-start-time schedule produced by using any of the First, Second, or Third Time Slot Right Shift Procedures, or any schedule that is produced by an Alternative Procedure B, or any equivalents of such methods or procedures, can be used as a most recent latest-start-time schedule.

Suppose that in a time slots data structure that corresponds to a most recent latest-start-time schedule, there are a total of n time slots, numbered 1, 2, n, where the first time slot is numbered 1, and the last time slot is numbered n.

The data associated with each time slot i in a most recent latest-start-time schedule is represented by the data structure:

```
structure {
    s: int;
    e: int;
    l: int;
    p: int;
    active: Boolean.
} timeslot[i];
``` where:
timeslot[i].s is the start time of time slot i,
timeslot[i].e is the end time of time slot i,
timeslot[i].l is the length of time slot i,
timeslot[i].p is the index of the process that was allocated that time slot,
timeslot[i].active is the active/inactive status of the process that was allocated that time slot;
timeslot[i].active is initialized to have a true value for every time slot i in the latest-start-time schedule at time 0, and at the start of each system major cycle corresponding to the least common multiple of the process periods.

For example, the latest-start-time schedule in FIG. 19B would have a total of n=5 time slots. Assuming that the processes A, C, D have the process indexes $p_A$, $p_C$, $p_D$, respectively, then the 5 time slots in FIG. 19B would have the following time slot data values:
timeslot[1].s=40; timeslot[1].e=80; timeslot[1].l=40; timeslot[1].p=$p_A$; timeslot[1].active=true.
time slot[2].s=80; timeslot[2].e=90; timeslot[2].l=10; time slot[2].p=$p_C$; timeslot[2].active=true.
timeslot[3].s=90; timeslot[3].e=110; timeslot[3].l=20; timeslot[3].p=$p_D$; timeslot[3].active=true.
timeslot[4].s=110; timeslot[4].e=120; timeslot[4].l=10; timeslot[4].p=$p_C$; timeslot[4].active=true.
timeslot[5].s=120; timeslot[5].e=130; timeslot[5].l=10; timeslot[5].p=$p_A$; timeslot[5].active=true.

At the start of each system major cycle corresponding to the least common multiple of the process periods, the timeslot data will be initialized/restored to be consistent with a feasible pre-run-time schedule of all the uncompleted processes, such as the latest-start-time schedule produced by using the Time Slot Right Shift Procedure given any feasible pre-run-time schedule.

During run-time, some values in the timeslot data may change when the remaining computation time of some of the processes change.

(See FIG. 20 for a flowchart diagram showing an embodiment of Alternative Procedure B for re-computing, at run-time, the latest start time LS(p) of an uncompleted process p that has not overrun, when given a most recent latest-start-time schedule.)

Note that in all the pseudo code in the present disclosure, comments are preceded by a percentage sign "%".

It is assumed that, the value of a data variable "recent_executed_time(p)" is initialized to be equal to the total number of time units that the uncompleted process p has executed on the processor since the last time that the most recent latest-start-time schedule for all uncompleted processes that have not overrun was computed.

% (see Fig 20.)
done = false;

```
i = 1;
while ((i <= n) and not(done) and not(recent_executed_time(p) < 0)) do
   begin
      if ((timeslot[i].p = p) and (timeslot[i].active)) then
         begin
            if timeslot[i].l > recent_executed_time(p) then
               begin
                  LS(p) = timeslot[i].s + recent_executed_time(p);
                  timeslot[i].s = timeslot[i].s + recent_executed_time(p);
                  timeslot[i].l = timeslot[i].l - recent_executed_time(p);
                  recent_executed_time(p) = 0;
                  done = true;
               end;
            else      % timeslot[i].l <= recent_executed_time(p)
               begin
                  timeslot[i].active = false;
                  timeslot[i].p = undefined;
                  recent_executed_time(p) = recent_executed_time(p)
                                            - timeslot[i].l;
               end;
      end;
      i = i + 1;
end;
```

If the Procedure B is used at time t=45 in FIG. 19E to recompute the latest start time LS(A) for the uncompleted process A, using the most recent latest-start-time schedule illustrated in FIG. 19B, with the time slot data given above, then after Procedure B has completed, LS(A) will be re-computed to have the new value LS(A)=125, which is equal to the start time of the first time slot that is assigned to process A; and the data in the timeslot data structure will correspond to the data illustrated in FIG. 19C:

timeslot[1].s=40; timeslot[1].e=80; timeslot[1].l=40; timeslot[1].p=undefine; timeslot[1].active=false.

timeslot[2].s=80; timeslot[2].e=90; timeslot[2].l=10; timeslot[2].p=$p_C$; timeslot[2].active=true.

timeslot[3].s=90; timeslot[3].e=110; timeslot[3].l=20; timeslot[3].p=$p_P$; timeslot[3].active=true.

timeslot[4].s=110; timeslot[4].e=120; timeslot[4].l=10; timeslot[4].p=$p_C$; timeslot[4].active=true.

timeslot[5].s=125; timeslot[3].e=130; timeslot[5].l=5; timeslot[5].p=$p_A$; timeslot[5].active=true.

(The explanation in Example 3, using FIGS. 5A-5E, can be used to understand the scheduling of processes A, C, and D, in FIGS. 19A-19E.)

We have shown a plurality of methods and systems with different characteristics and different advantages, to be used either before run-time, or during run-time, for generating different latest-start-time schedules with different characteristics and different advantages, and for computing latest start times of real-time processes, and a plurality of run-time schedulers with different characteristics and advantages, which at run-time, uses either the original or latest-start-time schedules to compute latest start times for each process; and then uses those latest start times and the order of the end times of the time slots of the processes in the latest-start-time schedule, to effectively handle process underruns and overruns while scheduling the processes, so that processes that need to overrun, can effectively and systematically utilize any spare processor capacity, including any spare processor capacity that becomes available when other processes underrun, to maximize their chances of still meeting their respective deadlines, despite overrunning, thereby increasing both system utilization and robustness in the presence of inaccurate estimates of the worst-case computations of the real-time processes, while simultaneously satisfying important constraints and dependencies, such as offsets, release times, precedence relations, and exclusion relations.

When embodiments of the method are used at run-time to re-compute the latest start times LS(p) for uncompleted processes, one can effectively reduce the run-time computation effort, by pre-computing most of the values that are used by the method, so that much of the computation can be performed by table lookup.

Another important and desirable property of the embodiments of the method is that, in a case where there may not be enough spare time available, one can always "skip" re-computing some subset of the latest start times LS(p) at any time, and rely on the most recently computed latest start times LS(p) to schedule the processes, while still guaranteeing that all the processes' timing constraints will be satisfied, with the only consequence being a possible reduction in the length of time that some processes may be allowed to overrun, because some recent process underruns may not have been taken into account. Note that there will always exist at least one set of valid latest start times LS(p)—the initial set of latest start times that are computed before run-time.

During run-time, if there are few idle intervals and time is tight, then it may be advantageous to use an embodiment to only compute the latest start time for the next process or a limited number of processes, or even skip re-computing the latest start times and only rely on the most recently computed latest start times, in order to reduce run-time system overhead.

Thus it should not be difficult to obtain a valid and sufficiently accurate worst-case execution time for the Run-Time Scheduler for a given specific set of processes for which the characteristics will be known before run-time in an application in practice.

It should be noted that while the above-described embodiments can be carried out in a software programmed processor, and have been described with such a processor as an example, they, or one or more steps in the embodiments, can can alternatively be carried out by hardware such as gate arrays or by other fixed or programmable structures, or combinations of these structures.

A processor can be any physical or virtual structure which can perform one or more functions. A processor can be a machine, a computer processor, a logic device, an organization, etc. A process can be any task or job that requires a finite amount of time to complete on a certain processor. Computation time is the amount of time that a process requires from start to completion on a certain processor.

FIG. 15 illustrates an example of a system on which the embodiments described herein can be carried out. Any of plural peripherals 1 provide input signals which require processing. For example, peripherals can be a keyboard, a signal from an emergency response telephone system, an alarm clock, a program running in background on a processor, a pipeline, etc. A memory 3 stores processes, e.g. series of instructions, for carrying out the various processes. The memory can be in the form of any storage structure, and can be, for instance a store for a series of electronic, pneumatic, hydraulic, etc. control signals for operating a plurality of industrial processes that require scheduling in accordance with the demands of the input signals. In one embodiment, the memory can be a hard random access memory and/or a disk drive of a computer, of well known form and the input signals can be electronic. In another embodiment, in the case in which the memory is in the form of industrial process structures, the input signals can be fluids, photons, objects, audio, data or other signals, etc, which are to be scheduled to be processed by the various industrial processes.

The input signals and the memory are coupled to a processor 4 of any form with which the present method can be operated, such a computer processor. The processor has an output which is coupled to an output device or system 5, which receives the output result of the operation of the processes by the processor.

The memory also has a portion 7 for storing a pre-run-time schedule, and a portion 9 for storing a run-time schedule for execution of the processes stored in the memory 3.

In operation, the processor receives input signals which demand that processes stored in the memory 3 (or which are received from other control or interrupt inputs, not shown) are executed. As described earlier in this specification, some of these processes can be periodic and some can be asynchronous. The processor, operating using an operating system stored in the memory 3, obtains the characteristics of the various processes from the memory, and creates or simulates a pre-run-time schedule, then creates or simulates a run-time schedule which uses the pre-run-time schedule, as described earlier in this specification. It then executes the run-time schedule as described herein, providing an output to the output device or system.

FIG. 10 provides another example of a multiprocessor system on which the embodiments described herein can be carried out. The real-time system includes memory 11, a plurality of processors 1, a plurality of timers 2, a plurality of pre-run-time schedulers 4, a plurality of pre-run-time schedules 5, a plurality of computed process attributes 7, a plurality of run-time schedulers 6, a plurality of periodic processes $p_1, p_2, \ldots, p_n$ 8, a plurality of asynchronous processes $a_1, a_2, \ldots, a_j$ 9, and other system data and application data and code 10. Each processor 1 may have local memory and shared memory (not shown). A plurality of pre-run-time scheduler 4 construct a plurality of pre-run-time schedules 6 before run-time, then a plurality of run-time schedulers 6 use information in the plurality of pre-run-time schedules 6, computing a plurality of computed process attributes, to schedule executions of a plurality of periodic processes $p_1, p_2, \ldots, p_n$ 8, a plurality of asynchronous processes $a_1, a_2, \ldots, a_j$ 9. The plurality of run-time schedulers 6 may also modify or generate pre-run-time schedules 4 in the course of scheduling the plurality of periodic processes $p_1, p_2, \ldots, p_n$ 8, and the plurality of asynchronous processes $a_1, a_2, \ldots, a_j$ 9.

The plurality of periodic processes $p_1, p_2, \ldots, p_n$ 8, and the plurality of asynchronous processes $a_1, a_2, \ldots a_j$ 9 may share memory and other resources. Consequently, it is important to enforce exclusion relations on the execution of the processes to prevent more than one process from accessing a shared memory resource at the same time.

The plurality of pre-run-time schedulers 4, and the plurality of run-time schedulers 6, work together to control the execution of all the processes 8 and 9. The plurality of pre-run-time schedulers 4, and the plurality of run-time schedulers 6, work together to guarantee that all the processes 8 and 9 are completed before their respective deadlines and that all the constraints and relations among the processes are satisfied.

Some applications of the present method can be in aircraft flight control, plant process control, traffic control, communication systems, multimedia, signal control of the internet, electronic commerce, electronic buses, computer operation, etc.

A person understanding the above-described method may now conceive of alternative designs, using the principles described herein. All such designs which fall within the scope of the claims appended hereto are considered to be part of the present method.

While the above description contains many specificities, these should not be construed as limitations on the scope of any embodiment, but as exemplifications of various embodiments thereof. Many other ramifications and variations are possible within the teachings of the various embodiments.

Thus the scope should be determined by the appended claims and their legal equivalents, and not by the examples given.

The invention claimed is:

1. A method for scheduling, preempting, and dispatching the execution of a plurality of periodic processes with hard deadlines in an embedded hard-real-time computer system with high assurance requirements which allows periodic processes with hard deadlines to overrun while guaranteeing satisfaction of predetermined constraints, comprising:

(A) providing one or more processors to execute the plurality of periodic processes with hard deadlines, each periodic process with a hard deadline in said plurality of periodic processes with hard deadlines having an estimated worst-case computation time, the execution of said plurality of periodic processes with hard deadlines by said one or more processors being required to satisfy the predetermined constraints comprising (A1) period for said each periodic process with a hard deadline, (A2) release time for said each periodic process with a hard deadline, (A3) deadline for said each periodic process with a hard deadline, (A4) exclusion relations wherein each exclusion relation being defined between a selected pair of periodic processes with hard deadlines in said plurality of periodic processes with hard deadlines, and said selected pair of periodic processes with hard deadlines cannot access a shared data memory resource at the same time, (B) providing one or more timers which allow the system to determine at any time:

(B1) the current time, and, (B2) the remaining worst-case computation time for each uncompleted periodic process with a hard deadline, (C) providing a timer interrupt mechanism which in combination with said one or more timers can be programmed to interrupt at future times wherein if any uncompleted periodic process with a hard deadline is executing at any of said future times then the interrupt at said any of said future times will cause the execution of said any uncompleted periodic process with a hard deadline to be preempted at any of said future times, (D) providing a memory which stores latest-start-times for uncompleted periodic processes with hard deadlines that have not overrun including uncompleted periodic processes with hard deadlines that have not overrun which have been preempted wherein (D1) each of said latest-start-times for one of the uncompleted periodic processes that have not overrun being either equal to a previously stored latest-start-time or being equal to an updated latest-start-time which may be greater than a previously stored latest-start-time if the remaining computation times of one or more periodic processes with hard deadlines have decreased due to completion or partial completion of said one or more periodic processes with hard deadlines since the last time that a latest-start-time was stored for said one of the uncompleted periodic processes that have not overrun, and (D2) if each uncompleted periodic process with a hard deadline that has not overrun is able to start on or before its latest-start-time and the length of time that said each uncompleted periodic process with a hard deadline that has not overrun is executed by said one or more processors is less than or equal to the length of its remaining worst-case computation time then satisfaction of said predetermined constraints for all uncompleted periodic processes with hard deadlines that have not overrun can be guaranteed, and (D3) each of said latest-start-times for one of the uncompleted periodic processes with hard deadlines that has not overrun being as late as possible while still guaranteeing that execution of the uncompleted periodic processes with hard deadlines that have not overrun will satisfy said predetermined constraints including deadline constraints, (D4) each of said latest-start-times for one of the uncompleted periodic processes with hard deadlines that have not overrun being equal to a beginning time of a time slot in a sequence of time slots on one or more processor time axes in a latest-start-time schedule, (D4.1) said latest-start-time schedule comprising mapping from executions of the uncompleted periodic processes with hard deadlines that have not overrun to said sequence of time slots on one or more processor time axes, each of the time slots having a beginning time and an end time, reserving each one of the time slots for execution of one of the uncompleted periodic processes with hard deadlines that have not overrun, the positions of the end time and the beginning time of each of the time slots being such that execution of the uncompleted periodic processes with hard deadlines that have not overrun will satisfy said predetermined constraints, (D4.2) said latest-start-time schedule generated by scheduling the uncompleted periodic processes with hard deadlines that have not overrun in reverse time order starting from a time that is equal to the latest deadline among the deadlines of the uncompleted periodic processes with hard deadlines that have not overrun, using a latest-release-time-first scheduling strategy that is equivalent to a reverse application of an earliest-deadline-first strategy which allows any first uncompleted periodic process with a hard deadline that has not overrun to preempt any second uncompleted periodic process with a hard deadline that has not overrun at any appropriate time if said any first uncompleted periodic process with a hard deadline that has not overrun and said any second uncompleted periodic process with a hard deadline that has not overrun do not access a shared data memory resource and which satisfies said predetermined constraints for uncompleted periodic processes with hard deadlines that have not overrun, (E) providing a run-time scheduler which is activated by interrupts generated by said timer interrupt mechanism in combination with said one or more timers, or activated at time zero or activated by the completion of a periodic process with a hard deadline, and which on each activation:

(E1) computes and stores in said memory one or more updated latest-start-times for one or more of the uncompleted periodic processes with hard deadlines that have not overrun if (E1.1) there is enough time available to compute said one or more updated latest-start-times, and (E1.2) said one or more updated latest-start-times are greater than the latest-start-times most recently stored in said memory for said one or more of the uncompleted periodic processes with hard deadlines that have not overrun when the remaining computation times of one or more periodic processes with hard deadlines have decreased due to completion or partial completion of said one or more periodic processes with hard deadlines since the last time that a latest-start-time was stored in said memory for said one or more of the uncompleted periodic processes with hard deadlines that have not overrun, (E2) dispatches for execution any particular uncompleted periodic process with a hard deadline that has not overrun for execution by said one or more processors if and when the latest-start-time for said any particular uncompleted periodic process with a hard deadline that has not overrun has been reached, (E3) performs error handling if the deadline for any uncompleted periodic process with a hard deadline has been reached, (E4) programs said timer interrupt mechanism to interrupt and re-activate execution of the run-time scheduler at future times including (E4.1) latest-start-times of uncompleted periodic processes with hard deadlines that have not overrun, and (E4.2) deadlines of uncompleted periodic processes with hard deadlines, (E5) allows any selected uncompleted periodic process with a hard deadline to overrun until the latest start time of another uncompleted periodic process with a hard deadline or until the deadline of said any selected uncompleted periodic process with a hard deadline has been reached, (F) providing a plurality of peripherals which provide input signals that require processing by the periodic processes with hard deadlines; and (G) providing a plurality of output devices or systems which receive the output results of a subset of the periodic processes with hard deadlines on or before the hard deadlines of said subset of the periodic processes with hard deadlines, whereby during run-time any uncompleted periodic process with a hard deadline is permitted to overrun until the latest start time of another uncompleted periodic process with a hard deadline or until the deadline of said any uncompleted periodic process with a hard deadline has been reached, and the latest start times can be updated during run-time when their values can be increased due to completion or partial completion of one or more periodic processes with hard deadlines, so that uncompleted periodic processes with hard deadlines can utilize any spare processor capacity to overrun when needed, including spare capacity that becomes available when other periodic processes with hard deadlines underrun, thus increasing the chances that uncompleted periodic processes with hard deadlines will still be able to complete their computations despite overrunning, while guaranteeing satisfaction of predetermined timing constraints including deadlines for all uncompleted periodic processes with hard deadlines that have not overrun, reduce the chances of total system failure, and increase both processor utilization and system robustness in the presence of inaccurate estimates of the worst-case computation times of periodic processes with hard deadlines.

2. The method as defined in claim 1, wherein the run-time scheduler programs said timer interrupt mechanism to interrupt and re-activate the run-time scheduler at future times including release-times of uncompleted periodic processes with hard deadlines that have not overrun.

3. The method as defined in claim 1, wherein said predetermined constraints further include precedence relations, each precedence relation being defined between a first periodic process with a hard deadline and a second periodic process with a hard deadline in said plurality of periodic processes with hard deadlines, said second periodic process with a hard deadline cannot start execution before the end of the execution of said first periodic process with a hard deadline.

4. A system for scheduling, preempting, and dispatching the execution of a plurality of periodic processes with hard deadlines in an embedded hard-real-time computer system with high assurance requirements which allows periodic processes with hard deadlines to overrun while guaranteeing satisfaction of predetermined constraints, comprising:
- (A) one or more processors to execute the plurality of periodic processes with hard deadlines, each periodic process with a hard deadline in said plurality of periodic processes with hard deadlines having an estimated worst-case computation time, the execution of said plurality of periodic processes with hard deadlines by said one or more processors being required to satisfy the predetermined constraints comprising
- (A1) period for said each periodic process with a hard deadline,
- (A2) release time for said each periodic process with a hard deadline,
- (A3) deadline for said each periodic process with a hard deadline,
- (A4) exclusion relations wherein each exclusion relation being defined between a selected pair of periodic processes with hard deadlines in said plurality of periodic processes with hard deadlines, and said selected pair of periodic processes with hard deadlines cannot access a shared data memory resource at the same time,
- (B) one or more timers which allow the system to determine at any time:
- (B1) the current time, and,
- (B2) the remaining worst-case computation time for each uncompleted periodic process with a hard deadline,
- (C) a timer interrupt mechanism which in combination with said one or more timers can be programmed to interrupt at future times wherein if any uncompleted periodic process with a hard deadline is executing at any of said future times then the interrupt at said any of said future times will cause the execution of said any uncompleted periodic process with a hard deadline to be preempted at any of said future times,
- (D) a memory which stores latest-start-times for uncompleted periodic processes with hard deadlines that have not overrun including uncompleted periodic processes with hard deadlines that have not overrun which have been preempted wherein
- (D1) each of said latest-start-times for one of the uncompleted periodic processes that have not overrun being either equal to a previously stored latest-start-time or being equal to an updated latest-start-time which may be greater than a previously stored latest-start-time if the remaining computation times of one or more periodic processes with hard deadlines have decreased due to completion or partial completion of said one or more periodic processes with hard deadlines since the last time that a latest-start-time was stored for said one of the uncompleted periodic processes that have not overrun, and
- (D2) if each uncompleted periodic process with a hard deadline that has not overrun is able to start on or before its latest-start-time and the length of time that said each uncompleted periodic process with a hard deadline that has not overrun is executed by said one or more processors is less than or equal to the length of its remaining worst-case computation time then satisfaction of said predetermined constraints for all uncompleted periodic processes with hard deadlines that have not overrun can be guaranteed, and
- (D3) each of said latest-start-times for one of the uncompleted periodic processes with hard deadlines that has not overrun being as late as possible while still guaranteeing that execution of the uncompleted periodic processes with hard deadlines that have not overrun will satisfy said predetermined constraints including deadline constraints,
- (D4) each of said latest-start-times for one of the uncompleted periodic processes with hard deadlines that have not overrun being equal to a beginning time of a time slot in a sequence of time slots on one or more processor time axes in a latest-start-time schedule,
- (D4.1) said latest-start-time schedule comprising mapping from executions of the uncompleted periodic processes with hard deadlines that have not overrun to said sequence of time slots on one or more processor time axes, each of the time slots having a beginning time and an end time, reserving each one of the time slots for execution of one of the uncompleted periodic processes with hard deadlines that have not overrun, the positions of the end time and the beginning time of each of the time slots being such that execution of the uncompleted periodic processes with hard deadlines that have not overrun will satisfy said predetermined constraints,
- (D4.2) said latest-start-time schedule generated by scheduling the uncompleted periodic processes with hard deadlines that have not overrun in reverse time order starting from a time that is equal to the latest deadline among the deadlines of the uncompleted periodic processes with hard deadlines that have not overrun, using a latest-release-time-first scheduling strategy that is equivalent to a reverse application of an earliest-deadline-first strategy which allows any first uncompleted periodic process with a hard deadline that has not overrun to preempt any second uncompleted periodic process with a hard deadline that has not overrun at any appropriate time if said any first uncompleted periodic process with a hard deadline that has not overrun and said any second uncompleted periodic process with a hard deadline that has not overrun do not access a shared data memory resource and which satisfies said predetermined constraints for uncompleted periodic processes with hard deadlines that have not overrun,
- (E) a run-time scheduler which is activated by interrupts generated by said timer interrupt mechanism in combination with said one or more timers, or activated at time zero or activated by the completion of a periodic process with a hard deadline, and which on each activation:

(E1) computes and stores in said memory one or more updated latest-start-times for one or more of the uncompleted periodic processes with hard deadlines that have not overrun if (E1.1) there is enough time available to compute said one or more updated latest-start-times, and (E1.2) said one or more updated latest-start-times are greater than the latest-start-times most recently stored in said memory for said one or more of the uncompleted periodic processes with hard deadlines that have not overrun when the remaining computation times of one or more periodic processes with hard deadlines have decreased due to completion or partial completion of said one or more periodic processes with hard deadlines since the last time that a latest-start-time was stored in said memory for said one or more of the uncompleted periodic processes with hard deadlines that have not overrun, (E2) dispatches for execution any particular uncompleted periodic process with a hard deadline that has not overrun for execution by said one or more processors if and when the latest-start-time for said any particular uncompleted periodic process with a hard deadline that has not overrun has been reached, (E3) performs error handling if the deadline for any uncompleted periodic process with a hard deadline has been reached, (E4) programs said timer interrupt mechanism to interrupt and re-activate execution of the run-time scheduler at future times including (E4.1) latest-start-times of uncompleted periodic processes with hard deadlines that have not overrun, and (E4.2) deadlines of uncompleted periodic processes with hard deadlines, (E5) allows any selected uncompleted periodic process with a hard deadline to overrun until the latest start time of another uncompleted periodic process with a hard deadline or until the deadline of said any selected uncompleted periodic process with a hard deadline has been reached, (F) a plurality of peripherals which provide input signals that require processing by the periodic processes with hard deadlines; and (G) a plurality of output devices or systems which receive the output results of a subset of the periodic processes with hard deadlines on or before the hard deadlines of said subset of the periodic processes with hard deadlines, whereby during run-time any uncompleted periodic process with a hard deadline is permitted to overrun until the latest start time of another uncompleted periodic process with a hard deadline or until the deadline of said any uncompleted periodic process with a hard deadline has been reached, and the latest start times can be updated during run-time when their values can be increased due to completion or partial completion of one or more periodic processes with hard deadlines, so that uncompleted periodic processes with hard deadlines can utilize any spare processor capacity to overrun when needed, including spare capacity that becomes available when other periodic processes with hard deadlines underrun, thus increasing the chances that uncompleted periodic processes with hard deadlines will still be able to complete their computations despite overrunning, while guaranteeing satisfaction of predetermined timing constraints including deadlines for all uncompleted periodic processes with hard deadlines that have not overrun, reduce the chances of total system failure, and increase both processor utilization and system robustness in the presence of inaccurate estimates of the worst-case computation times of periodic processes with hard deadlines.

5. The system as defined in claim 4, wherein the run-time scheduler programs said timer interrupt mechanism to interrupt and re-activate the run-time scheduler at future times including release-times of uncompleted periodic processes with hard deadlines that have not overrun.

6. The system as defined in claim 4, wherein said predetermined constraints further include precedence relations, each precedence relation being defined between a first periodic process with a hard deadline and a second periodic process with a hard deadline in said plurality of periodic processes with hard deadlines, said second periodic process with a hard deadline cannot start execution before the end of the execution of said first periodic process with a hard deadline.

* * * * *